(12) United States Patent
Lau et al.

(10) Patent No.: US 11,418,905 B2
(45) Date of Patent: *Aug. 16, 2022

(54) METHOD AND APPARATUS FOR IDENTIFYING AND PRESENTING LOCATION AND LOCATION-RELATED INFORMATION

(71) Applicant: IpVenture, Inc., San Jose, CA (US)

(72) Inventors: Chung Lau, Sunnyvale, CA (US); Peter P. Tong, Mountain View, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/163,692

(22) Filed: Feb. 1, 2021

(65) Prior Publication Data

US 2021/0258717 A1    Aug. 19, 2021

Related U.S. Application Data

(63) Continuation of application No. 17/082,146, filed on Oct. 28, 2020, which is a continuation of application (Continued)

(51) Int. Cl.
*H04W 4/02* (2018.01)
*H04W 4/029* (2018.01)
(Continued)

(52) U.S. Cl.
CPC ............. *H04W 4/02* (2013.01); *G01C 21/00* (2013.01); *G01C 21/005* (2013.01); *G01C 21/32* (2013.01);

(Continued)

(58) Field of Classification Search
None
See application file for complete search history.

(56) References Cited

U.S. PATENT DOCUMENTS 3,975,941 A    8/1976  Smith
4,719,920 A    1/1988  Alt et al.
(Continued)

FOREIGN PATENT DOCUMENTS

EP    0 874 529 A2    10/1998
EP    1 037 447 A2     9/2000
(Continued)

OTHER PUBLICATIONS

Notice of Allowance for U.S. Appl. No. 16/830,666, dated Jan. 28, 2021.

(Continued)

*Primary Examiner* — Quynh H Nguyen

(57) ABSTRACT

Method and apparatus to analyze and present location information in an easy-to-digest manner are disclosed. In one embodiment, each piece of location information can include a piece of location-designating information and a piece of location-related information. Location-designating information is primarily for identifying location. Location-related information is information related to location-designating information. The location-designating information and the location-related information can be supplied by a mobile device. With the help of location-related information, each piece of location-designating information can be more accurately transformed into a label to help identify a location. The amount of location information can be reduced. All of the location-designating information pertaining to a given area can be consolidated into one piece of location-designating information related to the label. Consolidation of some of the information may not occur if a piece of location-related information changes by more than a preset (Continued)

value. To better present location information in an easy-to-digest manner, location information can be compared to standards. Presentation can be on a display with respect to a reference location.

16 Claims, 31 Drawing Sheets

Related U.S. Application Data

No. 16/354,122, filed on Mar. 14, 2019, now Pat. No. 10,873,828, which is a continuation of application No. 15/634,019, filed on Jun. 27, 2017, now Pat. No. 10,652,690, which is a continuation of application No. 14/874,782, filed on Oct. 5, 2015, now Pat. No. 9,723,442, which is a continuation of application No. 14/519,503, filed on Oct. 21, 2014, now Pat. No. 9,219,988, which is a continuation of application No. 13/933,770, filed on Jul. 2, 2013, now Pat. No. 8,886,220, which is a continuation of application No. 11/705,339, filed on Feb. 10, 2007, now Pat. No. 8,611,920, which is a continuation of application No. 10/397,472, filed on Mar. 26, 2003, now Pat. No. 7,218,938.

(60) Provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(51) Int. Cl.
  *G01C 21/00* (2006.01)
  *G01C 21/32* (2006.01)
  *G06Q 10/10* (2012.01)
  *H04W 64/00* (2009.01)
  *G06F 3/04817* (2022.01)
  *H04L 67/02* (2022.01)
  *H04W 4/021* (2018.01)
  *G06F 3/0482* (2013.01)

(52) U.S. Cl.
  CPC ......... *G06F 3/04817* (2013.01); *G06Q 10/10* (2013.01); *H04L 67/02* (2013.01); *H04W 4/021* (2013.01); *H04W 4/023* (2013.01); *H04W 4/025* (2013.01); *H04W 4/029* (2018.02); *H04W 64/00* (2013.01); *G06F 3/0482* (2013.01)

(56) References Cited

U.S. PATENT DOCUMENTS

| | | |
|---|---|---|
| 5,115,223 A | 5/1992 | Moody |
| 5,337,579 A | 8/1994 | Saia, III et al. |
| 5,347,274 A | 9/1994 | Hassett |
| 5,353,034 A | 10/1994 | Sato et al. |
| 5,384,824 A | 1/1995 | Alvesalo |
| 5,389,934 A | 2/1995 | Kass |
| 5,394,333 A | 2/1995 | Kao |
| 5,400,020 A | 3/1995 | Jones et al. |
| 5,422,814 A | 6/1995 | Sprague et al. |
| 5,422,816 A | 6/1995 | Sprague et al. |
| 5,448,773 A | 9/1995 | McBurney et al. |
| 5,461,365 A | 10/1995 | Schlager et al. |
| 5,470,233 A | 11/1995 | Fruchterman et al. |
| 5,491,486 A | 2/1996 | Welles, II et al. |
| 5,512,902 A | 4/1996 | Guthrie et al. |
| 5,515,858 A | 5/1996 | Myllymaki |
| 5,517,199 A | 5/1996 | DiMattei |
| 5,528,247 A | 6/1996 | Nonami |
| 5,528,518 A | 6/1996 | Bradshaw et al. |
| 5,532,690 A | 7/1996 | Hertel |
| 5,539,748 A | 7/1996 | Raith |
| 5,541,845 A | 7/1996 | Klein |
| 5,543,789 A | 8/1996 | Behr et al. |
| 5,550,551 A | 8/1996 | Alesio |
| 5,563,606 A | 10/1996 | Wang |
| 5,568,119 A | 10/1996 | Schipper et al. |
| 5,570,412 A | 10/1996 | LeBlanc |
| 5,576,716 A | 11/1996 | Sadler |
| 5,592,173 A | 1/1997 | Lau et al. |
| 5,598,460 A | 1/1997 | Tendler |
| 5,604,708 A | 2/1997 | Helms et al. |
| 5,608,909 A | 3/1997 | Atkinson et al. |
| 5,623,260 A | 4/1997 | Jones |
| 5,623,418 A | 4/1997 | Rostoker |
| 5,627,517 A | 5/1997 | Theimer et al. |
| 5,629,678 A | 5/1997 | Gargano et al. |
| 5,633,874 A | 5/1997 | Diachina et al. |
| 5,650,770 A | 7/1997 | Schlager et al. |
| 5,652,570 A | 7/1997 | Lepkofker |
| 5,673,692 A | 10/1997 | Schulze et al. |
| 5,686,888 A | 11/1997 | Welles, II et al. |
| 5,710,551 A | 1/1998 | Ridgeway |
| 5,712,619 A | 1/1998 | Simkin |
| 5,731,757 A | 3/1998 | Layson, Jr. |
| 5,731,788 A | 3/1998 | Reeds |
| 5,742,233 A | 4/1998 | Hoffman et al. |
| 5,751,245 A | 5/1998 | Janky et al. |
| 5,771,001 A | 6/1998 | Cobb |
| 5,771,455 A | 6/1998 | Kennedy, III et al. |
| 5,774,876 A | 6/1998 | Woolley et al. |
| 5,786,789 A | 7/1998 | Janky |
| 5,797,091 A | 8/1998 | Clise et al. |
| 5,806,018 A | 9/1998 | Smith et al. |
| 5,808,565 A | 9/1998 | Matta et al. |
| RE35,920 E | 10/1998 | Sorden et al. |
| 5,825,283 A | 10/1998 | Camhi |
| 5,826,195 A | 10/1998 | Westerlage et al. |
| 5,828,953 A | 10/1998 | Kawase |
| 5,835,907 A | 11/1998 | Newman |
| 5,841,352 A | 11/1998 | Prakash |
| 5,844,862 A | 12/1998 | Cocatre-Zilgien |
| 5,850,196 A | 12/1998 | Mowers |
| 5,852,775 A | 12/1998 | Hidary |
| 5,861,841 A | 1/1999 | Gildea et al. |
| 5,864,315 A | 1/1999 | Welles, II et al. |
| 5,883,594 A | 3/1999 | Lau |
| 5,889,770 A | 3/1999 | Jokiaho et al. |
| 5,892,454 A | 4/1999 | Schipper et al. |
| 5,894,266 A | 4/1999 | Wood, Jr. et al. |
| 5,902,347 A | 5/1999 | Backman et al. |
| 5,905,461 A | 5/1999 | Neher |
| 5,910,799 A | 6/1999 | Carpenter et al. |
| 5,913,078 A | 6/1999 | Kimura et al. |
| 5,917,433 A | 6/1999 | Keillor et al. |
| 5,918,180 A | 6/1999 | Dimino |
| 5,928,309 A | 7/1999 | Korver et al. |
| 5,938,721 A | 8/1999 | Dussell et al. |
| 5,940,004 A | 8/1999 | Fulton |
| 5,948,040 A | 9/1999 | DeLorme et al. |
| 5,948,043 A | 9/1999 | Mathis |
| 5,949,812 A | 9/1999 | Turney et al. |
| 5,950,125 A | 9/1999 | Buhrmann et al. |
| 5,959,575 A | 9/1999 | Abbott |
| 5,959,577 A | 9/1999 | Fan et al. |
| 5,963,130 A | 10/1999 | Schlager et al. |
| 5,982,285 A | 11/1999 | Bueche et al. |
| 5,982,807 A | 11/1999 | Snell |
| 5,983,108 A | 11/1999 | Kennedy, III et al. |
| 5,983,158 A | 11/1999 | Suzuki et al. |
| 5,991,690 A | 11/1999 | Murphy |
| 5,995,849 A | 11/1999 | Williams et al. |
| 6,002,363 A | 12/1999 | Krasner |
| 6,002,982 A | 12/1999 | Fry |
| 6,009,319 A | 12/1999 | Khullar et al. |
| 6,013,007 A | 1/2000 | Root et al. |
| 6,014,080 A | 1/2000 | Layson, Jr. |

(56) References Cited

U.S. PATENT DOCUMENTS

| | | | |
|---|---|---|---|
| 6,014,090 A | 1/2000 | Rosen et al. |
| 6,014,628 A | 1/2000 | Kovarik, Jr. |
| 6,018,704 A | 1/2000 | Kohli et al. |
| 6,023,241 A | 2/2000 | Clapper |
| 6,031,496 A | 2/2000 | Kuittinen et al. |
| 6,032,051 A | 2/2000 | Hall et al. |
| 6,034,622 A | 3/2000 | Levine |
| 6,052,646 A | 4/2000 | Kirkhart et al. |
| 6,052,696 A | 4/2000 | Euler et al. |
| 6,054,928 A | 4/2000 | Lemelson et al. |
| 6,064,336 A | 5/2000 | Krasner |
| 6,067,018 A | 5/2000 | Skelton et al. |
| 6,067,044 A | 5/2000 | Whelan et al. |
| 6,067,082 A | 5/2000 | Enmei |
| 6,072,396 A | 6/2000 | Gaukel |
| 6,075,987 A | 6/2000 | Camp, Jr. et al. |
| 6,078,290 A | 6/2000 | McBurney et al. |
| 6,083,248 A | 7/2000 | Thompson |
| 6,083,353 A | 7/2000 | Alexander, Jr. |
| 6,085,090 A | 7/2000 | Yee et al. |
| 6,094,168 A | 7/2000 | Duffett-Smith et al. |
| 6,094,642 A | 7/2000 | Stephenson et al. |
| 6,100,670 A | 8/2000 | Levesque |
| 6,100,806 A | 8/2000 | Gaukel |
| 6,101,710 A | 8/2000 | Selinger et al. |
| 6,104,334 A | 8/2000 | Allport |
| 6,111,538 A | 8/2000 | Schuchman et al. |
| 6,111,540 A | 8/2000 | Krasner |
| 6,115,595 A | 9/2000 | Rodal et al. |
| 6,121,921 A | 9/2000 | Ishigaki |
| 6,125,325 A | 9/2000 | Kohli et al. |
| 6,131,067 A | 10/2000 | Girerd et al. |
| 6,140,863 A | 10/2000 | Fujisawa |
| 6,140,957 A | 10/2000 | Wilson et al. |
| 6,141,570 A | 10/2000 | O'Neill, Jr. et al. |
| 6,144,303 A | 11/2000 | Federman |
| 6,148,280 A | 11/2000 | Kramer |
| 6,154,422 A | 11/2000 | Shinkawa et al. |
| 6,163,696 A | 12/2000 | Bi et al. |
| 6,169,902 B1 | 1/2001 | Kawamoto |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,204,807 B1 | 3/2001 | Odagiri et al. |
| 6,208,934 B1 | 3/2001 | Bechtolsheim et al. |
| 6,212,133 B1 | 4/2001 | McCoy et al. |
| 6,225,944 B1 | 5/2001 | Hayes |
| 6,226,622 B1 | 5/2001 | Dabbiere |
| 6,231,519 B1 | 5/2001 | Blants et al. |
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 | 6/2001 | Hsu et al. |
| 6,246,376 B1 | 6/2001 | Bork et al. |
| 6,252,543 B1 | 6/2001 | Camp |
| 6,252,544 B1 | 6/2001 | Hoffberg |
| 6,259,944 B1 | 7/2001 | Margulis et al. |
| 6,263,280 B1 | 7/2001 | Stingone, Jr. |
| 6,266,612 B1 | 7/2001 | Dussell et al. |
| 6,272,457 B1 | 8/2001 | Ford et al. |
| 6,278,936 B1 | 8/2001 | Jones |
| 6,281,797 B1 | 8/2001 | Forster et al. |
| 6,282,362 B1 | 8/2001 | Murphy et al. |
| 6,282,495 B1 | 8/2001 | Kirkhart et al. |
| 6,285,314 B1 | 9/2001 | Nagatsuma et al. |
| 6,289,464 B1 | 9/2001 | Wecker et al. |
| 6,292,687 B1 | 9/2001 | Lowell et al. |
| 6,298,306 B1 | 10/2001 | Suarez et al. |
| 6,300,875 B1 | 10/2001 | Schafer |
| 6,302,844 B1 | 10/2001 | Walker et al. |
| 6,304,467 B1 | 10/2001 | Nebrigic |
| 6,314,308 B1 | 11/2001 | Sheynblat et al. |
| 6,315,719 B1 | 11/2001 | Rode et al. |
| 6,317,049 B1 | 11/2001 | Toubia et al. |
| 6,321,091 B1 | 11/2001 | Holland |
| 6,321,158 B1 | 11/2001 | DeLorme et al. |
| 6,323,807 B1 | 11/2001 | Golding et al. |
| 6,324,213 B1 | 11/2001 | Harrison |
| 6,327,533 B1 | 12/2001 | Chou |
| 6,330,149 B1 | 12/2001 | Burrell |
| 6,331,817 B1 | 12/2001 | Goldberg |
| 6,331,825 B1 | 12/2001 | Ladner et al. |
| 6,339,397 B1 | 1/2002 | Baker |
| 6,340,928 B1 | 1/2002 | McCurdy |
| 6,342,847 B1 | 1/2002 | Archuleta et al. |
| 6,349,257 B1 | 2/2002 | Liu et al. |
| 6,353,390 B1 | 3/2002 | Beri et al. |
| 6,353,798 B1 | 3/2002 | Green et al. |
| 6,356,836 B1 | 3/2002 | Adolph |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,366,871 B1 | 4/2002 | Geva |
| 6,373,430 B1 | 4/2002 | Beason et al. |
| 6,377,810 B1 | 4/2002 | Geiger et al. |
| 6,384,724 B1 | 5/2002 | Landais |
| 6,388,612 B1 | 5/2002 | Neher |
| 6,393,346 B1 | 5/2002 | Keith et al. |
| 6,404,352 B1 | 6/2002 | Ichikawa et al. |
| 6,407,698 B1 | 6/2002 | Ayed |
| 6,411,892 B1 | 6/2002 | Van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,430,602 B1 | 8/2002 | Kay et al. |
| 6,433,732 B1 | 8/2002 | Dutta et al. |
| 6,434,396 B1 * | 8/2002 | Rune ............... H04W 68/10 455/561 |
| 6,437,692 B1 | 8/2002 | Petite et al. |
| 6,441,778 B1 | 8/2002 | Durst et al. |
| 6,442,380 B1 | 8/2002 | Mohindra |
| 6,442,391 B1 | 8/2002 | Johansson et al. |
| 6,443,890 B1 | 9/2002 | Schulze et al. |
| 6,445,937 B1 | 9/2002 | daSilva |
| 6,453,237 B1 | 9/2002 | Fuchs et al. |
| 6,463,272 B1 | 10/2002 | Wallace et al. |
| 6,466,821 B1 | 10/2002 | Pianca et al. |
| 6,469,639 B2 | 10/2002 | Tanenhaus et al. |
| 6,478,736 B1 | 11/2002 | Mault |
| 6,484,034 B1 | 11/2002 | Tsunehara et al. |
| 6,496,775 B2 | 12/2002 | McDonald, Jr. et al. |
| 6,501,429 B2 | 12/2002 | Nakamura et al. |
| 6,505,048 B1 | 1/2003 | Moles et al. |
| 6,505,049 B1 | 1/2003 | Dorenbosch |
| 6,512,456 B1 | 1/2003 | Taylor, Jr. |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,529,822 B1 | 3/2003 | Millington et al. |
| 6,544,193 B2 | 4/2003 | Abreu |
| 6,552,652 B2 | 4/2003 | Beken |
| 6,553,310 B1 | 4/2003 | Lopke |
| 6,553,336 B1 | 4/2003 | Johnson et al. |
| 6,559,620 B2 | 5/2003 | Zhou et al. |
| 6,560,463 B1 | 5/2003 | Santhoff |
| 6,569,094 B2 | 5/2003 | Suzuki et al. |
| 6,571,193 B1 | 5/2003 | Unuma et al. |
| 6,579,231 B1 | 6/2003 | Phipps |
| 6,579,844 B1 | 6/2003 | Morrison et al. |
| 6,611,688 B1 | 8/2003 | Raith |
| 6,616,593 B1 | 9/2003 | Elliott et al. |
| 6,625,437 B1 | 9/2003 | Jampolsky et al. |
| 6,630,885 B2 | 10/2003 | Hardman et al. |
| 6,640,085 B1 | 10/2003 | Chatzipetros et al. |
| 6,650,907 B1 | 11/2003 | Kamperschroer et al. |
| 6,661,372 B1 | 12/2003 | Girerd et al. |

(56) References Cited

U.S. PATENT DOCUMENTS

| | | |
|---|---|---|
| 6,679,071 B1 | 1/2004 | Storey et al. |
| 6,696,982 B2 | 2/2004 | Yoshioka et al. |
| 6,697,103 B1 | 2/2004 | Fernandez et al. |
| 6,697,730 B2 | 2/2004 | Dickerson |
| 6,714,158 B1 | 3/2004 | Underbrink et al. |
| 6,714,791 B2 | 3/2004 | Friedman |
| 6,721,542 B1 | 4/2004 | Anttila et al. |
| 6,737,989 B2 | 5/2004 | Flick |
| 6,741,927 B2 | 5/2004 | Jones |
| 6,747,675 B1 | 6/2004 | Abbott et al. |
| 6,748,318 B1 | 6/2004 | Jones |
| 6,788,766 B2 | 9/2004 | Logan |
| 6,801,853 B2 | 10/2004 | Workman |
| 6,804,606 B2 | 10/2004 | Jones |
| 6,819,269 B2 | 11/2004 | Flick |
| 6,825,767 B2 | 11/2004 | Humbard |
| 6,832,093 B1 | 12/2004 | Ranta |
| 6,847,892 B2 | 1/2005 | Zhou et al. |
| 6,856,804 B1 | 2/2005 | Ciotta |
| 6,856,807 B1 | 2/2005 | Raith |
| 6,865,385 B1 | 3/2005 | Kohda et al. |
| 6,876,862 B1 | 4/2005 | Tanaka |
| 6,888,879 B1 | 5/2005 | Lennen |
| 6,937,900 B1 | 8/2005 | Pianca et al. |
| 6,952,645 B1 | 10/2005 | Jones |
| 6,975,941 B1 | 12/2005 | Lau et al. |
| 6,980,813 B2 | 12/2005 | Mohi et al. |
| 6,980,826 B2 | 12/2005 | Yamaguchi |
| 6,997,882 B1 | 2/2006 | Parker et al. |
| 7,003,273 B1 | 2/2006 | Shimanuki et al. |
| 7,010,144 B1 | 3/2006 | Davis et al. |
| 7,071,842 B1 | 7/2006 | Brady, Jr. |
| 7,085,253 B2 | 8/2006 | Yang |
| 7,110,773 B1 | 9/2006 | Wallace et al. |
| 7,136,832 B2 | 11/2006 | Li et al. |
| 7,187,278 B2 | 3/2007 | Biffar |
| 7,212,829 B1 | 5/2007 | Lau et al. |
| 7,218,938 B1 | 5/2007 | Lau et al. |
| 7,253,731 B2 | 8/2007 | Joao |
| 7,308,272 B1 | 12/2007 | Wortham |
| 7,321,774 B1 | 1/2008 | Lau et al. |
| 7,325,061 B2 | 1/2008 | Haruki |
| 7,366,522 B2 | 4/2008 | Thomas |
| 7,375,682 B1 | 5/2008 | Tester et al. |
| 7,403,972 B1 | 7/2008 | Lau et al. |
| 7,482,920 B2 | 1/2009 | Joao |
| 7,498,870 B2 | 3/2009 | Mair et al. |
| 7,539,557 B2 | 5/2009 | Yamauchi |
| 7,663,502 B2 | 2/2010 | Breed |
| 7,809,377 B1 | 10/2010 | Lau et al. |
| 7,905,832 B1 | 3/2011 | Lau et al. |
| 7,953,809 B2 | 5/2011 | Lau et al. |
| 8,131,326 B2 | 3/2012 | Persico |
| 8,176,135 B2 | 5/2012 | Lau et al. |
| 8,285,484 B1 | 10/2012 | Lau et al. |
| 8,301,158 B1 | 10/2012 | Thomas |
| 8,447,822 B2 | 5/2013 | Lau et al. |
| 8,611,920 B2 | 12/2013 | Lau et al. |
| 8,620,343 B1 | 12/2013 | Lau et al. |
| 8,700,050 B1 | 4/2014 | Thomas |
| 8,725,165 B2 | 5/2014 | Lau et al. |
| 8,753,273 B1 | 6/2014 | Lau et al. |
| 8,868,103 B2 | 10/2014 | Thomas |
| 8,886,220 B2 | 11/2014 | Lau et al. |
| 8,975,941 B2 | 3/2015 | Zierhofer |
| 9,049,571 B2 | 6/2015 | Lau et al. |
| 9,074,903 B1 | 7/2015 | Lau et al. |
| 9,082,103 B2 | 7/2015 | Breed |
| 9,182,238 B2 | 11/2015 | Lau et al. |
| 9,219,988 B2 | 12/2015 | Lau et al. |
| 9,456,350 B2 | 9/2016 | Lau et al. |
| 9,596,579 B2 | 3/2017 | Lau et al. |
| 9,706,374 B2 | 7/2017 | Lau et al. |
| 9,723,442 B2 | 8/2017 | Lau et al. |
| 9,759,817 B2 | 9/2017 | Lau et al. |
| 9,769,630 B2 | 9/2017 | Lau et al. |
| 9,930,503 B2 | 3/2018 | Lau et al. |
| 9,998,886 B2 | 6/2018 | Lau et al. |
| 10,034,150 B2 | 7/2018 | Lau et al. |
| 10,152,876 B2 | 12/2018 | Joao |
| 10,327,115 B2 | 6/2019 | Lau et al. |
| 10,356,568 B2 | 7/2019 | Lau et al. |
| 10,516,975 B2 | 12/2019 | Lau et al. |
| 10,609,516 B2 | 3/2020 | Thomas et al. |
| 10,614,408 B2 | 4/2020 | Lau et al. |
| 10,628,783 B2 | 4/2020 | Lau et al. |
| 10,652,690 B2 | 5/2020 | Lau et al. |
| 10,664,789 B2 | 5/2020 | Lau et al. |
| 10,715,970 B2 | 7/2020 | Lau et al. |
| 10,761,214 B2 | 9/2020 | Lau et al. |
| 10,827,298 B2 | 11/2020 | Lau et al. |
| 10,848,932 B2 | 11/2020 | Lau et al. |
| 10,873,828 B2 | 12/2020 | Lau et al. |
| 11,032,677 B2 | 6/2021 | Lau et al. |
| 11,041,960 B2 | 6/2021 | Lau et al. |
| 11,054,527 B2 | 7/2021 | Lau et al. |
| 11,067,704 B2 | 7/2021 | Lau et al. |
| 11,238,398 B2 | 2/2022 | Lau et al. |
| 11,249,196 B2 | 2/2022 | Lau et al. |
| 11,308,441 B2 | 4/2022 | Lau et al. |
| 2001/0006891 A1 | 7/2001 | Cho |
| 2001/0020202 A1 | 9/2001 | Obradovich et al. |
| 2001/0020204 A1 | 9/2001 | Runyon et al. |
| 2001/0022558 A1 | 9/2001 | Karr, Jr. et al. |
| 2001/0023448 A1 | 9/2001 | Hanhan |
| 2001/0026240 A1 | 10/2001 | Neher |
| 2001/0027378 A1 | 10/2001 | Tennison et al. |
| 2001/0027384 A1 | 10/2001 | Schulze et al. |
| 2001/0027525 A1 | 10/2001 | Gamlin |
| 2001/0028304 A1 | 10/2001 | I'Anson et al. |
| 2001/0041554 A1 | 11/2001 | Rowell |
| 2001/0044299 A1 | 11/2001 | Sandegren |
| 2001/0044332 A1 | 11/2001 | Yamada et al. |
| 2001/0047125 A1 | 11/2001 | Quy |
| 2001/0052849 A1 | 12/2001 | Jones, Jr. |
| 2001/0053699 A1 | 12/2001 | McCrady et al. |
| 2002/0000916 A1 | 1/2002 | Richards |
| 2002/0000930 A1 | 1/2002 | Crowson et al. |
| 2002/0008661 A1 | 1/2002 | McCall et al. |
| 2002/0015439 A1 | 2/2002 | Kohli et al. |
| 2002/0016173 A1 | 2/2002 | Hunzinger |
| 2002/0027507 A1 | 3/2002 | Yarin et al. |
| 2002/0028988 A1 | 3/2002 | Suzuki et al. |
| 2002/0036593 A1 | 3/2002 | Ying |
| 2002/0038182 A1 | 3/2002 | Wong et al. |
| 2002/0047649 A1 | 4/2002 | Fregoso et al. |
| 2002/0049742 A1 | 4/2002 | Chan et al. |
| 2002/0050945 A1 | 5/2002 | Tsukishima et al. |
| 2002/0052794 A1 | 5/2002 | Bhadra |
| 2002/0055362 A1 | 5/2002 | Aoyama |
| 2002/0057192 A1 | 5/2002 | Eagleson et al. |
| 2002/0063622 A1 | 5/2002 | Armstrong et al. |
| 2002/0070862 A1 | 6/2002 | Francis et al. |
| 2002/0071677 A1* | 6/2002 | Sumanaweera .... H04N 1/00323 707/E17.026 |
| 2002/0077080 A1 | 6/2002 | Greene |
| 2002/0087260 A1 | 7/2002 | Hancock et al. |
| 2002/0087619 A1 | 7/2002 | Tripathi |
| 2002/0092448 A1 | 7/2002 | Park et al. |
| 2002/0094067 A1 | 7/2002 | August |
| 2002/0099567 A1 | 7/2002 | Joao |
| 2002/0111171 A1 | 8/2002 | Boesch et al. |
| 2002/0111819 A1 | 8/2002 | Li et al. |
| 2002/0115450 A1 | 8/2002 | Muramatsu |
| 2002/0115453 A1 | 8/2002 | Poulin et al. |
| 2002/0116080 A1 | 8/2002 | Birnbach et al. |
| 2002/0119770 A1 | 8/2002 | Twitchell, Jr. et al. |
| 2002/0119789 A1 | 8/2002 | Friedman |
| 2002/0120394 A1 | 8/2002 | Rayne |
| 2002/0120475 A1 | 8/2002 | Morimoto |
| 2002/0120503 A1 | 8/2002 | Iwayama et al. |
| 2002/0123353 A1 | 9/2002 | Savoie |
| 2002/0138196 A1 | 9/2002 | Polidi et al. |
| 2002/0140081 A1 | 10/2002 | Chou et al. |

(56) References Cited

U.S. PATENT DOCUMENTS

| | | |
|---|---|---|
| 2002/0173910 A1 | 11/2002 | McCall et al. |
| 2002/0177476 A1 | 11/2002 | Chou |
| 2002/0191757 A1 | 12/2002 | Belrose |
| 2002/0193121 A1 | 12/2002 | Nowak et al. |
| 2002/0193996 A1 | 12/2002 | Squibbs et al. |
| 2002/0198003 A1 | 12/2002 | Klapman |
| 2002/0198055 A1 | 12/2002 | Bull et al. |
| 2003/0001775 A1 | 1/2003 | Turner |
| 2003/0003943 A1 | 1/2003 | Bajikar |
| 2003/0009410 A1 | 1/2003 | Ramankutty et al. |
| 2003/0013445 A1 | 1/2003 | Fujiwara et al. |
| 2003/0018430 A1 | 1/2003 | Ladetto et al. |
| 2003/0036389 A1 | 2/2003 | Yen |
| 2003/0036683 A1 | 2/2003 | Kehr et al. |
| 2003/0054827 A1 | 3/2003 | Schmidl et al. |
| 2003/0068605 A1 | 4/2003 | Kullok et al. |
| 2003/0069759 A1 | 4/2003 | Smith |
| 2003/0083011 A1 | 5/2003 | Haller et al. |
| 2003/0083046 A1 | 5/2003 | Mathis |
| 2003/0083814 A1 | 5/2003 | Gronemeyer |
| 2003/0095540 A1 | 5/2003 | Mulligan et al. |
| 2003/0100326 A1 | 5/2003 | Grube et al. |
| 2003/0101225 A1 | 5/2003 | Han et al. |
| 2003/0107514 A1 | 6/2003 | Syrjarinne et al. |
| 2003/0110003 A1 | 6/2003 | Topmiller |
| 2003/0114206 A1 | 6/2003 | Timothy et al. |
| 2003/0151507 A1 | 8/2003 | Andre et al. |
| 2003/0163287 A1 | 8/2003 | Vock et al. |
| 2003/0182052 A1 | 9/2003 | DeLorme |
| 2003/0204132 A1 | 10/2003 | Suzuki et al. |
| 2004/0034470 A1 | 2/2004 | Workman |
| 2004/0046637 A1 | 3/2004 | Wesby Van Swaay |
| 2004/0114731 A1 | 6/2004 | Gillett et al. |
| 2004/0117108 A1 | 6/2004 | Nemeth |
| 2004/0172566 A1 | 9/2004 | Greiger et al. |
| 2004/0180701 A1 | 9/2004 | Livet et al. |
| 2004/0192352 A1 | 9/2004 | Vallstrom et al. |
| 2004/0203352 A1 | 10/2004 | Hall |
| 2004/0204820 A1 | 10/2004 | Diaz |
| 2004/0233065 A1 | 11/2004 | Freeman |
| 2005/0046584 A1 | 3/2005 | Breed |
| 2005/0068169 A1 | 3/2005 | Copley et al. |
| 2005/0250440 A1 | 11/2005 | Zhou et al. |
| 2005/0278063 A1 | 12/2005 | Hersh et al. |
| 2006/0073851 A1 | 4/2006 | Colando et al. |
| 2006/0129691 A1 | 6/2006 | Coffee et al. |
| 2006/0139375 A1 | 6/2006 | Rasmussen et al. |
| 2006/0173444 A1 | 8/2006 | Choy et al. |
| 2006/0211430 A1 | 9/2006 | Persico |
| 2007/0156286 A1 | 7/2007 | Yamauchi |
| 2007/0242131 A1 | 10/2007 | Sanz-Pastor et al. |
| 2008/0021645 A1 | 1/2008 | Lau et al. |
| 2008/0261636 A1 | 10/2008 | Lau et al. |
| 2009/0042540 A1 | 2/2009 | Bodnar et al. |
| 2011/0022533 A1 | 1/2011 | Lau et al. |
| 2011/0223884 A1 | 9/2011 | Lau et al. |
| 2012/0220266 A1 | 8/2012 | Lau et al. |
| 2013/0203388 A1 | 8/2013 | Thomas et al. |
| 2013/0297524 A1 | 11/2013 | Lau et al. |
| 2014/0011524 A1 | 1/2014 | Lau et al. |
| 2014/0067708 A1 | 3/2014 | Lau et al. |
| 2014/0273953 A1 | 9/2014 | Lau et al. |
| 2014/0278084 A1 | 9/2014 | Lau et al. |
| 2014/0296659 A1 | 10/2014 | Lau et al. |
| 2015/0011243 A1 | 1/2015 | Thomas et al. |
| 2015/0038168 A1 | 2/2015 | Thomas et al. |
| 2015/0264576 A1 | 9/2015 | Lau et al. |
| 2016/0025863 A1 | 1/2016 | Lau et al. |
| 2016/0029175 A1 | 1/2016 | Lau et al. |
| 2016/0050533 A1 | 2/2016 | Lau et al. |
| 2017/0013426 A1 | 1/2017 | Lau et al. |
| 2017/0094458 A1 | 3/2017 | Thomas et al. |
| 2017/0111776 A1 | 4/2017 | Lau et al. |
| 2017/0111777 A1 | 4/2017 | Lau et al. |
| 2017/0188208 A1 | 6/2017 | Lau et al. |
| 2017/0295462 A1 | 10/2017 | Lau et al. |
| 2017/0353841 A1 | 12/2017 | Lau et al. |
| 2018/0011201 A1 | 1/2018 | Lau et al. |
| 2018/0027394 A1 | 1/2018 | Lau et al. |
| 2018/0211216 A1 | 7/2018 | Lau et al. |
| 2018/0213372 A1 | 7/2018 | Lau et al. |
| 2018/0255439 A1 | 9/2018 | Lau et al. |
| 2018/0302759 A1 | 10/2018 | Lau et al. |
| 2019/0215643 A1 | 7/2019 | Lau et al. |
| 2020/0064491 A1 | 2/2020 | Lau et al. |
| 2020/0077236 A1 | 3/2020 | Lau et al. |
| 2020/0226542 A1 | 7/2020 | Lau et al. |
| 2020/0242551 A1 | 7/2020 | Lau et al. |
| 2020/0304963 A1 | 9/2020 | Lau et al. |
| 2020/0326429 A1 | 10/2020 | Lau et al. |
| 2020/0355833 A1 | 11/2020 | Lau et al. |
| 2021/0142272 A1 | 5/2021 | Lau et al. |
| 2021/0160651 A1 | 5/2021 | Lau et al. |
| 2021/0223404 A1 | 7/2021 | Lau et al. |
| 2021/0297816 A1 | 9/2021 | Lau et al. |

FOREIGN PATENT DOCUMENTS

| | | |
|---|---|---|
| EP | 1 037 447 A3 | 10/2001 |
| JP | 09251069 A | 9/1997 |
| JP | 11-64482 | 3/1999 |
| JP | 11-258325 | 9/1999 |
| JP | 11-289574 | 10/1999 |
| JP | 11-306491 | 11/1999 |
| JP | 2001344678 A | 12/2001 |
| WO | WO 97/14054 | 4/1997 |
| WO | WO 97/41654 A1 | 11/1997 |
| WO | WO 98/01769 A1 | 1/1998 |
| WO | WO 98/16045 A1 | 4/1998 |
| WO | WO 98/40837 | 9/1998 |
| WO | WO 00/51391 | 12/2000 |
| WO | WO 01/50151 A1 | 7/2001 |
| WO | WO 01/63318 A1 | 8/2001 |
| WO | WO 01/75700 A2 | 10/2001 |
| WO | WO 02/42979 A1 | 5/2002 |
| WO | WO 02/084618 A1 | 10/2002 |
| WO | WO 03/012720 A1 | 2/2003 |

OTHER PUBLICATIONS

Notice of Allowance for U.S. Appl. No. 16/830,666, dated Dec. 2, 2021.
Office Action for U.S. Appl. No. 16/952,170, dated Aug. 24, 2021.
Office Action for U.S. Appl. No. 16/952,170, dated Dec. 14, 2021.
Notice of Allowance for U.S. Appl. No. 16/952,170, dated Jan. 28, 2022.
Office Action for U.S. Appl. No. 16/830,666, dated Mar. 31, 2021.
Office Action for U.S. Appl. No. 16/952, 170, dated Apr. 14, 2021.
Office Action for U.S. Appl. No. 10/397,472 dated Sep. 29, 2006.
Notice of Allowance for U.S. Appl. No. 10/397,472, dated Dec. 6, 2006.
Notice of Allowance for U.S. Appl. No. 10/397,472, dated Feb. 28, 2007.
Notice of Allowance for U.S. Appl. No. 11/705,339, dated Jun. 22, 2012.
Notice of Allowance for U.S. Appl. No. 11/705,339, dated Sep. 7, 2011.
Notice of Allowance for U.S. Appl. No. 11/705,339, dated Apr. 15, 2011.
Notice of Allowance for U.S. Appl. No. 11/705,339, dated Jan. 26, 2011.
Office Action for U.S. Appl. No. 11/705,339, dated Oct. 25, 2010.
Office Action for U.S. Appl. No. 11/705,339, dated Jul. 1, 2010.
Office Action for U.S. Appl. No. 11/705,339, dated Nov. 17, 2009.
Office Action for U.S. Appl. No. 11/705,339, dated Jul. 30, 2009.
Notice of Allowance for U.S. Appl. No. 11/705,339, dated Mar. 29, 2013.
Notice of Allowance for U.S. Appl. No. 11/705,339, dated Aug. 30, 2013.
Office Action for U.S. Appl. No. 13/933,770, dated Nov. 14, 2013.

(56) References Cited

OTHER PUBLICATIONS

Notice of Allowance for U.S. Appl. No. 13/933,770, dated Mar. 7, 2014.
Notice of Allowance for U.S. Appl. No. 13/933,770, dated Jun. 10, 2014.
Notice of Allowance for U.S. Appl. No. 13/933,770, dated Sep. 19, 2014.
Office Action for U.S. Appl. No. 14/519,503, dated Apr. 3, 2015.
Notice of Allowance ffor U.S. Appl. No. 14/519,503, dated Jun. 17, 2015.
Notice of Allowance ffor U.S. Appl. No. 14/519,503, dated Aug. 26, 2015.
Non-Final Office Action for U.S. Appl. No. 14/874,782, dated Jan. 21, 2016.
Notice of Allowance for U.S. Appl. No. 14/874,782, dated Apr. 8, 2016.
Notice of Allowance for U.S. Appl. No. 14/874,782, dated Jul. 8, 2016.
Notice of Allowance for U.S. Appl. No. 14/874,782, dated Nov. 14, 2016.
Notice of Allowance for U.S. Appl. No. 14/874,782, dated Mar. 29, 2017.
Notice of Allowance for U.S. Appl. No. 14/874,782, dated May 11, 2017.
Office Action for U.S. Appl. No. 14/923,882, dated Feb. 5, 2016.
Office Action for U.S. Appl. No. 14/923,882, dated Jul. 7, 2016.
Office Action for U.S. Appl. No. 14/923,882, dated Sep. 22, 2016.
Office Action for U.S. Appl. No. 14/923,882, dated Mar. 10, 2017.
Office Action for U.S. Appl. No. 14/923,882, dated May 17, 2017.
Office Action for U.S. Appl. No. 14/923,882, dated Jul. 3, 2017.
Office Action for U.S. Appl. No. 14/923,882, dated Sep. 26, 2017.
Office Action for U.S. Appl. No. 14/923,882, dated Nov. 28, 2017.
Notice of Allowance for U.S. Appl. No. 14/923,882, dated Mar. 22, 2018.
Notice of Allowance for U.S. Appl. No. 14/923,882, dated Jul. 25, 2018.
Office Action for U.S. Appl. No. 14/923,882, dated Jan. 29, 2019.
Office Action for U.S. Appl. No. 14/923,882, dated May 1, 2019.
Notice of Allowance for U.S. Appl. No. 14/923,882, dated Jan. 23, 2020.
Notice of Allowance for U.S. Appl. No. 14/923,882, dated Aug. 5, 2020.
Notice of Allowance for U.S. Appl. No. 14/923,882, dated Jan. 17, 2019.
Office Action for U.S. Appl. No. 15/634,019, dated Jul. 10, 2018.
Notice of Allowance for U.S. Appl. No. 15/634,019, dated Aug. 16, 2019.
Notice of Allowance for U.S. Appl. No. 15/634,019, dated Oct. 28, 2019.
Notice of Allowance for U.S. Appl. No. 15/634,019, dated Nov. 12, 2019.
Notice of Allowance for U.S. Appl. No. 15/634,019, dated Jan. 6, 2020.
Notice of Allowance for U.S. Appl. No. 15/634,019, dated Mar. 23, 2020.
Office Action for U.S. Appl. No. 16/354,122, dated Oct. 28, 2019.
Notice of Allowance for U.S. Appl. No. 16/354,122, dated Jan. 9, 2020.
Notice of Allowance for U.S. Appl. No. 16/354,122, dated Apr. 20, 2020.
Notice of Allowance for U.S. Appl. No. 16/354,122, dated Jun. 2, 2020.
Notice of Allowance for U.S. Appl. No. 16/354,122, dated Jul. 24, 2020.
Notice of Allowance for U.S. Appl. No. 16/354,122, dated Sep. 3, 2020.
Office Action for U.S. Appl. No. 10/397,637, dated Sep. 29, 2006.
Notice of Allowance for U.S. Appl. No. 10/397,637, dated Jan. 22, 2007.
Office Action for U.S. Appl. No. 11/732,581, dated Jan. 20, 2010.
Notice of Allowance for U.S. Appl. No. 11/732,581, dated Jun. 16, 2010.
Non-Final Office Action for U.S. Appl. No. 12/924,470, dated May 4, 2012.
Notice of Allowance for U.S. Appl. No. 12/924,470, dated Nov. 23, 2012.
Notice of Allowance for U.S. Appl. No. 12/924,470, dated Mar. 20, 2013.
Notice of Allowance for U.S. Appl. No. 12/924,470, dated Aug. 29, 2013.
Notice of Allowance for U.S. Appl. No. 12/924,470, dated Dec. 19, 2013.
Notice of Allowance for U.S. Appl. No. 13/802,641, dated Jan. 17, 2018.
Notice of Allowance for U.S. Appl. No. 13/802,641, dated Aug. 16, 2017.
Notice of Allowance for U.S. Appl. No. 13/802,641, dated Apr. 27, 2017.
Notice of Allowance for U.S. Appl. No. 13/802,641, dated Jan. 13, 2017.
Notice of Allowance for U.S. Appl. No. 13/802,641, dated Sep. 29, 2016.
Notice of Allowance for U.S. Appl. No. 13/802,641, dated Jun. 16, 2016.
Notice of Allowance for U.S. Appl. No. 13/802,641, dated Mar. 3, 2016.
Notice of Allowance for U.S. Appl. No. 13/802,641, dated Nov. 9, 2015.
Notice of Allowance for U.S. Appl. No. 13/802,641, dated Jul. 8, 2015.
Notice of Allowance for U.S. Appl. No. 13/802,641, dated Jan. 21, 2015.
Notice of Allowance for U.S. Appl. No. 13/802,641, dated Aug. 18, 2014.
Office Action for U.S. Appl. No. 13/802,641, dated Mar. 27, 2014.
U.S. Appl. No. 13/802,641, filed Mar. 13, 2013.
Office Action for U.S. Appl. No. 13/802,641, dated Oct. 24, 2018.
Office Action for U.S. Appl. No. 13/802,641, dated Jun. 7, 2019.
Notice of Allowance for U.S. Appl. No. 13/802,641, dated Sep. 16, 2019.
Notice of Allowance for U.S. Appl. No. 13/802,641, dated Jan. 6, 2020.
U.S. Appl. No. 13/802,624, filed Mar. 13, 2013.
Office Action for U.S. Appl. No. 13/802,624, dated Nov. 18, 2014.
Office Action for U.S. Appl. No. 13/802,624, dated May 26, 2015.
Office Action for U.S. Appl. No. 15/933,578, dated Apr. 12, 2019.
Office Action for U.S. Appl. No. 15/933,578, dated Aug. 7, 2019.
Notice of Allowance for U.S. Appl. No. 15/933,578, dated Dec. 9, 2019.
Notice of Allowance for U.S. Appl. No. 15/933,578, dated Feb. 3, 2020.
Notice of Allowance for U.S. Appl. No. 16/830,666, dated Oct. 13, 2020.
Office Action for U.S. Appl. No. 10/397,640, dated Oct. 24, 2006.
Notice of Allowance for U.S. Appl. No. 10/397,640, dated Nov. 13, 2007.
Notice of Allowance for U.S. Appl. No. 10/397,640, dated Mar. 23, 2007.
Office Action for U.S. Appl. No. 11/800,126, dated Sep. 29, 2011.
Office Action for U.S. Appl. No. 11/800,126, dated Jul. 21, 2010.
Office Action for U.S. Appl. No. 11/800,126, dated Mar. 18, 2010.
Restriction Requirement for U.S. Appl. No. 11/800,126, dated Dec. 10, 2009.
Office Action for U.S. Appl. No. 11/800,126, dated Oct. 15, 2012.
Office Action for U.S. Appl. No. 11/800,126, dated May 7, 2013.
Notice of Allowance for U.S. Appl. No. 11/800,126, dated Aug. 29, 2013.
Notice of Allowance for U.S. Appl. No. 11/800,126, dated Nov. 20, 2013.
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/svs/svs352c22.html).

(56) References Cited

OTHER PUBLICATIONS

"3G Mobile Internet Revolution, . . . only with Location Based Services!" pp. 1, (downloaded Aug. 10, 2002: http://webhome.idirect.com/~dental/3glocator/home.htm).

"Airline Cargo Containers," Case Study, RJI Incorporated, webpages, pp. 1-2 (downloaded Mar. 16, 2002: www.rji.cc/casestudies/airlinecargocontainers.html).

"Airline Food Carts," Case Study, RJI Incorporated, webpages, pp. 1-2 (downloaded Mar. 16, 2002: www.rji.cc/casestudies/airlinefoodcarts.html).

"An Introduction to SnapTrack Server-Aided GPS Technology," SnapTrack Inc., Apr. 3, 2007.

Archived a page entitled "Money-Back Guarantee Policy" from fedex.com, archived by the Internet Archive on Aug. 17, 2000.

"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).

Bahl et al. "RADAR: An In-Building RF-based User Location and Tracking System," *Proc. of the IEEE Conf. on Comp. Comm., INFOCOM2000, 19th Annual Joint Conf. of the IEEE Computer and Communications Societies*, Mar. 2000, 10 pgs.

Benefon Esc! Owner's Manual, Publication No. YZ2400-4*, © Benefon Oyj, 2002, pp. 169.

"Carrier and end-user applications for wireless location systems," TruePosition, Inc., http://www.trueposition.com/spie_app.htm, downloaded, Jul. 30, 2000, pp. 1-7.

Capozza, P.T., et al. "A single-chip narrow-band frequency domain excisor for a Global Positioning System (GPS) receiver," IEEE Journal of Solid-State Circuits, vol. 35, Issue 3, Mar. 2000, pp. 401-411.

"Danger -Products" and "Hiptop Communicator Brochure," Danger, Inc., downloaded Oct. 26, 2002: www.danger.com/products.php).

"Developing a GPSs for the Global Supply Chain," Aberdeen Group, Inc., Executive White Paper, Jun. 2002.

"Devices for Text Messages in Deutsche Telekom's fixed network have already found their way into many households," Deutsche Telekom AG, Press Release, Mar. 13, 2002, pp. 1-2.

"Digital/Analog Compass Sensors" and "1655 Digital Compass Sensor," webpages, The Robson Company, Inc., pp. 1-2 (downloaded Apr. 11, 2002: www.dinsmoresensors.com/index.html).

"EarthTrack™ Vehicle Tracking Systems," Outfitter Satellite, Inc., 1998 (downloaded Jan. 22, 2000).

"Enhanced Tracking," United Parcel Service of America, Inc. (UPS), webpages, pp. 1-2 (downloaded Jun. 1, 2002: www.ups.com/myupsinfo/info/etrack?pnav=stdservice).

"Fleet Management Systems-Asset Tracking Devices," Axiom Navigation Inc., 2000-2001 (downloaded Oct. 19, 2002: www.axiomnav.com/Prod_Systems/prod_system.asp).

"Frozen Food Warehouse," Case Study, RJI Incorporated, webpages, pp. 1-3 (downloaded Mar. 16, 2002: www.rji.ee/casestudies/frozenfoodwarehouse.html).

"FunMail Launches on the NTT DoCoMo i-mode network," FunMail, Press Release, May 1, 2001, pp. 1-2.

Garmin, eTrex® Venture personal navigator™: Owner's Manual and Reference Guide, © 2001 Garmin, pp. 1-68.

"Global Cell Phone Location," Axiom Navigation Inc., 2000-2001 (downloaded Oct. 19, 2002: www.axiomnav.com/Prod_Global/prod_global.asp).

"Global Locating Services," SkyBitz, webpage, p. 1, (downloaded Nov. 15, 2002: www.skybitz.com/services/gls.html).

"GLS Communicator," SkyBitz, webpages, pp. 1-2, (downloaded Nov. 15, 2002: www.skybitz.com/gls/communicator.html).

"Guide to Tracking Info.," Nippon Express, website page. p. 1 (downloaded Jun. 9, 2002: www.nittsu.co.jp/edoc/howtoe.htm).

Heinrichs et al. "Synergies in Handset Architecture," *GPS World*, Mar. 2002, vol. 13, Issue 3, p. 30-39.

Hightower et al. "Location Systems for Ubiquitous Computing," *Computer*, Aug. 2001, vol. 34, Issue 8, p. 57-66.

"Introduction to SMS," by C. Tull of Anywhere YouGo.com, pp. 1-4 (downloaded:www.devx.com/wireless/articles/SMS/SMSintro-asp), Aug. 10, 2002.

"IO Data Develops GPS Adapter for I-Mode Mobile," AsiaBizTech, Sep. 17, 2002, pp. 1-2.

LaMance et al. "Assisted GPS," *GPS World*, Mar. 2002, vol. 13, Issue 3, p. 46-51.

"Locate Networks: Our Service," Locate Networks, webpages, pp. 1-7 (downloaded Sep. 26, 2002: www.locatenetworks.com/).

"MMS phones: Don't believe the hype," CNN.com/SCI-TECH, Aug. 8, 2002, pp. 1-3.

"Mobile Location Based Services: Cell Tracking Devices of People & Thongs . . . ," pp. 1-2, (downloaded Aug. 10, 2002: http://3glocate.com).

"MoniTrack," Case Study, RJI Incorporated, webpages, pp. 1-2 (downloaded Mar. 16, 2002: www.rji.cc/technology/telematic.html).

"my ups.com Benefits," United Parcel Service of America, Inc. (UPS), webpage, p. 1 (downloaded Apr. 13, 2002: www.ups.com/myupsinfo/info/benefits?pnav=stdsservice).

"NavMate® Navigation System," Visteon Corporation, webpage, pp. 1-2 (downloaded Jun. 21, 2002: www.visteon.com/technology/automotive/navmate.html).

"News," SkyBitz, webpages, pp. 1-8, (downloaded Nov. 15, 2002: www.skybitz.com/about/news.html).

"Pakhound: Your Watchdog in the Shipping Industry," website pages, pp. 1-3 (downloaded Jun. 9, 2002: www.pakhound.com/fact.asp).

Palenchar, J. "E911 Update: What Major Carriers Have Planned," *TWICE: This Week in Consumer Electronics*, Oct. 8, 2001, vol. 16, Issue 23, p. 36.

"Parkwatch and Wherenet Unveil the First Amusement Visitor Locating system," ParkWatch, Press Release, Jun. 27, 2000.

"pulver.com's Location Based Services Report," pulver.com, Inc., Oct. 2001, pp. 1-17 (downloaded Jun. 4, 2002: www.pulver.com/lbsreport/lastbsreport.02/oct01.txt).

"Radio Frequency Identification (RFID)," Case Study, RJI Incorporated, webpage, p. 1 (downloaded Mar. 16, 2002: www.rji.cc/technology/rfid.html).

"Real Time Location System (RTLS)," Case Study, RJI Incorporated, webpage, p. 1 (downloaded Mar. 16, 2002: www.rji.cc/technology/rtls.html).

"Real-Time Warehouse Tracking," Case Study, RJI Incorporated, webpages, pp. 1-2 (downloaded Mar. 16, 2002: www.rji.cc/casestudies/rtwarehousetracking.html).

"Savi Reusable Transport Container," Savi Technology, Inc., Apr. 30, 2002, pp. 1-2.

"Send images to i-mode phones," Mobile Media Japan, 2001, pp. 1-3.

"Ski Rental with Auto ID and Tracking," Case Study, RJI Incorporated, webpages, pp. 1-2 (downloaded Mar. 16, 2002: www.rji.cc/casestudies/skirentalcompany.html).

"SnapTrack and SignalSoft Corp. Team Up to Trial Location-based Information Service for GSM Test Group," Press Release, SnapTrack Inc., Dec. 6, 1999.

"SnapTrack Awarded Additional Key Patents for Enhanced GPS System," Press Release, SnapTrack Inc., Jan. 4, 2000.

"Start-up crams single chip with phone, GPS and Bluetooth," CNET Network, Inc. (ZDNET), Mar. 22, 2002 (downloaded: http://news.zdnet.co.uk/story/0,t284-x2107163,00.html).

"Status Icons/Messages," Yahoo! Messenger Help, Yahoo! Inc., 2002, pp. 1-2.

Syrjarinne, J. "Keeping Time with Mobiles," *GPS World*, Jan. 2001, vol. 12, Issue 1, p. 22, 7pgs.

"Technical Applications of Our Current Technology," Aetherwire, webpages, pp. 1-4 (downloaded Mar. 16, 2002: www.aetherwire.com/CDROM/General/appl1.html).

"The Always on Network," Position Paper, Nortel Networks, 2002.

"Theme Park Visitors & Cashless Purchasing," Case Study, RJI Incorporated, webpages, pp. 1-2 (downloaded Mar. 16, 2002: www.rji.cc/casestudies/themepark.html).

"Track Shipments—Detailed Results," FedEx, webpages, pp. 1-2 (downloaded Oct. 29, 2002: www.fedex.com).

(56) References Cited

OTHER PUBLICATIONS

"Track Your FedEx Shipments via Email," FedEx, webpages, pp. 1-2 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"Trimble and Rosum Team to Develop Universal Positioning Technology," Trimble Navigation, Inc., News Release, Feb. 27, 2003.
"Turning Position Into Knowledge," SkyBitz, webpage, p. 1, (downloaded Nov. 15, 2002: www.skybitz.com).
"UPS Package Tracking," United Parcel Service of America, Inc. (UPS), webpages, pp. 1-2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
Van Diggelen et al. "Indoor Gps," *GPS World*, Sep. 2001, vol. 12, Issue 9, p. 50. 5pgs.
"Welcome to Iship, Inc.," iShip, Inc., webpages, pp. 1-2, (downloaded Jun. 9, 2002: www.iship.com/).
"Welcome to Traker Systems," Tracker Systems, webpages, pp. 1-2 (downloaded Jun. 9, 2002: www.trakersystems.com).
"What are Instant Messages?" Yahoo! Messenger Help, Yahoo! Inc., 2002, pp. 1.
"What is "3G" technology?," CNN.com/SCI-TECH, Oct. 22, 2001, pp. 1-3.
"What is a Friend List?" Yahoo! Messenger Help, Yahoo! Inc., 2002, pp. 1.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless GPS Locator for Kids User Guide," Wherify Wireless, Inc., 2003, pp. 1-106.
"Wherify Wireless Location Services," Wherify Wireless, Inc., webpages, pp. 1-5 (downloaded: Mar. 25, 2003: www.wherifywireless.com/prod_watches.htm).
"X-GPS™—Hybrid GPS Location Server Solution," Axiom Navigation Inc., 2000-2001 (downloaded Oct. 19, 2002: www.axiomnav.com/Prod_Global/x-gps.asp).
"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html(through Ztour7.html)).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).
Accelerometers—General Purpose, LP Series, Crossbow Technology, Inc., data sheet, pp. 1-3 (downloaded Apr. 11, 2002: www.xbow.com/Products/Accelerometers.htm).
Bickers, "Eyes in the sky," SafeTzone Technology Corporation, webpages, 2001, pp. 1-3 (downloaded: www.safetzone.com/newsKiosk.asp).
Chertkoff, Rachel, "Vehicle Locator Systems," Pager Technology, pp. 1-2, 1998.
Commercial Uses for LoJack (webpage), LoJack Corporation, downloaded Jan. 22, 2000.
Crossbow Product Guide—Accelerometers, Crossbow Technology, Inc., webpages, pp. 1-3 (downloaded Apr. 11, 2002: www.xbow.com/Products/Accelerometers.htm).
Culler, D. et al., "MICA: The Commercialization of Microsensor Motes," Sensors (Apr. 1, 2002), pp. 1-5.
Darabi et al., "A 2.4-GHz CMOS Transceiver for Bluetooth," IEEE Journal of Solid-State Circuits, vol. 36, No. 12 (Dec. 2001), pp. 2016-2024.

Delphi and MobileAria Demonstrate True Hands Free In-Vehicle Mobile Productivity Services at CES, Press Release, Delphi Automotive Systems, Jan. 8, 2002 (downloaded Apr. 5, 2002: www.delphiauto.com/news/pressRelease/pr6828-01082002).
F. Rivera, "Special Report: Keeping Tabs on Your Teen," 7 News, Boston, Apr. 30, 2002, pp. 1-3-.
FedEx Insight, FedEx, webpages, pp. 1-11 (downloaded Oct. 29, 2002: www.fedex.com).
Fraden, J., Handbook of Modern Sensors: Physics, Designs and Applications, Second Edition, Springer-Verlag (1996), cover, pp. 310-354, 384-431, 458-493, and 513-528.
GPS2000, Omega Research and Development, Inc., webpages, pp. 1-9 (pp. 7-9 pertain to an online tour) (downloaded Jul. 14, 2003: www.gps2000online.com/).
Grimes, et al., "Wireless Magnetoelastic Resonance Sensors: A Critical Review," Sensors, vol. 2 (Jul. 23, 2002), pp. 294-313.
Helfenstein et al., Circuits and Systems for Wireless Communications, Kluwer Academic Publishers (2000), cover pages, pp. 3-7, 9-34, and 37-47.
Hill et al., "System Architecture Directions for Networked Sensors," ACM/ASPLOS-IX (Nov. 2000), 12 pages.
IMVironment, Yahoo! Messenger Yahoo! Inc., 2002, pp. 1-12 (downloaded (including) Oct. 27, 2002: http://help.yahoo.com/help/us/mesg/imv/imv-01.html(through /index5.html).
J.Wrolstad, "Chrysler Claims First With Bluetooth Mobile Phone System," Wireless Newsfactor, Oct. 26, 2001.
K. Hill, "Prada Uses Smart Tags to Personalize Shopping," CRMDaily.com, Apr. 24, 2002., pp. 1-4.
Madou, Marc J., Fundamentals of Microfabrication: the Science of Miniaturization, Second Edition, CRC Press (2002) 139 pages.
K. Miyake, "Sharp to unveil 3G PDA-type cell phone," ITworld.com, Inc., Jan. 11, 2002.
Kleinknecht, William, "Juvenile authorities want satellite tracking for felons," The Star-Ledger of New Jersey, Nov. 18, 1997.
LoadTrak, pp. 1-2 (downloaded Jun. 4, 2002: www.load-trak.com).
Mainwaring et al., "Wireless Sensor Networks for Habitat Monitoring," ACM (Sep. 28, 2002) pp. 88-97.
Marek, "The Unstoppable SnapTrack," Wireless Week, Dec. 18, 2000.
Motorola Consumer Catalog: Pagers (webpage), Motorola, Inc., downloaded Jan. 19, 2000.
My.Roadway! Roadway Express, Inc., webpages, pp. 1-2, (downloaded Jun. 9, 2002: www.quiktrak.roadway.com/cgi-bin/quiktrak).
Package, Dictionary.com, http://dictionary.reference.com/browse/package (last accessed Nov. 6, 2013), 3 pgs.
Packtrack™, PackTrack.com, webpages, pp. 1-2 (downloaded Jun. 9, 2002: www.packtrack.com).
Precision Accelerometers, PCB Piezoelectronics Products—SVS Division, webpages, pp. 1-2 (downloaded Apr. 11, 2002: www.pcb.com/products/svs/index.html).
Rabinowitz and Spilker, Jr., "A New Positioning System Using Television Synchronization Signals," Rosum Corporation, pp. 1-11 (downloaded May 21, 2003).
Rabinowitz and Spilker, Jr., "Positioning Using the ATSC Digital Television Signal," Rosum Corporation Whitepaper, Rosum Corporation (downloaded May 21, 2003).
Razavi, Behzad, RF Microelectronics, Prentice Hall (1998), cover pages, pp. 1-10, and 118-297.
Real Time Locating System, Executive Summary, Technology Systems International, Inc., 2007.
Rofougaran et al., "A Single-Chip 900-MHz Spread-Spectrum Wireless Transceiver in 1-µm CMOS-Part II: Receiver Design," IEEE Journal of Solid-State Circuits, vol. 33, No. 4 (Apr. 1998), pp. 535-547.
Ryan, "Catching up with Dick Tracy," San Francisco Chronicle, news article, Mar. 18, 2002.
SandPiper GPS Receiver, Specification sheet by Axiom Navigation Inc. (www.axiomnav.com) 2006.
Senturia, Stephen D., Microsystem Design, Kluwer Academic Publishers (2001), cover pages, and pp. 3-14.
SiRF Debuts Revolutionary Architecture and Technologies to Further Drive GPS into the Mainstream, SiRF.com, Aug. 16, 1999

(56) References Cited

OTHER PUBLICATIONS (archived Dec. 22, 1999), http://web.archive.org/web/19991222194810/http:/www.sirf.com/as_prss2_3.htm, 4 pgs.
Smart Antenna, Specification sheet by Axiom Navigation Inc. (www.axiomnav.com) 2008.
SnapTrack—Privacy Protection (webpage), SnapTrack Inc., downloaded Jan. 19, 2000.
SnapTrack—Technology at Work (webpage), SnapTrack Inc., downloaded Jan. 19, 2000.
SnapTrack in Action (webpage), SnapTrack Inc., downloaded Jan. 19, 2000.
Steyaert et al., "A 2-V CMOS Cellular Transceiver Front-End," IEEE Journal of Solid-State Circuits, vol. 35, No. 12, Dec. 2000, pp. 1895-1907.
Stilp, Louis A., "Examining the Coming Revolution in Location Services," pp. 1-11, Feb. 1, 2021.
Strom, Stephanie. "A Wild Sleigh Ride at Federal Express," The New York Times, Dec. 20, 1994.
Swift A2 GPS Receiver, Specification sheet by Axiom Navigation Inc. (www.axiomnav.com) 2010.
Swift B2 GPS Receiver, Specification sheet by Axiom Navigation Inc. (www.axiomnav.com) 2010.
TruePosition Virtual Brochure (webpage), TruePosition, Inc., Feb. 1, 2021.
Wong, "Fishers, golfers join the rush to GPS," San Jose Mercury News, news article, Mar. 25, 2002.
Danger Product Overview, Danger, Inc., date unknown, 5 pgs., Feb. 1, 2021.
PCVtrak™ Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "SECURITY—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.
"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express-News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express-News, Apr. 18, 1996, pp. 2, part B.
"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World-Herald, Section Business, p. 4M, Oct. 20, 1996.
"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.
High-Tech System Tracks Offenders—Satellites Watching Criminals, Business Wire, Nov. 14, 1997.
Briefs, Global Positioning & Navigation News, vol. 9, No. 4, Feb. 24, 1999.
Dunkelberger, Lloyd, "Lawmakers question criminal-tracking system," Sarasota Herald-Tribune (Florida), p. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecutityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers 'GPS' Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.
Atwater, Andi, "Proposal seeking 24-hour tracking of all sex offenders," The News-Press (Fort Meyers, FL), pp. 1A, Feb. 20, 2000.
Briefs, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
Briefs, Global Positioning & Navigation News, vol. 9, No. 2, Jan. 27, 1999.
Briefs, Global Positioning & Navigation News, vol. 9, No. 14, Jul. 14, 1999.
Dailey et al. "Automatic Transit Location System," Final Research Report, 55 pgs., Feb. 1996.
Maguire, Jr et al. "SmartBadges: a wearable computer and communication system," codes/CASHE '98, 47 pgs., 1998.
Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.
Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.

(56) References Cited

OTHER PUBLICATIONS

"Car Thieves Take the 'Bait' in Tulsa; Two Suspects Caught Off Guard with on Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express-News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company, "Southwest Newswire, Mar. 21, 1996.
"Automotive GPS Satellite/Safety System Race is on," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
Briefs, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.

* cited by examiner

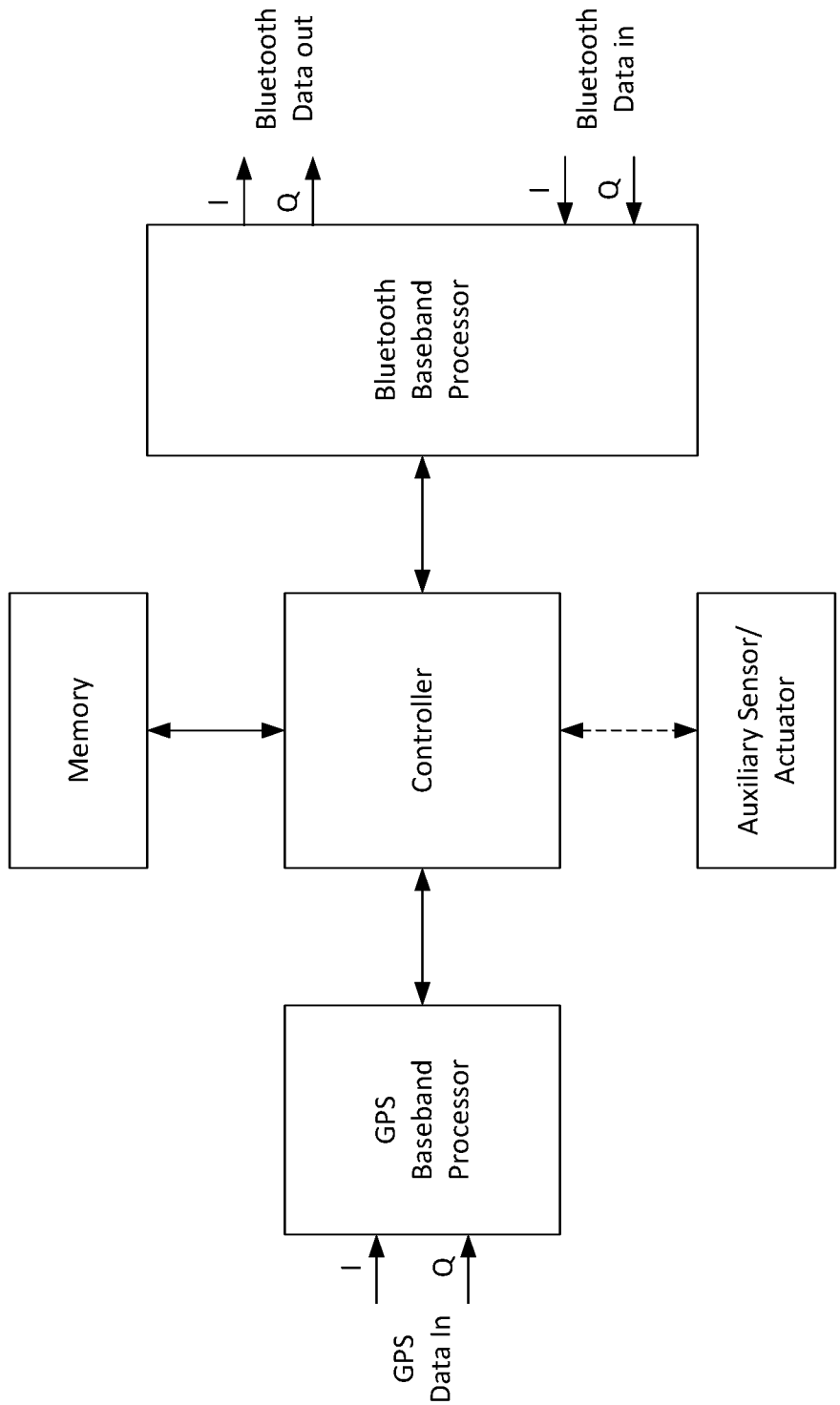

METHOD AND APPARATUS FOR IDENTIFYING AND PRESENTING LOCATION AND LOCATION-RELATED INFORMATION

CROSS REFERENCE TO RELATED APPLICATIONS

This application is a continuation of U.S. patent application Ser. No. 17/082,146, filed Oct. 28, 2020, and entitled "METHOD AND APPARATUS FOR IDENTIFYING AND PRESENTING LOCATION AND LOCATION-RELATED INFORMATION," which is hereby incorporated herein by reference, and which, in turn, is a continuation of U.S. patent application Ser. No. 16/354,122, filed Mar. 14, 2019, now U.S. Pat. No. 10,873,828, and entitled "METHOD AND APPARATUS FOR IDENTIFYING AND PRESENTING LOCATION AND LOCATION-RELATED INFORMATION," which is hereby incorporated herein by reference, and which, in turn, is a continuation of U.S. patent application Ser. No. 15/634,019, filed Jun. 27, 2017, now U.S. Pat. No. 10,652,690, and entitled "METHOD AND APPARATUS FOR IDENTIFYING AND PRESENTING LOCATION AND LOCATION-RELATED INFORMATION," which is hereby incorporated herein by reference, and which, in turn, is a continuation of U.S. patent application Ser. No. 14/874,782, filed Oct. 5, 2015, now U.S. Pat. No. 9,723,442, and entitled "METHOD AND APPARATUS FOR IDENTIFYING AND PRESENTING LOCATION AND LOCATION-RELATED INFORMATION," which is hereby incorporated herein by reference, and which, in turn, is a continuation of U.S. patent application Ser. No. 14/519,503, filed Oct. 21, 2014, now U.S. Pat. No. 9,219,988, and entitled "METHOD AND APPARATUS FOR LOCATION IDENTIFICATION AND PRESENTATION," which is hereby incorporated herein by reference, which, in turn, is a continuation of U.S. patent application Ser. No. 13/933,770, filed Jul. 2, 2013, now U.S. Pat. No. 8,886,220, and entitled "METHOD AND APPARATUS FOR LOCATION IDENTIFICATION," which is hereby incorporated herein by reference, which, in turn, is a continuation of U.S. patent application Ser. No. 11/705,339, filed Feb. 10, 2007, now U.S. Pat. No. 8,611,920, and entitled "METHOD AND APPARATUS FOR LOCATION IDENTIFICATION," which is hereby incorporated herein by reference, which, in turn, is a continuation of U.S. patent application Ser. No. 10/397,472, filed Mar. 26, 2003, now U.S. Pat. No. 7,218,938, and entitled "METHOD AND APPARATUS TO ANALYZE AND PRESENT LOCATION INFORMATION," which is hereby incorporated herein by reference. U.S. patent application Ser. No. 09/797,517, filed Feb. 28, 2001, now U.S. Pat. No. 7,366,522, and entitled "METHOD AND SYSTEM FOR LOCATION TRACKING," is hereby incorporated herein by reference.

The prior application Ser. No. 10/397,472 also claims benefit of: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,473, filed Mar. 26, 2003, now U.S. Pat. No. 6,975,941, and entitled "METHOD AND APPARATUS FOR INTELLIGENT ACQUISITION OF POSITION INFORMATION;" (ii) U.S. patent application Ser. No. 10/397,637, filed Mar. 26, 2003, now U.S. Pat. No. 7,212,829, and entitled "METHOD AND SYSTEM FOR PROVIDING SHIPMENT TRACKING AND NOTIFICATIONS;" (iii) U.S. patent application Ser. No. 10/397,641, filed Mar. 26, 2003, now U.S. Pat. No. 7,905,832, and entitled "METHOD AND SYSTEM FOR PERSONALIZED MEDICAL MONITORING AND NOTIFICATIONS THEREFOR;" (iv) U.S. patent application Ser. No. 10/397,640, filed Mar. 26, 2003, now U.S. Pat. No. 7,321,774, and entitled "INEXPENSIVE POSITION SENSING DEVICE;" (v) U.S. patent application Ser. No. 10/397,474, filed Mar. 26, 2003, now U.S. Pat. No. 7,403,972, and entitled "METHOD AND SYSTEM FOR ENHANCED MESSAGING;" (vi) U.S. patent application Ser. No. 10/397,512, filed Mar. 26, 2003, and entitled "APPLICATIONS OF STATUS INFORMATION FOR INVENTORY MANAGEMENT."

BACKGROUND OF THE INVENTION

GPS (Global Positioning System) has been used extensively for navigation, positioning, and other research applications. It includes a group of satellites transmitting very precise signals. The nominal GPS Operational Constellation consists of 24 satellites that orbit the earth with 12-hour periods. These space vehicles (SV's) send radio signals that consist of time-tagged data bits marking the time of transmission, and information on the locations of the SV's, at the time they are transmitted. GPS receivers convert the received SV signals into the receivers' position. Four satellites are required to compute the four dimensions of X, Y, Z (position) and time. GPS receivers at precisely known reference locations can provide corrections and relative positioning data for receivers at other locations. Another use of GPS is to provide precise time and frequency standards through the use of precise clocks on-board the SV's.

For about two decades, GPS receivers have been used primarily in the outdoor environment. It is more challenging to use them indoors. The signal strengths from the SV's can be much reduced, such as by two orders of magnitude. A number of companies have been developing indoor GPS receivers. They are enticed by the US Federal Communications Commission's E911 telecommunication initiatives, which require wireless phone providers to locate any phone making a 911 emergency call.

The E911 initiative will greatly increase the proliferation of GPS devices. Telematics—the field of mobile services delivered wirelessly to in-vehicle devices—will further help GPS penetrate into different sectors of the society. One of the most visible manifestations of telematics is GPS-based navigation systems. They provide turn-by-turn directions and other information wirelessly to vehicle operators.

The amount and availability of GPS information will dramatically increase in the coming years. One challenge this will present is how to effectively use such information. There are needs for techniques to efficiently and intelligently analyze, process and present GPS information.

SUMMARY OF THE INVENTION

In general terms, the present invention pertains to the analysis of location information and/or the presentation of such information in an easy-to-digest manner.

Each piece of location information can include a piece of location-designating information and a piece of location-related information. Location-designating information is primarily for identifying location. In one embodiment, the location-designating information is longitudinal and latitudinal coordinates. Location-related information is information related to location-designating information. The location-designating information and the location-related information can be supplied by a mobile device. Multiple pieces of location-designating information can be retrieved and processed.

In one embodiment, each piece of location-designating information can be transformed into a label to help identify a location. To better identify locations, the process of transforming location-designating information into labels can use location-related information. For example, the mobile device is very close to the boundary of a theatre and a bookstore, and is about 40 feet from the ground level. One piece of location-related information is information on the environment. It indicates that the theatre has only one floor, while the bookstore has three floors. Since only the bookstore has more than one level and the mobile device is about 40 feet from the ground level, the mobile device is in the bookstore, not the theatre.

In another embodiment, the amount of location information can be reduced. An entire area can, for example, be represented by a single label. For analysis, all of the location-designating information pertaining to a given area can be compressed (or consolidated) into one piece of location-designating information related to the label. This compression (or consolation) process can be impacted or assisted by location-related information. For example, if a piece of location-related information changes by more than a pre-set value, the corresponding piece of location information will be retained.

To better present location information in an easy-to-digest manner, location information can be compared to standards. The standards can be related to time.

Presentation can be visually on a display with respect to a reference location. For example, the amount of detail displayed between the location of the mobile device and the reference location can dynamically change. This change can depend on the distance between the location of the mobile device and the reference location. Such an implementation is helpful particularly in situations when the size of the display is fixed.

The invention can be implemented in numerous ways, including as a method, system, device, or computer readable medium. Different embodiments of the invention will be discussed in subsequent sections.

Other aspects and advantages of the present invention will become apparent from the following detailed description, which, when taken in conjunction with the accompanying drawings, illustrates by way of examples the principles of the invention.

BRIEF DESCRIPTION OF THE DRAWINGS

FIG. 20A shows one embodiment of low-frequency circuit of the position-sensing device of the present invention.

Figure 1A:
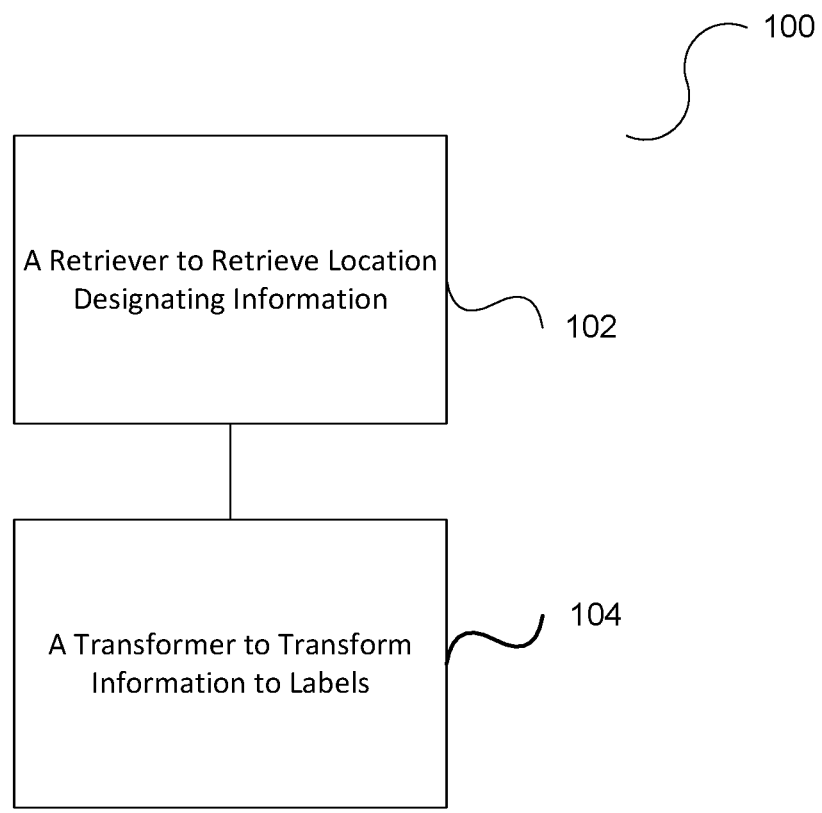
FIG. 1(a) shows one embodiment of the present invention.

Same numerals in FIGS. 1-27 are assigned to similar elements in all the figures. Embodiments of the invention are discussed below with reference to FIGS. 1-27. However, those skilled in the art will readily appreciate that the detailed description given herein with respect to these figures is for explanatory purposes as the invention extends beyond these limited embodiments.

DETAILED DESCRIPTION OF THE INVENTION

The present invention pertains to the analysis of location information and/or the presentation of such information in an easy-to-digest manner. In one embodiment, there are two types of location information. One type is location-designating information, and the other is location-related information. Location-designating information is primarily for identifying locations. The location-designating information can be longitudinal and latitudinal co-ordinates, or raw measurements (or pseudo-ranges) from GPS satellites. Location-related information is additional information that is related to a location. As will be explained in detail below, the location-designating information and the location-related information can be used in analyzing and presenting location information.

There can be a number of ways to generate location-related information. Some of the information can be automatically captured by additional sensors. Other can be entered by a person. For example, a user with a mobile device is in a bookstore. The mobile device is location-aware (e.g., GPS enabled) and can capture location-designating information. One type of location-aware mobile device is a mobile device that includes a GPS device (or GPS receiver). The user can add comments about the bookstore, or enter personal information and digitized pictures into his mobile device. The URL of the bookstore can be included. The user can be next to a house with a Wi-Fi network that allows the mobile device to get online. These can all be information related to the location, and can be automatically provided, or entered by the user. Such location-related information can be coupled to location-designating information, such as for identifying the location of the bookstore.

The company or organization at the location can broadcast certain information for attachment. For example, the bookstore can broadcast the URL of its website, or of special offers using the Bluetooth standards. Assume that the mobile device has Bluetooth technologies, and is Bluetooth enabled. With authorized reception of data, the mobile device can capture the broadcast signal and attach the information as a piece of location-related information.

Other sensors can be coupled to the mobile device to capture location-related information. For example, there can be a temperature sensor, a digital compass, a humidity sensor, a pressure sensor, a wind-speed sensor, an acceleration sensor or an accelerometer, a chemical sensor detecting chemical substance, a mechanical stress sensor, and/or other sensors to provide location-related information. The sensor data can be electronically coupled to corresponding location-designating information as location-related information.

Some of these sensors can be micro-electro-mechanical systems or micromachines. These sensors can be integrated with driving, controlling and signal processing electronics, and the integration can be monolithic.

The present invention can be implemented in a computing system. The computing system can be a standalone computing apparatus, a server computer, a client computer, a server computer with one or more client computers, or a computer in a peer-to-peer network. A client computer can be a thin-client. A client computer communicates to the server computer through a communication link or computer network. In one embodiment, a server computer, which can be software and/or hardware, is capable of responding to a communication initiated by a client computer with respect to an application. Similarly, a client computer, which can be software and/or hardware, is capable of initiating communication with a server computer with respect to an application. The computing system can also be a handheld computer, a personal digital assistant or a cellular phone.

The computing system can include a bus connecting a number of components, such as a processing unit, a main memory, an I/O controller, a peripheral controller, a graphics adapter, a circuit board and a network interface adapter. The I/O controller can be connected to components, such as a hard disk drive or a floppy disk drive. The peripheral controller can be connected to one or more peripheral components, such as a keyboard or a pointing device. The graphics adapter can be connected to a monitor. The circuit board can be coupled to audio signals; and the network interface adapter can be connected to the network, which can be the Internet, an intranet, or other forms of networks. The processing unit can be an application specific chip. The computing system can include more than one processor, and can process information through parallel processing.

The present invention can also be implemented as a computer readable medium including at least computer program code for analyzing and/or presenting location information according to different embodiments described.

FIG. 1(*a*) shows a location resolution system 100 according to one embodiment of the present invention. The location resolution system 100 includes a retriever 102 to retrieve location information, and a transformer 104 to transform location-designating information into labels. Typically, location-designating information includes a set of numerical values. They can be raw measurements from GPS devices, or longitudinal and latitudinal coordinates, or other numerical representation of locations. It is not easy for a person to know where a location is just by looking at these numerical values.

In one embodiment of the present invention, labels are representations of locations that are easier to understand than the numerical representations. For example, instead of the set of longitudinal and latitudinal coordinates—W 122° 26' 52.9" and N 37° 48' 11.2"—its corresponding label can be the Exploratorium, the name of the place (e.g., business, home or other point of interest) with that set of coordinates. A label can be the physical address of the place. In the case of the Exploratorium, it is 3601 Lyon Street, San Francisco, Calif. 94123. Labels can help people better identify a place than a set of numbers.

In transforming location-designating information into labels, the transformer can access a location database. In one embodiment, a previously-created database maps location-designating information, such as longitudinal and latitudinal co-ordinates, to their corresponding labels. The location database can be in the mobile device or in a remote server wirelessly coupled to the mobile device. Access to the location database can be restricted through password protection or other techniques.

The system identifies the labels corresponding to location-designating information, and retrieves such information from the database. The system can be in the mobile device or it can be in a remote server. Labels can then replace the location-designating information, and can couple to the corresponding location-related information. For example, the location-related information can be stored along with the labels in the mobile device, such as a personal-digital assistant. In another example, the location-related information is stored along with the labels in a remote computer.

In one embodiment, the location information can then be queried by a query processor. The query processor can be used by a person to query the information. As an example, one can search for the label, "Exploratorium". The following information can be retrieved in a table format:

| Location | Exploratorium |
|---|---|
| Address | 3601 Lyon Street, San Francisco, CA 94123 |
| GPS co-ordinates | W 122° 26' 52.9" N 37° 48' 11.2" |
| Web site | www.exploratorium.edu |
| Miscellaneous information | . . . |

A history of when the user was at the location can also be retrieved, as exemplified by the following table:

| From | To | Date | On | Comments | Other Information |
|---|---|---|---|---|---|
| 1:05pm | 3:02pm | Feb. 2, 2002 | Saturday | Lucas likes the place. Should visit more often. | A picture of Lucas we took outside: Lucas.tif |
| 2:00pm | 3:10pm | Mar. 2, 2002 | Monday | Andy was fascinated by the anatomy of a human body. | A web site on human anatomy: http://www.bartleby.com/107/ |

The information can be queried in different ways. For example, one can find out where the user was on Mar. 2, 2002 at 3 pm through standard searching algorithms.

Figure 1B:
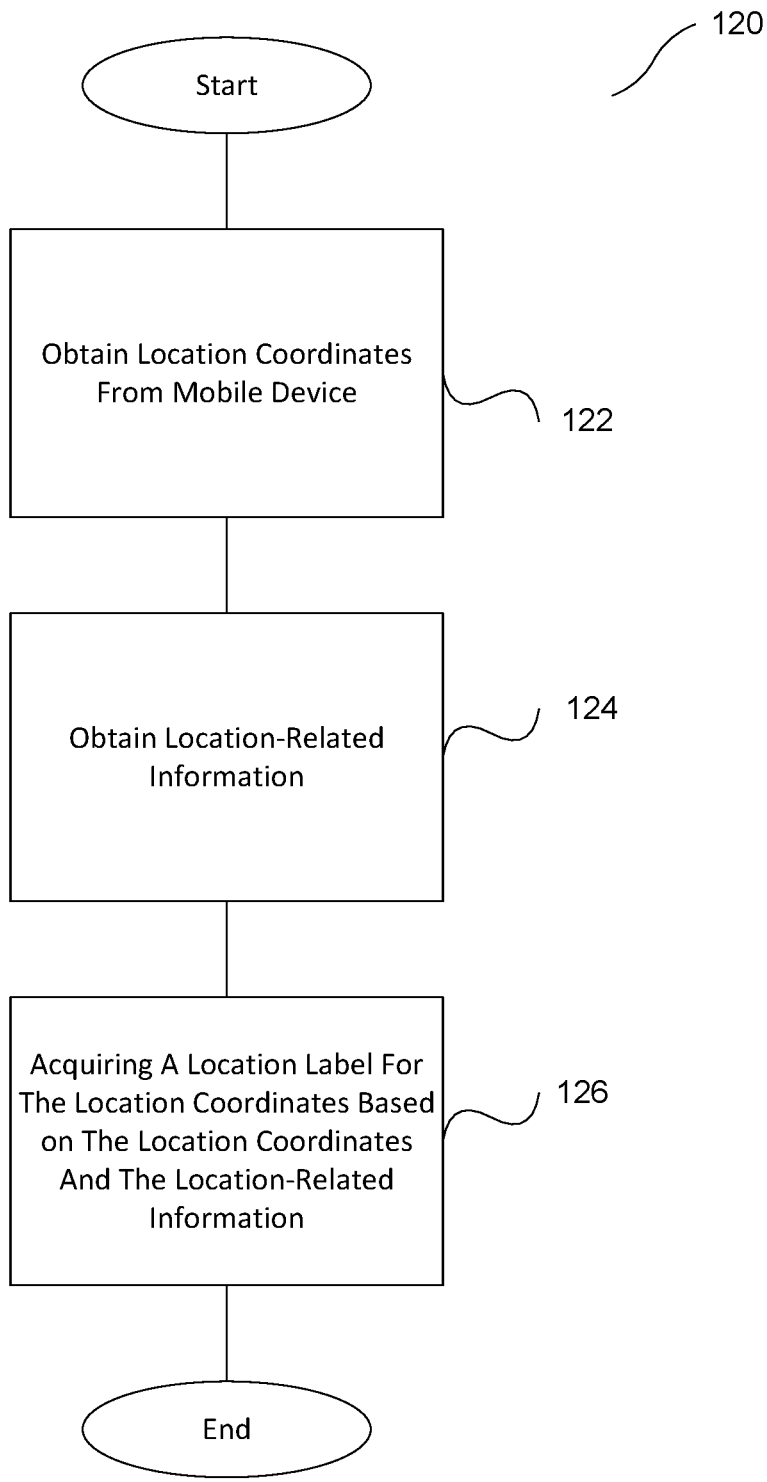
FIG. 1(b) is a flow diagram of label processing according to one embodiment of the invention.

FIG. 1(b) is a flow diagram of label processing 120 according to one embodiment of the present invention. The process 120 can be performed on a server or a client.

The label processing 120 initially obtains 122 location coordinates provided by the mobile device. The mobile device is location aware and thus typically captures location coordinates. Additionally, location-related information is obtained 124. The location-related information is associated with the location coordinates. The location-related information can also be provided by the mobile device. For example, the mobile device can include one or more sensors or input devices to acquire the location-related information. Then a location label can be acquired 126 for the location coordinates based on the location coordinates and the location related information.

Through use of both the location coordinates and the location-related information, more accurate location labels are able to be acquired. The location labels are more descriptive of actual location and are more user-friendly than the location coordinates. The acquisition of location labels can also be considered as a transformation of location coordinates into location labels.

In many situations, it may not be clear where a location corresponding to a piece of location-designating information really is. The resolution of GPS devices can have errors of 15 meters or more. Based on the location-designating information, the user may be at one or more locations. For example, a multi-story bookstore is directly adjacent to a single-story theatre. The user with a mobile device, such as a cell phone having a GPS device, might be standing at a window of the bookstore, with the window facing the theatre. The cell phone can transmit the location-designating information or the corresponding labels to a remote system of the invention. Based on the accuracy of the GPS device, the system is aware that the user is in the vicinity of the bookstore and the theatre. But the system may not be able to pinpoint whether the user is in the bookstore or the theatre.

Figure 2:
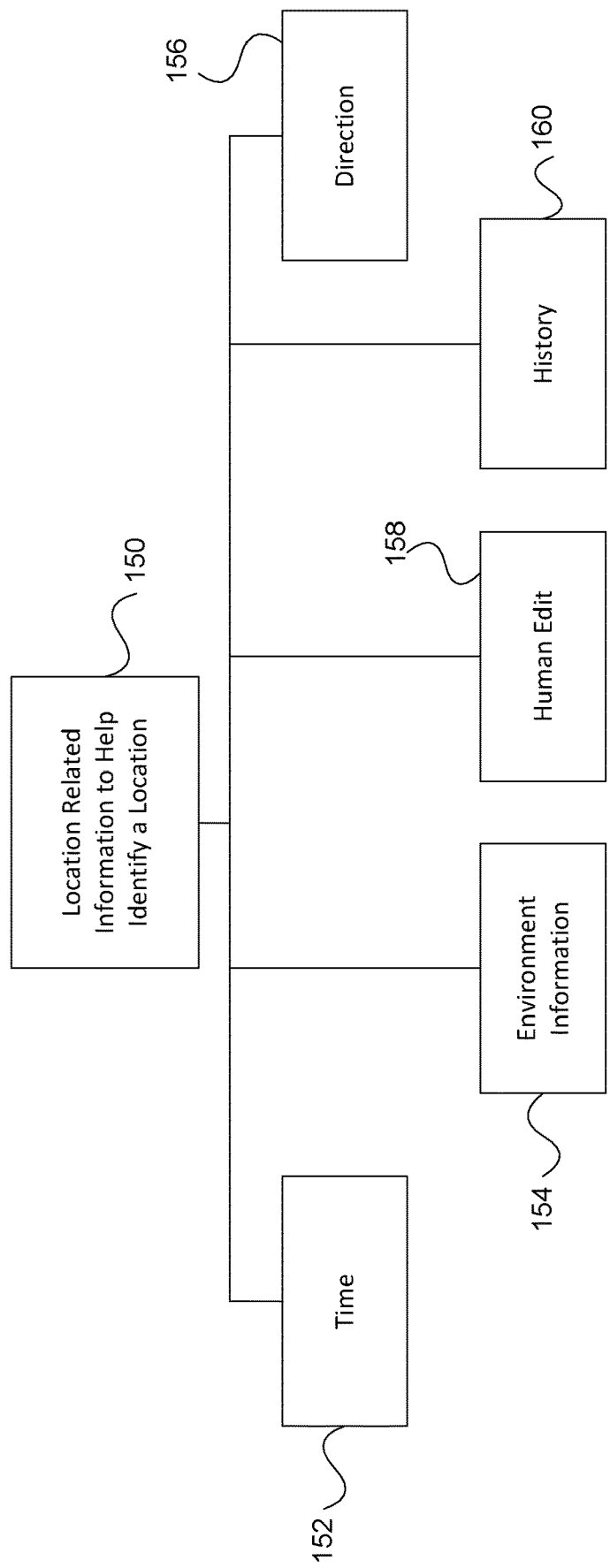
FIG. 2 shows examples of location-related information to help identify a location in the present invention.

FIG. 2 shows examples of location-related information to help identify a location. One approach is to use a piece of information regarding the environment 154 where the person is located. Location-designating information from a GPS device can identify not only the longitudinal and latitudinal coordinates, but also the elevation. Assume the elevation coordinate indicates that the person is about 40 feet from the ground level. Based on information regarding the environment, only the bookstore has more than one level, the user is in the bookstore. Thus, depending on the location-related information of the bookstore having multi-story, the transformer identifies the bookstore as the correct location. In this example, the name of the bookstore can be the transformed label.

Another approach to better define a location is to use the time 152 information provided by GPS. For example, at time x, the user is close to the junction of the theatre and the bookstore. Assume at time (x+10 seconds), the person has moved to the center of the bookstore. Based on this second piece of information, the system infers that at time x, the user was in the bookstore, not the theatre. In this approach, location information at different time frames are evaluated or collected to better define a location.

Yet another approach to better define a location is to use direction 156 information. Again, assume that the user at the junction of the theatre and the bookstore. One rule can be that while the user is at the junction, the user is in the bookstore if he is moving in the direction of the bookstore. One approach to measure direction depends on taking two pieces of location information at two different time frames, such as 5 seconds apart. Based on the second location, the direction of travel at the first location can be identified.

Instead of using location information at different time frames, direction 156 can be provided by a direction sensor (e.g., digital compass) in the mobile device (e.g., cell phone). Such direction information can be coupled to the location-designating information, and transmitted to another computing apparatus to have the location information analyzed. In another embodiment, the information is not transmitted, but is analyzed in the mobile device. Based on the analysis, the mobile device can display the label on its screen.

It could also be up to the user 158 to better define the location. The mobile device can identify a few choices for the user to select. For example, a display on the mobile device can show the options of both the bookstore and the theatre. The user can select one of them by using a pointing device on a digitizer, a scrolling function to allow selection, or a voice recognition system, where the user can verbally make the selection.

Also, a history 160 of prior locations or frequently visited locations could be used to better define the location. For example, based on the history, the user visits a bookstore at least ten times more than its adjacent theatre. Then, if the location-designating information indicates that the user can be in the bookstore or in its adjacent theatre, one rule will assume the user to be in the bookstore. The history 160 can also be used to make processing more efficient. For example, if the history 160 indicates that the current location is same or proximate to a prior location, the current location can be deemed to be the same as the prior location, typically with minimal processing.

The amount of location information can be quite large. In one embodiment, a system of the invention also includes a compressor to compress the amount of location information.

Figure 3A:
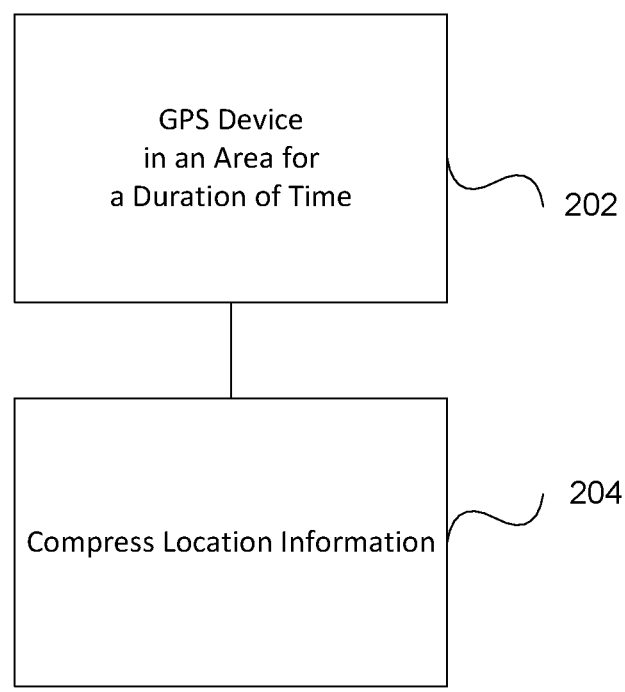
FIG. 3(a) shows one embodiment of compressing location information in the present invention.

FIG. 3(a) shows one embodiment of compressing location information according to one embodiment of the present invention. In this approach, the user with a mobile device coupled to a GPS device is in an area for a duration of time 202. During this time period, the device collects sets of location information, each at a specific time. Through analysis, it has been determined that the device is in the same area during this time period. For example, every set of longitudinal and latitudinal coordinates is mapped to the same label. The compressor will compress all of the location-designating information 204 to one set, indicating the device being in the area during that time period.

In one approach, the compressor retrieves sets of longitudinal and latitudinal co-ordinates of the GPS device, and transforms them to labels. As the compressor transforms a set of longitudinal and latitudinal coordinates of a piece of location information into a label, it also compares that label with the label from the immediately prior time. If the two labels are the same, the compressor will not store the location information of that label for additional analysis. In one embodiment, additional pieces of location-designating information in the same zone as the immediately earlier piece will not be further analyzed. If two labels are the same, they can be considered to be in the same zone; if two labels are within a certain pre-determined distance from one another, they can be considered as to be in the same zone; or if the distance between the two sets is less than a pre-set value, again, they can be considered as to be in the same zone.

In another approach, if the distance between two sets of location-designating information is less than a pre-set value (e.g., predetermined value, tolerance, range or offset), the compressor will not store the second piece of location information, which is the location information at a later time. This process can continue. For example, the compressor can determine the distance between a third set and the first set to be still less than the pre-set value. Again, the third set of location information need not be stored.

Under certain conditions, even if the device has not moved out of an area designated by a label, there might still be changes in certain information, warranting the keeping of location information, or at least some portion of it. For example, the user is transporting humidity-sensitive chemicals within a certain area of the city, and suddenly it rains heavily, significantly changing the humidity. It might be desirable to be aware of the location and time when such changes occurred.

Figure 3B:
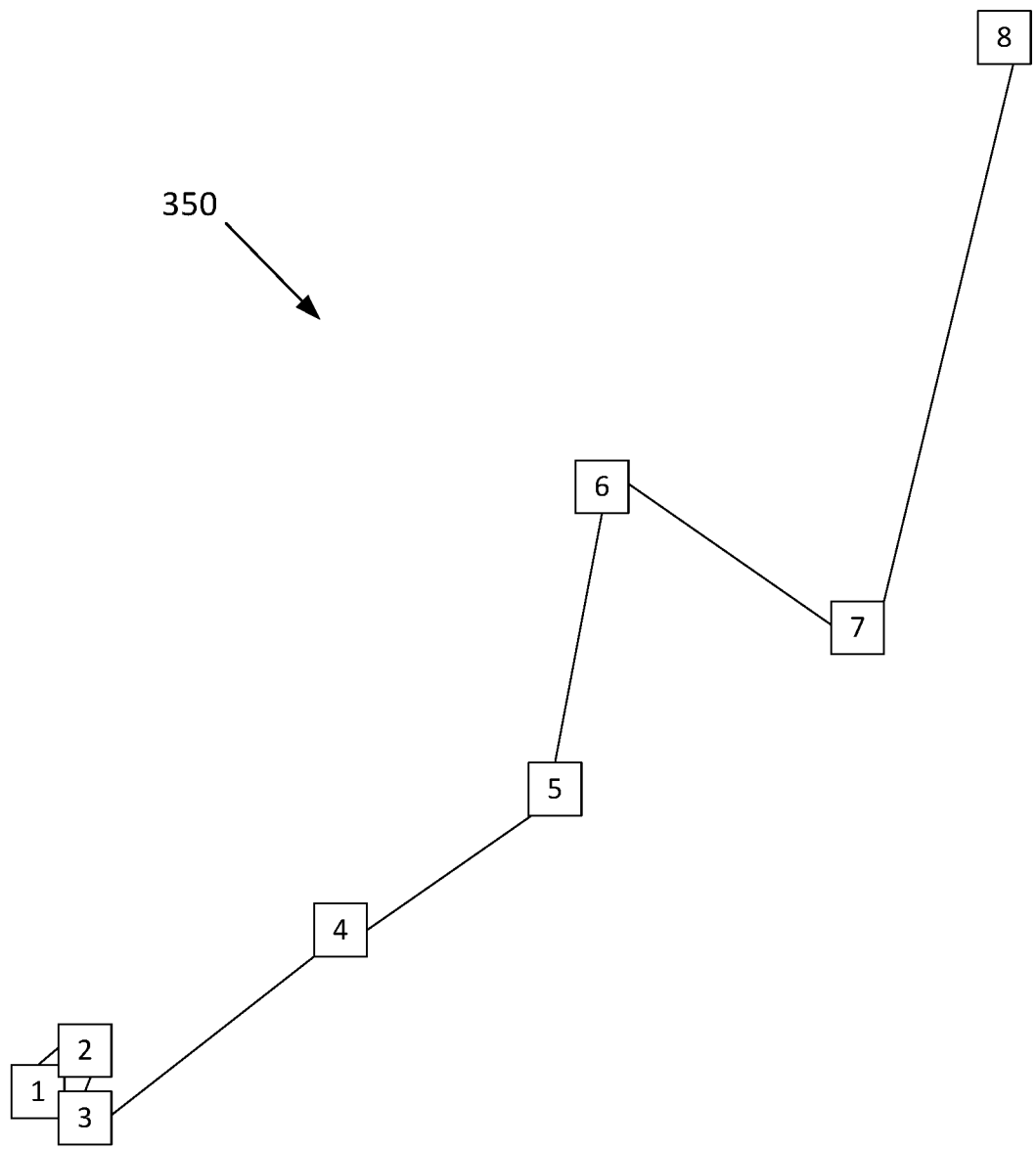
FIG. 3(b) illustrates an exemplary path of movement of a location-designating device over a period of time.

FIG. 3(b) illustrates an exemplary path 350 of movement of a location-designating device over a period of time. Namely, the exemplary path 350 is composed of a sequence of eight (8) locations where location-designating information and location-related information were captured. A sequence of locations of a path can be processed to compress what would otherwise be large and unmanageable amounts of information. Once compressed, the quantity of data is reduced and the information is more user-friendly. Table 1 provided below illustrates exemplary location-designating information and location-related information that have been captured for the eight (8) locations shown in FIG. 3(b).

TABLE 1

|       | 1 | 2 | 3 | 4 | 5 | 6 | 7 | 8 |
|---|---|---|---|---|---|---|---|---|
| Label | — | — | — | — | — | — | — | — |
| Long. | X1 | X2 | X3 | X4 | X5 | X6 | X7 | X8 |
| Lat.  | Y1 | Y2 | Y3 | Y4 | Y5 | Y6 | Y7 | Y8 |
| Time  | 1.00pm | 1.15pm | 1:30pm | 1:45pm | 2.00pm | 2:15pm | 2:30pm | 2:45pm |
| Date  | Jan. 1, 2002 | Jan. 1, 2002 | Jan. 1, 2002 | Jan. 1, 2002 | Jan. 1, 2002 | Jan. 1, 2002 | Jan. 1, 2002 | Jan. 1, 2002 |
| Temp. | 90 | 90 | 90 | 89 | 89 | 88 | 88 | 87 |
| Other | — | — | — | — | — | — | — | — |

The data stored in the Table 1 can represent the raw data provided by the location-designating device. At this point, in this embodiment, the descriptive labels are not known, but the longitude and latitude coordinates are known (e.g., provided by GPS device). The date and time can be provided by a GPS device or by a clock within the location-designating device. Further, other sensors can provide various other location-related information. In this example, the other location-related information includes at least temperature and an "other" category to represent one or more other pieces of information.

The data stored in Table 1 can then be compressed to a more compact and manageable form. Table 2 provided below illustrates exemplary compression processing on the data within Table 1.

TABLE 2

| point | 1 | 2 | 3 | 4 | 5 | 6 |
|---|---|---|---|---|---|---|
| Label | Exploratorium, SF | RT. 101, So. SF | Rt. 101, Menlo Park | Rt. 101, Mountain View, CA | 7Eleven, Saratoga, CA | Home, Saratoga, CA |

TABLE 2-continued

| point | 1 | 2 | 3 | 4 | 5 | 6 |
|---|---|---|---|---|---|---|
| Long. | — | — | — | — | — | — |
| Lat. | — | — | — | — | — | — |
| Time | 1.00-1:30pm | 1:45pm | 2.00pm | 2:15pm | 2:30pm | 2:45pm |
| Date | Jan. 1, 2002 | Jan. 1, 2002 | Jan. 1, 2002 | Jan. 1, 2002 | Jan. 1, 2002 | Jan. 1, 2002 |
| Temp. | 90 | 89 | 89 | 88 | 88 | 87 |
| Other | — | — | — | — | — | — |

Figure 3C:
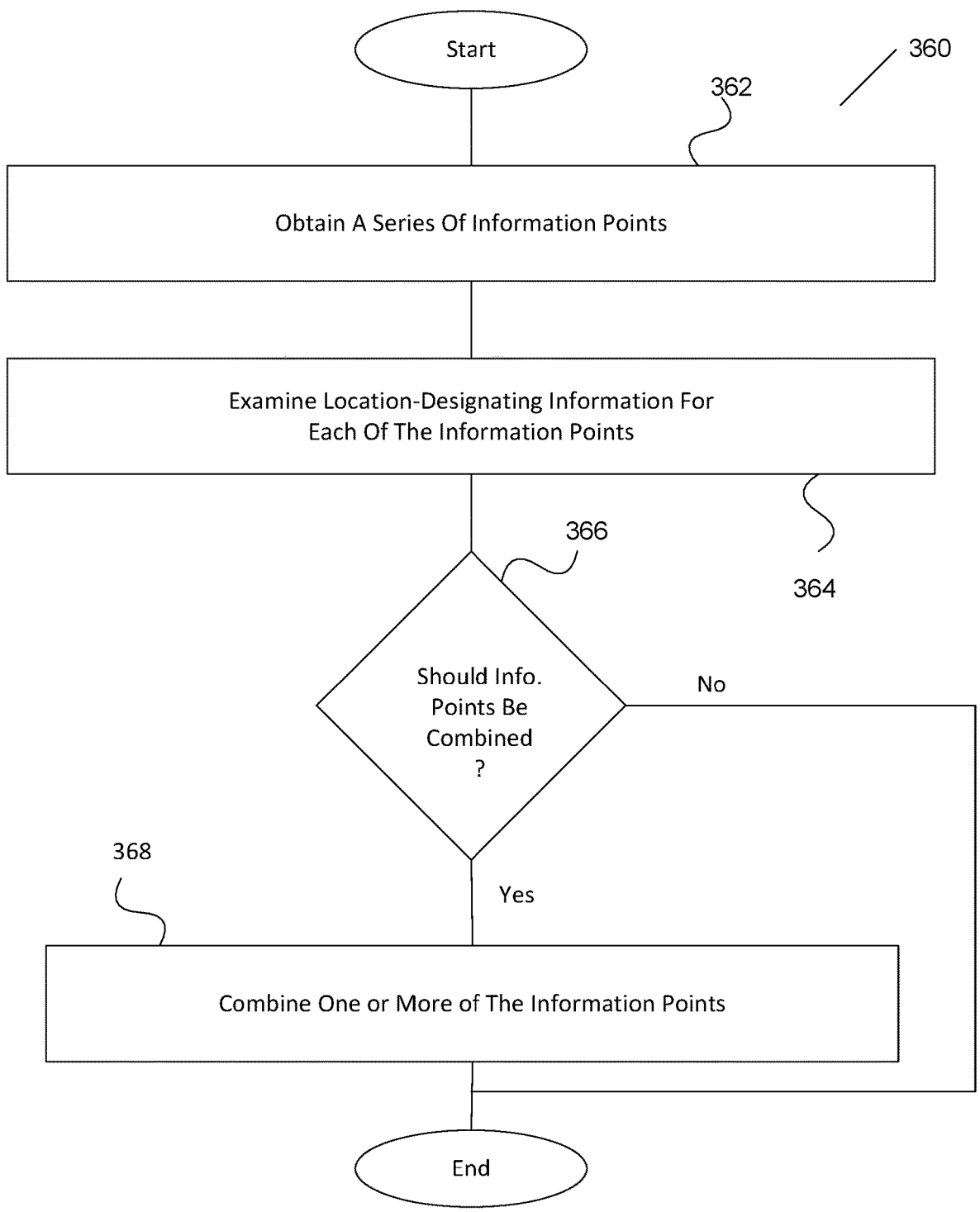
FIG. 3(c) is a flow diagram of consolidation processing according to one embodiment of the invention.

As shown, the locations 1-3 in Table 1, along the path 350 as shown in FIG. 3(*b*), are very close to one another and such is reflected by the longitude and latitude coordinates for these locations. Hence, by examining the first 3 locations, the compressor determines that these location are to be treated as the same location. Here, based on information from a location database, assume that the location is the Exploratorium in San Francisco, Calif. In effect, these location points can collapse into a single location point. However, any difference between the individual location points (such as their location-related information) can be preserved if desired. The other locations 4-8 in Table 1 (now locations 2-6 in Table 2) are deemed to represent different locations and are individually processed for labels. Once a label is identified, the longitude and latitude coordinates can be eliminated if desired.

The exemplary compression processing shown with Table 2 is only one simplified example; hence, it should be understood that compression processing can be performed in a wide variety of different ways.

FIG. 3(*c*) is a flow diagram of consolidation processing 360 according to one embodiment of the invention. The consolidation processing 360 can be performed on a server or a client or a computing device in a peer-to-peer network.

The consolidation processing 360 initially obtains a series of information points 362. The series can be ordered based on the time each point is acquired. The series of information points are, for example, obtained from storage or directly from a mobile device. Each of the information points typically has location-designating information and location-related information. Next, the location-designating information for each of the information points is examined 364. A decision 366 then determines whether any of the information points should be combined. Here, in this embodiment, the decision 366 is based on the location-designation information for the information points. For example, if two consecutive location-designation information are substantially matched, the two information points should be combined. One rule regarding matching can be that if two consecutive location-designation information are close to each other, such as within 5 meters apart, they are considered as substantially matched. Another rule can be that if two consecutive pieces of location-designation information are in the same area, point of interest or label, they are considered substantially matched.

In another embodiment, the decision 366 can be based on not only the location-designation information but also the location-related information. If two consecutive pieces of location-designation information and location-related information are substantially matched, the two information points should be combined. Different thresholds can be set to determine if location-related information from different points are substantially matched. For example, the location-related information is the temperature of the environment. One rule can be that if the temperatures of two consecutive points are close to each other, such as setting the threshold to be 3 degrees, the location-related information from the two points are considered substantially matched. Another rule can be that if the difference between two consecutive pieces of location-related information is less than a certain percent, such as 3%, of the value of the first piece of location-related information, the two pieces of location-related information are considered substantially matched.

In any case, when the decision 366 determines that some of the information points should be combined, the two or more of the information points are combined 368. On the other hand, the information points are not combined when the decision 366 determines that these information points should not be combined.

Once information points are combined, the resulting information point can be a normal information point (with perhaps additional data) or a compound information point (retaining some or all of the data of the information points being combined). For example, information under each of the locations in Table 1 can be considered information under an information point. Information points 1-3 under Table 1 are combined into information point 1 under Table 2. The new information 1 can be considered a compound information point because it retains some of the time information of points combined. In any case, the combining of information points operates to consolidate the series of information points such that the data is more compact and/or better organized.

Figure 4:
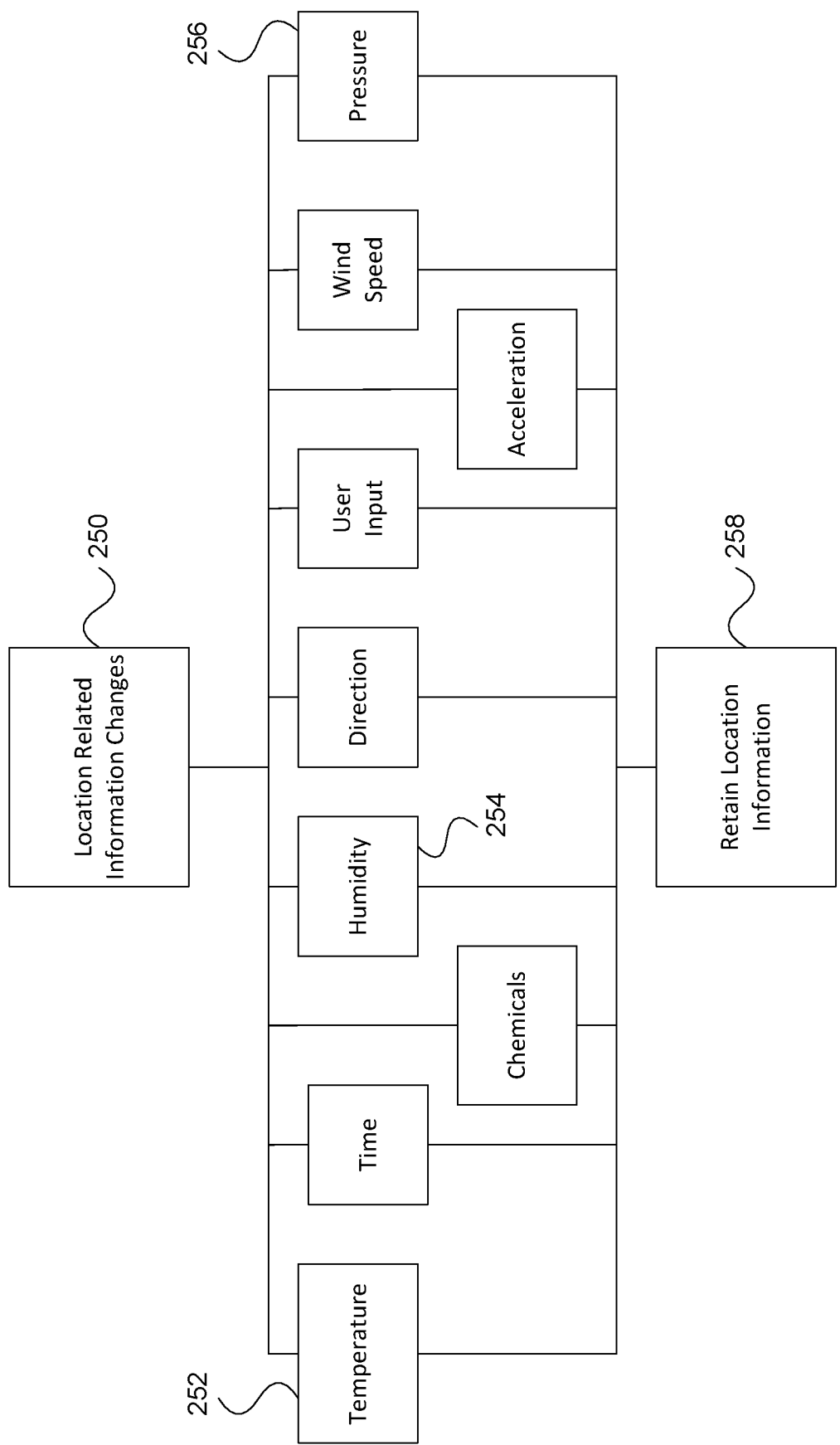
FIG. 4 shows embodiments regarding retaining location information in the present information.

FIG. 4 shows examples of location-related information 250 regarding consolidation. For example, the location-related information can include temperature 252, humidity 254, direction, wind speed, time, user-input, chemicals, acceleration and pressure 256. Some of the location-related information is information regarding the environment where the location-designating device is located, such as temperature, humidity, wind speed, chemicals, and atmospheric pressure, tire pressure or other types of pressures. Other of the location-related information can pertain to the location-designating device itself, such as the acceleration of the device, or the pressure being asserted on the device. Examples of other sensors to provide related information include carbon monoxide detectors, liquid sensors, metal detectors, color sensors, scent sensors, light sensors, pattern sensors, tactile sensors, sound sensors, motion detectors, smoke sensors, particle sensors and radiation detectors, such as infrared detectors. Related information can be captured by the corresponding sensors, with the related-information coupled to location-designating information. The coupling can be achieved wirelessly. For example, a chemical sensor attached to a package can transmit the amount of certain gaseous chemicals through Bluetooth or WiFi technologies to the location-designating device, which is also coupled to the package.

The following provides additional examples of location-related information that impact consolidation or compression, and are used in determining to retain location information 256. An administrator (e.g., user) can set a threshold for a location-related information. For example, a rule the administrator sets for the compressor can be: From position A to position B, if the temperature at any position changes by more than x degrees from that at point A, keep the location information at that position. Another rule can be: During any one-hour period, keep the location information where the humidity changes by, such as, more than 50% from that at the beginning of that hour. A third rule for a threshold can be that if time has elapsed by, such as, 1 hour, from the time when a piece of location information has been retained, keep the new location information. Another rule for a threshold can be that if a certain type of chemical exceeds a certain amount, keep the location information. Yet another rule can be that if a user has entered information at a specific location, keep the location information. In this case, the threshold can be set, for example, to zero or one character difference in user entry. If there is any changes in user entry, such as from not entering anything to inputting something, or to inputting something different, the location information at that position can be kept.

Figure 6:
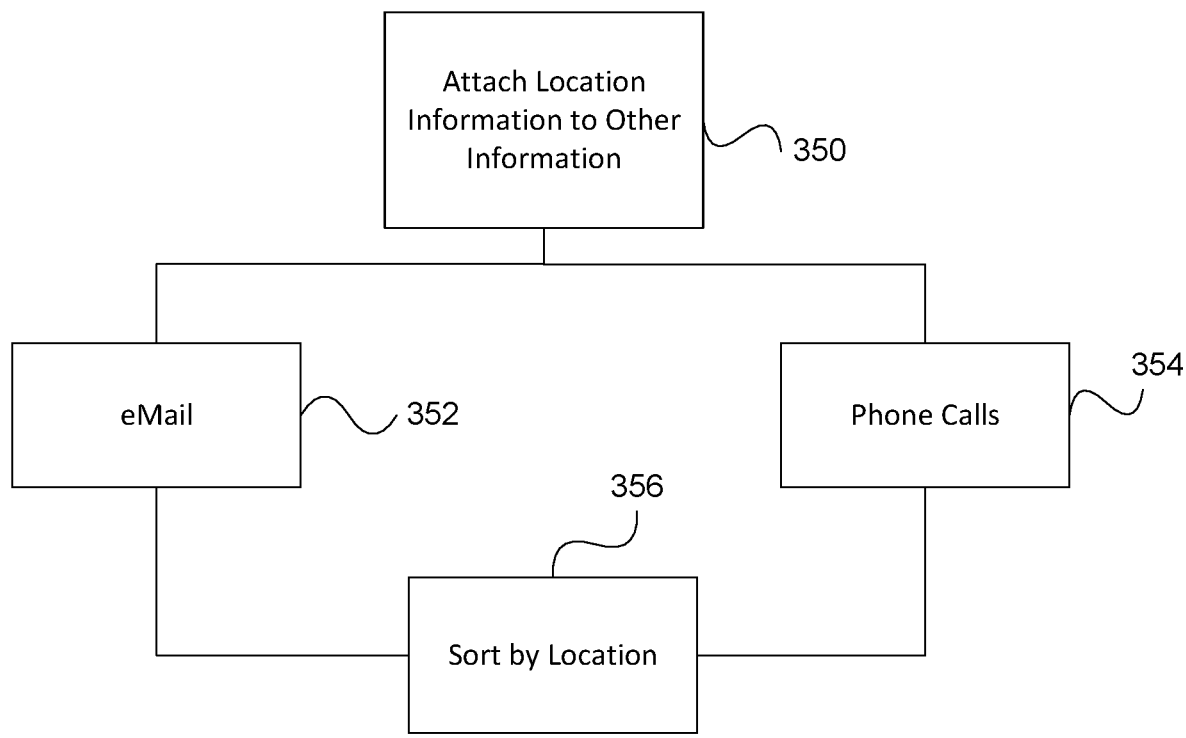
FIG. 6 shows examples of standards compared to location information in the present information.

Location information collected can be attached to other information. FIG. 6 shows a few embodiments of attaching certain location information 350 to other information. For example, labels can be attached to emails 352, phone calls 354, or other types of messages, when they are sent. Then, received emails not only indicate who sent them, they would also indicate the locations from where they were sent. Emails and phone calls can then be sorted 356 based on locations. In one embodiment, the sorting can be alphabetical, such as through the labels.

Figure 5:
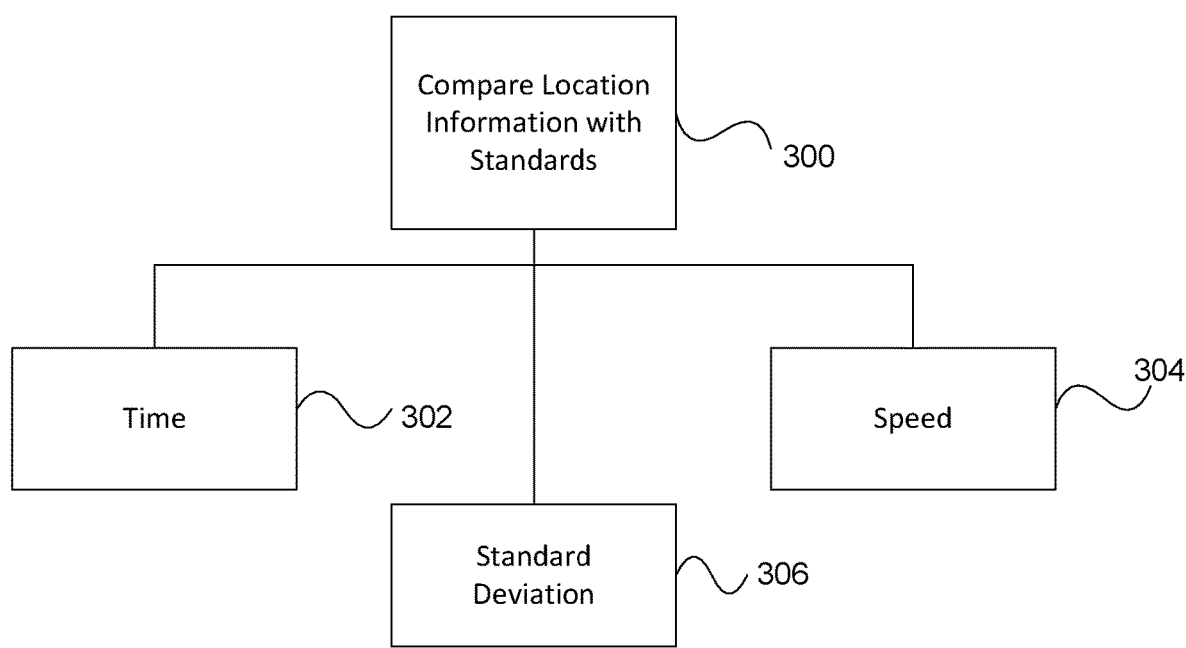
FIG. 5 shows embodiments of attaching location information to other information in the present invention.

To help users digest location information, sometimes it is advantageous to compare them to standards. In one embodiment, a system of the invention includes a comparator for comparing location information with standards. FIG. 5 shows examples of standards for comparison. In one example, a label represents a five-mile strip (portion) of a specific highway. The average amount of time T 302 to travel through that five-mile strip is known. The user drives his car through the strip. The time he enters and exits that label is stored, and their difference is compared to T. If the difference is more than a pre-set threshold, a notification can be sent to the user. Similarly, the standard can be the speed 304 of a typical car traveling through that strip.

In another example, the amount of time can be that of an item on the shelf of a company, such as a supermarket. The location of that item is monitored.

Standard deviations, 306, can also be tracked. This can be the standard deviation of the travel time of a specific car through the strip during the last two months. If the standard deviation is more than a pre-set threshold, the driver can be notified.

Figure 7:
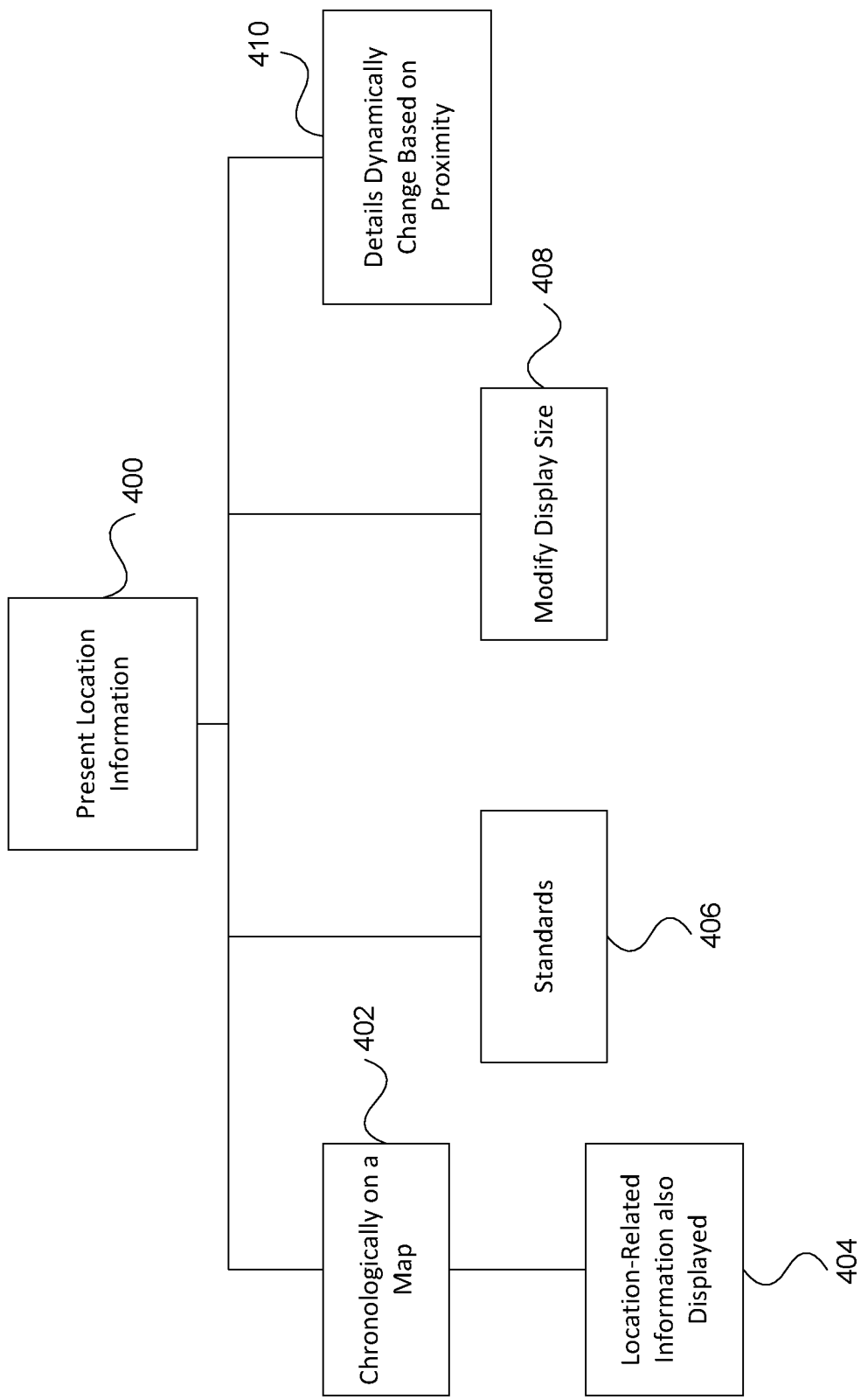
FIG. 7 shows embodiments related to the presentation of location information in the present invention.

FIG. 7 shows embodiments related to the presentation 400 of location information. In one embodiment, location information can be presented chronologically on a map 402. Location-related information can be coupled to the corresponding labels and displayed on the map 404. For example, a piano is shipped from San Francisco to Toyko. The map can show chronologically where the piano is at different times. Next to the shipping path, there can be two other line graphs, one showing the humidity, and the other showing the temperature at the corresponding location and time. The location-related information can also be coupled to the corresponding labels and displayed as a link or visual indicator which is selectable to cause the location-related information to be displayed, The presentation can be in a tabulated format, such as in a spreadsheet. Presentation can be in graphical formats, such as in bar charts or pie charts, in two or more dimensions.

Location information where a mobile device enters and exits a label can be presented. Location information where there are changes exceeding thresholds in location-related information can also be shown.

The display of location-related information can be through clickable icons 404 on a web site. For example, the user was in the Exploratorium at 4 pm. A small icon representing the Exploratorium can be displayed next to the location of the chart indicating where the user was at 4 pm. Clicking the icon would lead one to the web site of the Exploratorium.

Location information can be displayed with their standards 406. For example, a display can show the speed of a car as a function of location. Next to that, there can be another line showing standard speeds at the different locations.

In one embodiment, the display size can be modified 408. For example, the screen on a handheld device can be small. When the user is in a car, the user can dock the device, which can electronically couple the device to a larger screen in the car for viewing.

In another embodiment, the locations of a GPS device are displayed with respect to a specific location. The amount of details displayed between the locations of the GPS device and the specific location can dynamically change 410. This change can depend on the distances between the locations of the GPS device and the specific location. The amount of details can be defined as the density of the points of interest shown in an area. Points of interest can include the name of a street, the name of a park or other designations.

As an example, the number of labels shown between the locations of the GPS device and the specific location depends on the distances between the locations and the specific location. If the GPS device is very far away from the specific location, there will be many labels in between. With the display size being fixed, if all of the labels are shown, the display can be cluttered. So, very few labels should be shown. However, as the GPS device approaches the specific location, the ratio of labels being shown and the total number of labels between the locations increases. This can be done dynamically, depending on the separation distance. One way is to fix the number of labels to be shown on the display to be fewer than a predetermined number (e.g., 10). If there are more than the predetermined number of labels to be shown, certain labels can be skipped, such as every other one. If there are 100 labels, and only 10 can be shown, then every 10th label can be selected to be shown. In this example, even a label is in between the GPS device and the specific location, the label may not be displayed. In other words, whether a label between the location of the GPS device and the specific location is displayed or not depends on the distance between the location of the GPS device and the specific location. Note that whether a label is displayed or not can also depend on user preferences. The user can require a label to be shown if the label is between the location of the GPS device and the specific location.

In another example, the specific location is the location of another GPS device. That specific location can change as the other GPS device is moved.

Location information can be dynamically generated. As the GPS device moves, location information can be generated. So the presentation of location information can change as a function of time.

In a number of embodiments, a label identifies locations that are two-dimensional. However, a label can identify a three-dimensional volume. In other words, elevation coordinates can be included.

The present invention has described one or more GPS devices as location-designating devices to identify a location. However, the present invention is not limited to using one or more GPS devices to identify a location. In certain situations, other wireless or mobile devices can also serve as location-designating devices, such as devices based on GSM technologies or Wi-Fi technologies. Through the techniques of triangulation, these devices can also designate a location. Such triangulation techniques should be known to those skilled in the art.

Note that the process of transforming location coordinates into labels and the process of using additional information to help identify a location can be performed by two separate entities. In other words, a corporation can be responsible to transform location coordinates into labels. Then another corporation is responsible to clarify the location corresponding to a piece of location-designating information, using, for example, location-related information.

A number of embodiments have been described where the process of transforming location coordinates into labels or the process of compressing depends on a piece of location-related information. Note that such processes can depend on more than one piece of location-related information. Also, the multiple pieces of location-related information can be of different types. For example, the process of transforming can depend on time and a piece of information regarding the environment.

Figure 8:
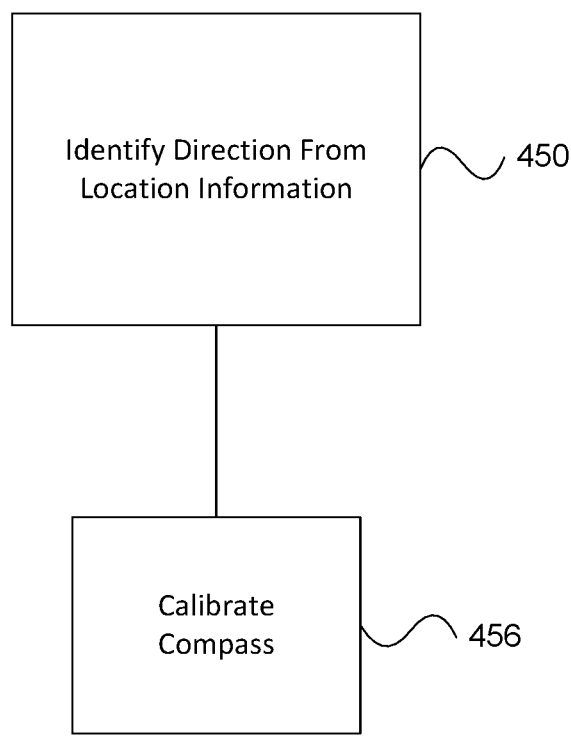
FIG. 8 shows one embodiment of using location information to calibrate a compass in the present invention.

As described above, since multiple pieces of location information from a GPS device can identify direction 450, the GPS device can be used to calibrate a digital compass, 456, as illustrated in FIG. 8. A GPS device can provide multiple location information as a function of time. If the person carrying the device is traveling along a certain constant direction, the multiple location information will be able to identify that direction. The direction information can then be used to calibrate a digital compass, as long as the compass is attached to, or traveling in the same direction as, the GPS device.

One embodiment of the invention relates to an inexpensive position-sensing device that allows widespread use and availability of position information. The availability of position information in an inexpensive manner is highly desirable. However, there are a number of factors preventing such availability, such as cost and, sometimes, the size of the sensors. One approach of the invention provides an inexpensive position-sensing device that can be attached to or located on an object. In another embodiment, the position-sensing device is in a convenient form factor applicable for transport. Based on a number of embodiments of the present invention, position information can become not only a sought-after feature, but also a common commodity.

One embodiment of the invention includes a position-sensing device, which can be based on GPS technology. After acquiring position signals, the device extracts raw position data from the signals. Then, the device wirelessly transmits the raw position data to a position-computing device. The position-computing device can be used to convert the raw position data received into the position of the position-sensing device. The position-computing device can also receive auxiliary information from auxiliary sensors. Further analysis can then be performed based on the position and the auxiliary information. Examples of auxiliary sensors are pressure sensor, smoke detectors and heat sensors. The auxiliary sensors can capture their corresponding auxiliary information and provide them to the position-computing device.

The position-computing device can re-transmit the position of the position-sensing device with the auxiliary information to a remote site for additional analysis. The remote site can include a website. The remote site can provide additional intelligence and send different types of information back to the position-computing device. For example, location, map or traffic information can be downloaded to the position-computing device.

The position-computing device can also control an actuator. Based on an analysis performed by the remote site, the position-computing device can send a signal to an actuator to perform an operation. The operation can simply be displaying a message, flashing a signal or turning on a heater.

In one embodiment, the position-sensing device does not include a keyboard or display. This facilitates the position-sensing device in being compact in size and inexpensive. In addition, in another embodiment, a number of components of the position-sensing device's circuitry can be integrated together. For example, the components can be incorporated on two semiconductor chips, one substantially for radio-frequency circuits and the other for low-frequency baseband processing circuits. With the advantageous size and cost benefits, the position-sensing devices can be conveniently included into packages for shipment to track the packages, or can be attached to a person for monitoring purposes.

In one approach, an auxiliary sensor can be integrated into the position-sensing device, and the fabrication process can include micromachining techniques.

Figure 9:
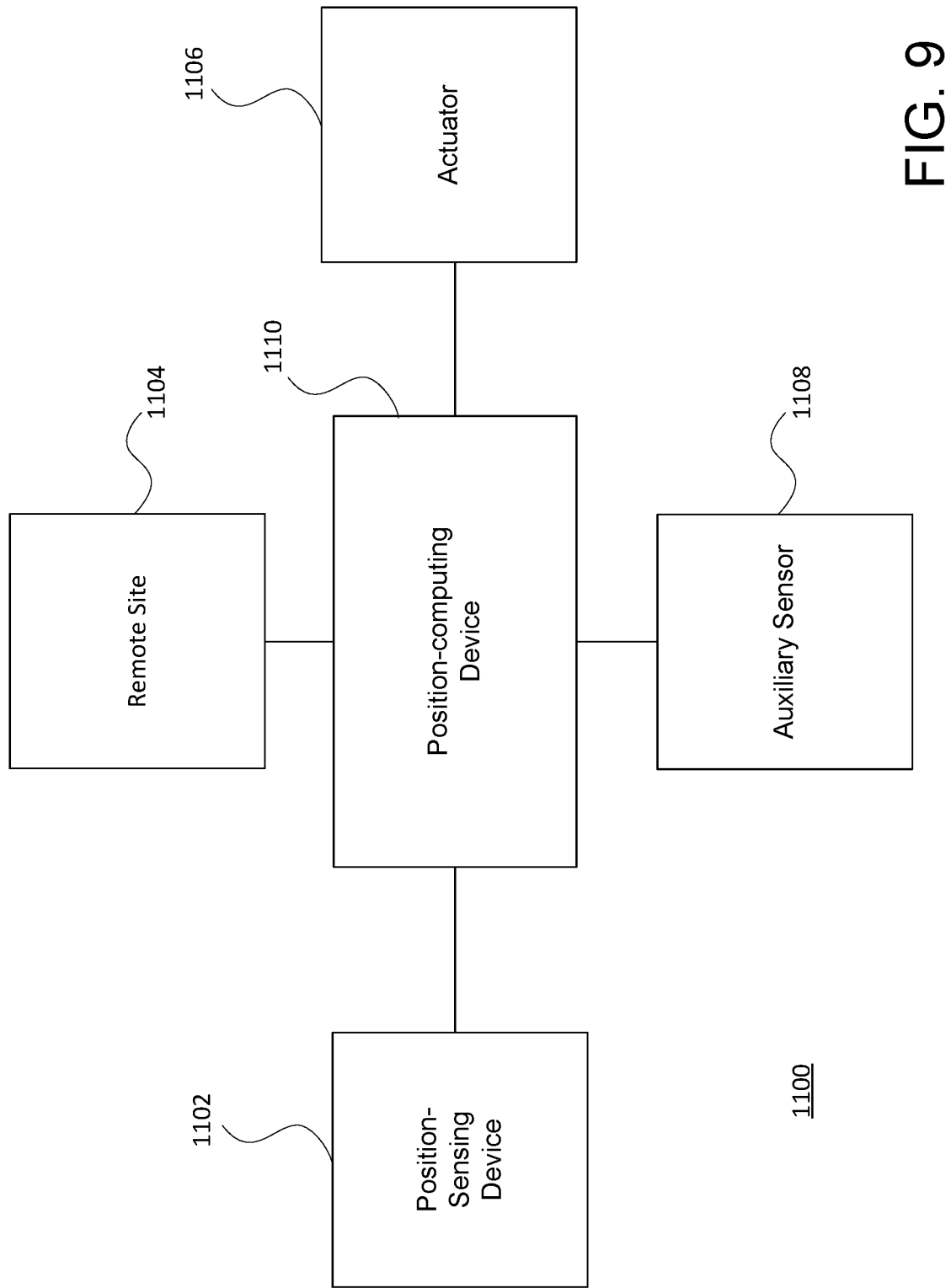
FIG. 9 shows one embodiment of the present invention.

FIG. 9 shows a position-sensing device 1102 according to one embodiment of the invention. The position-sensing device 1102 can be coupled to a position-computing device 1110, which, in turn, can be coupled to an auxiliary sensor 1108, a remote site 1104, and an actuator 1106. The position-sensing device 1102 can be based on global positioning system (GPS) technology, and can be compact and inexpensive. In one implementation, in a general sense, the position-sensing device 1102 only has to track the GPS satellites and send raw position data to the position-computing device 1110 where position computation can be performed. The position-sensing device 1102 can be very portable. For example, one can easily affix the position-sensing device 1102 to a person, package or other object. As another example, the position-sensing device 1102 can be temporarily placed within a vehicle and easily carried from one vehicle to another.

In one approach, the position-computing device 1110 receives and converts the raw position data from the position-sensing device 1102 into the position of the position-sensing device. In another approach, the position-computing device 1110 can receive the raw position data from the position-sensing device 1102 and then forward the raw position data (or a partially processed version thereof) to a remote computing device (e.g., remote server) for additional processing.

In one embodiment, a position sensor as used herein refers to a system, apparatus or device that includes not only a position-sensing device but also a position-computing device. For example, with respect to FIG. 9, the position-sensing device 1102 and the position-computing device 1110 can together be referred to as a position sensor.

Figure 10:
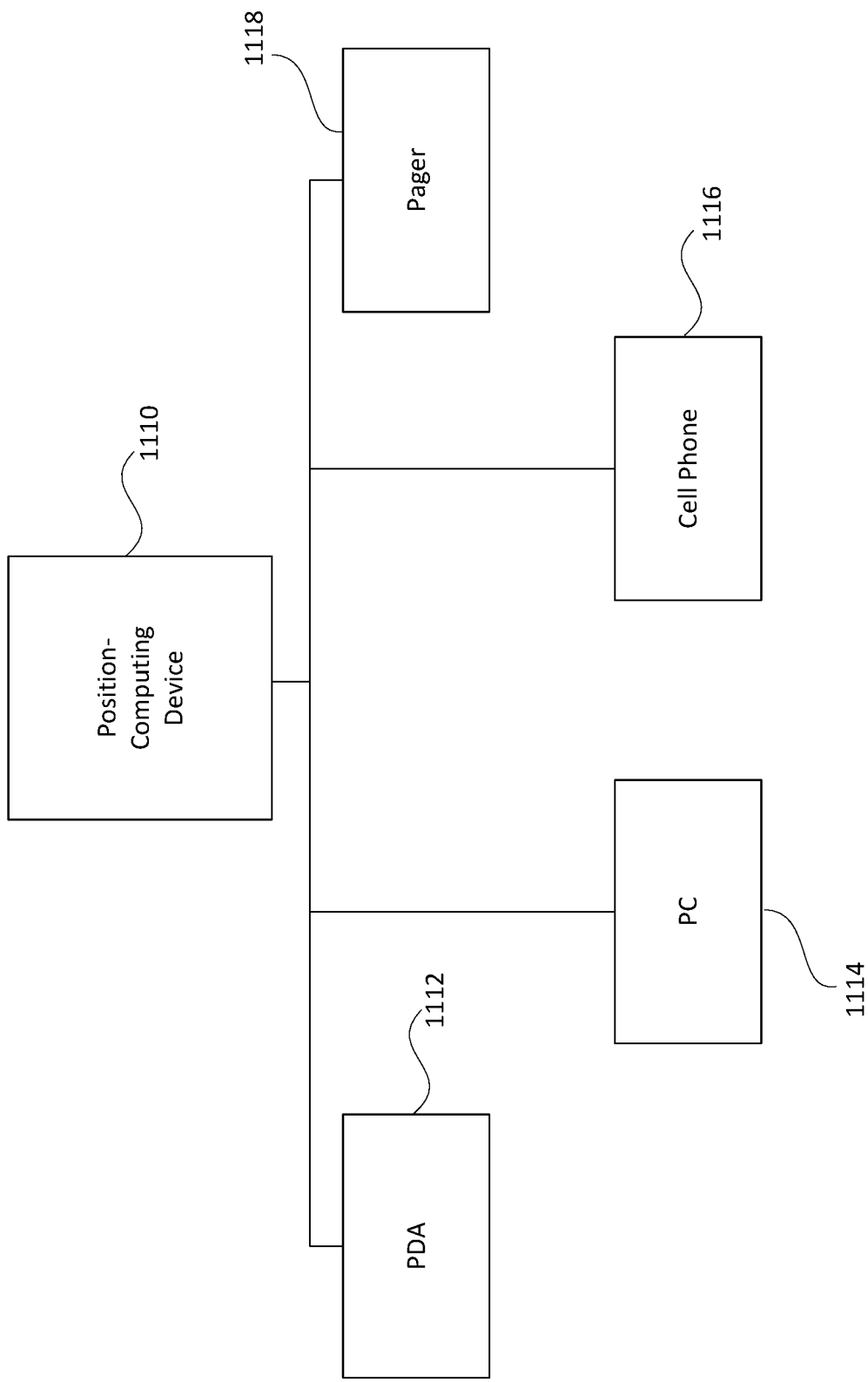
FIG. 10 shows a number of embodiments for the position-computing device of the present invention.

FIG. 10 shows a number of embodiments for the position-computing device 1110. The position-computing device 1110 can be a personal digital assistant (PDA) 1112, a personal computer (PC) 1114, a cell phone 1116, a pager 1118, or other types of electronic device typically with computation and signal transceiving capabilities.

In one embodiment, the position-sensing device 1102 does not have any user input/output interface other than a link (e.g., wireless link) to the position-computing device 1110. With such an embodiment, the position-sensing device 1102 can be made particularly small and low cost. The position-computing device 1110, which can be a portable device, can provide user-interface functionality. For example, the position-computing device 1110 can include a keyboard, a touch-pad or a stylus for information entry. The output of the position-computing device 1110 can be text, audio or graphical. When the position-computing device 1110 has a display screen, then text or graphics can be displayed on the display screen. As an example of a graphics output, the position-computing device 1110 can display a moving map on the display screen. In the case of an audio output, the position-computing device 1110 can, for example, output voice instructions pertaining to positions. In one embodiment, the computation capabilities of the position-computing device 1110 are also applicable for other applications. For example, when the position-computing device 1110 is implemented by a PDA 1112, the PDA 1112 can operate to perform processing for calendars, appointments, address books, phone books, or other application provided by the PDA 1112.

Figure 11:
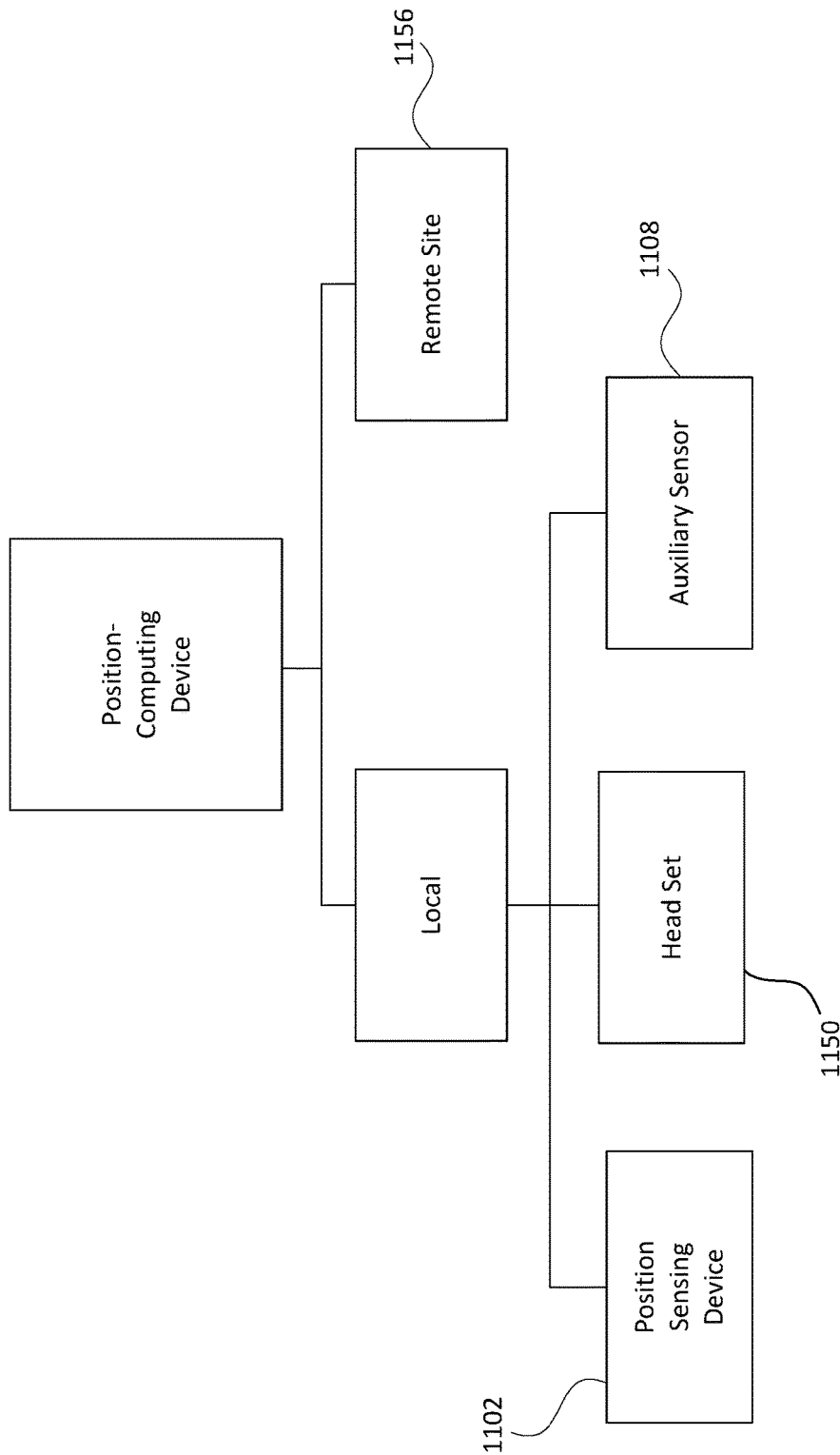
FIG. 11 shows examples of connections made by the position-computing device of the present invention.

FIG. 11 shows examples of connections that can be made by the position-computing device 1110. Locally, the position-computing device 1110 can be coupled to a position-sensing device 1102. In one embodiment, the communication between the position-sensing device 1102 and the position-computing device 1110 can, for example, be via a Bluetooth network or a wireless LAN (e.g., Wi-Fi, 802.11a or 802.11b). In such an embodiment, the position-computing device 1110 can be placed anywhere within the signal reception range of the wireless link from the position-sensing device 1102. For instance, the position-computing device 1110 can be placed in the shirt pocket of a driver, and the position-sensing device can be on the dashboard of the car. In any case, since the position-computing device 1110 and the position-sensing device 1102 do not have to be physically tied together via a cable, a user enjoys greater freedom in the placement of the position-sensing device 1102 and the position-computing device 1110. In yet another embodiment, the communication between the position-sensing device 1102 and the position-computing device 1110 can be through a serial connection (e.g., USB or FIREWIRE link).

The position-computing device 1110 can also be wirelessly coupled to a head set 1150 having a speaker and a microphone. Again, as an example, the wireless coupling between the position-computing device 1110 and the heat set 1150 can be via the Bluetooth or Wi-Fi protocols.

In one embodiment, a user wearing the headset 1150 can receive voice instructions via the wireless link between the position-computing device 1110 and the headset 1150. In addition to receiving the voice instructions (e.g., voice directions), the user can also issue voice commands to the position-computing device 1110 via the microphone of the head set 1150. Alternatively, the headset 1150 can couple to the position-computing device 1110 via a wired link (e.g., cable).

Figure 12:
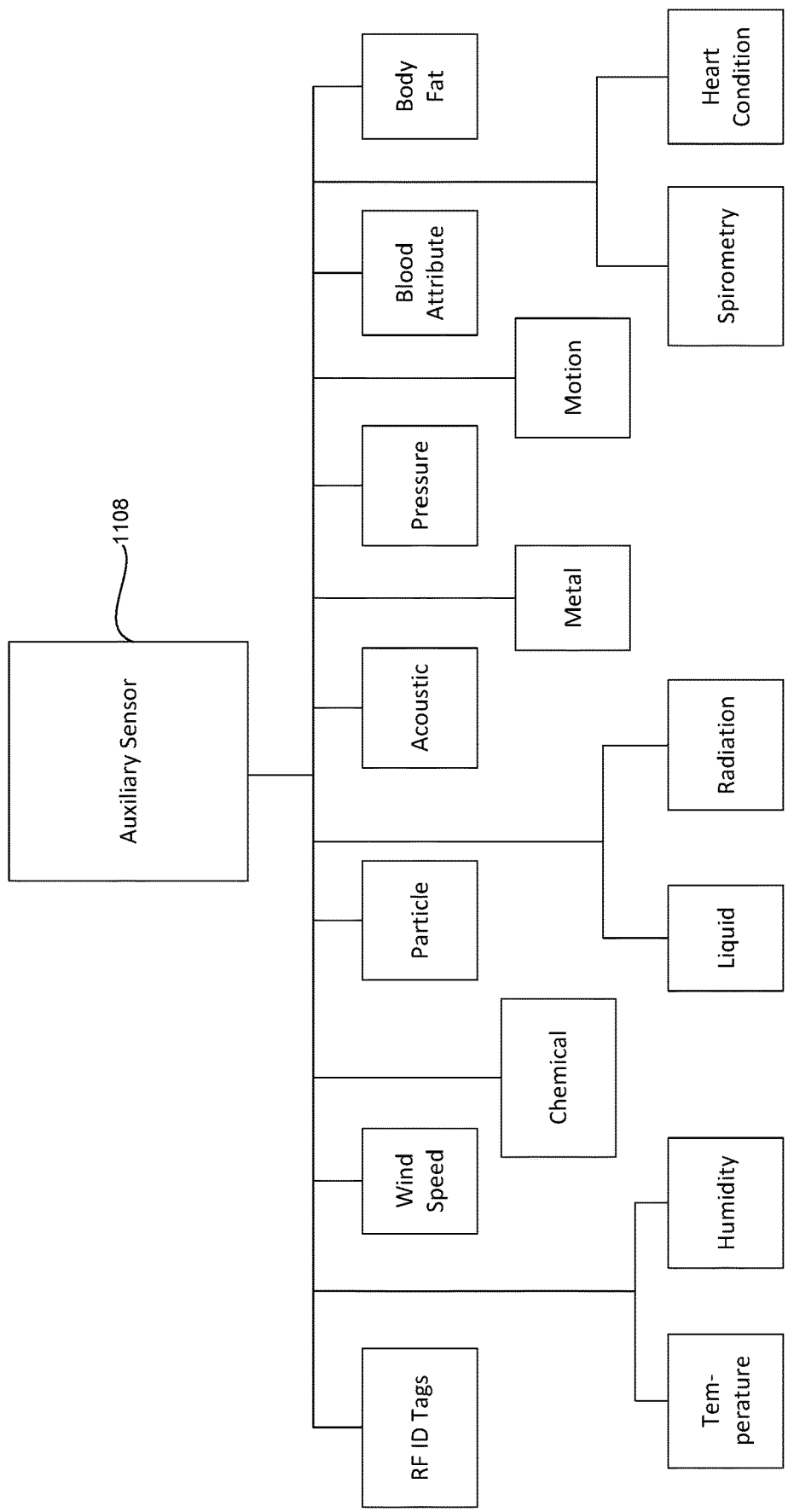
FIG. 12 shows examples of auxiliary sensors of the present invention.

The position-computing device 1110 can be locally coupled to one or more of the auxiliary sensors 1108. FIG. 12 shows examples of auxiliary sensors 1108. The auxiliary sensors 1108 capture or acquire auxiliary information, and then can wirelessly transmit such information to the position-computing device 1110. In one embodiment, an auxiliary sensor is not a position-sensing device.

The auxiliary sensor 1108 can be an environment sensor, capturing information regarding the environment where the position-sensing device 1102 is located. For example, the auxiliary sensor 1108 can be a sensor for temperature, humidity, wind speed, chemicals, particle, liquid, radiation, sound/acoustic, metal or pressure. When the auxiliary sensor 1108 is a chemical sensor, the sensor can, for example, sense oxygen level or carbon monoxide level. Similar to a chemical sensor, the auxiliary sensor 1108 can be an odor sensor. When the auxiliary sensor 1108 is a particle sensor, the sensor can, for example, be a smoke detector. When the auxiliary sensor 1108 is a radiation detector, the sensor can, for example, be a light sensor or an infrared detector. When the auxiliary sensor 1108 is a pressure sensor, the sensor can, for example, sense atmospheric pressure or device (e.g., tire) pressure.

The auxiliary sensor 1108 can also capture information pertaining to the position-sensing device 1102. In other words, the auxiliary sensor 1108 can sense information pertaining to the position-sensing device 1102 itself, such as its motion or pressure asserted on it. The information related to the motion of the position-sensing device 1102 can be its speed, direction of travel, acceleration, shock, or vibration. Regarding pressure, the auxiliary sensor 1108 can sense the force or pressure asserted on the position-sensing device 1102.

In one embodiment, the auxiliary sensor 1108 can be part of the position-sensing device 1102 and sense information regarding a living being (e.g., a person). The position-sensing device 1102 may be attached to the being or be in close proximity to the being. The information sensed by the auxiliary sensor 1108 can include the being's vital parameters. For example, the auxiliary sensor 1108 can measure the being's body temperature, blood attributes, spirometry, heart conditions, brain wave, sound/acoustic waves, or body fat. The blood attributes can include blood pressure, blood sugar or glucose level, or blood oxygen. Heart conditions can include ECG, heart rate, or arrhythmias. Sound/acoustic waves can be those measurable by a stethoscope or an ultrasound scanner. The auxiliary sensors 1108 can be non-invasive or invasive. The auxiliary sensors 1108 can be in vitro or in vivo.

Still further, the auxiliary sensors 1108 can also pertain to sensors for color, pattern, or touch (tactile).

In one embodiment, the position-computing device 1110 can be coupled to a remote site 1156, and can transmit the position-sensing device's position and/or auxiliary information to the remote site 1156 for additional analysis. The coupling can be through a local area network, or a wide area or global network. The wide area or global network can be a SMS network. The remote site 1156 can interface with users through a website. The additional analysis performed by the remote site 1156 can include a number of operations, such as labeling the positions of the position-sensing device 1102, enhancing the accuracy of the labels and/or positions, or compressing the position and/or auxiliary information received, as, for example, described in U.S. Provisional Patent Application No. 60/404,645, filed Aug. 19, 2002.

Figure 13:
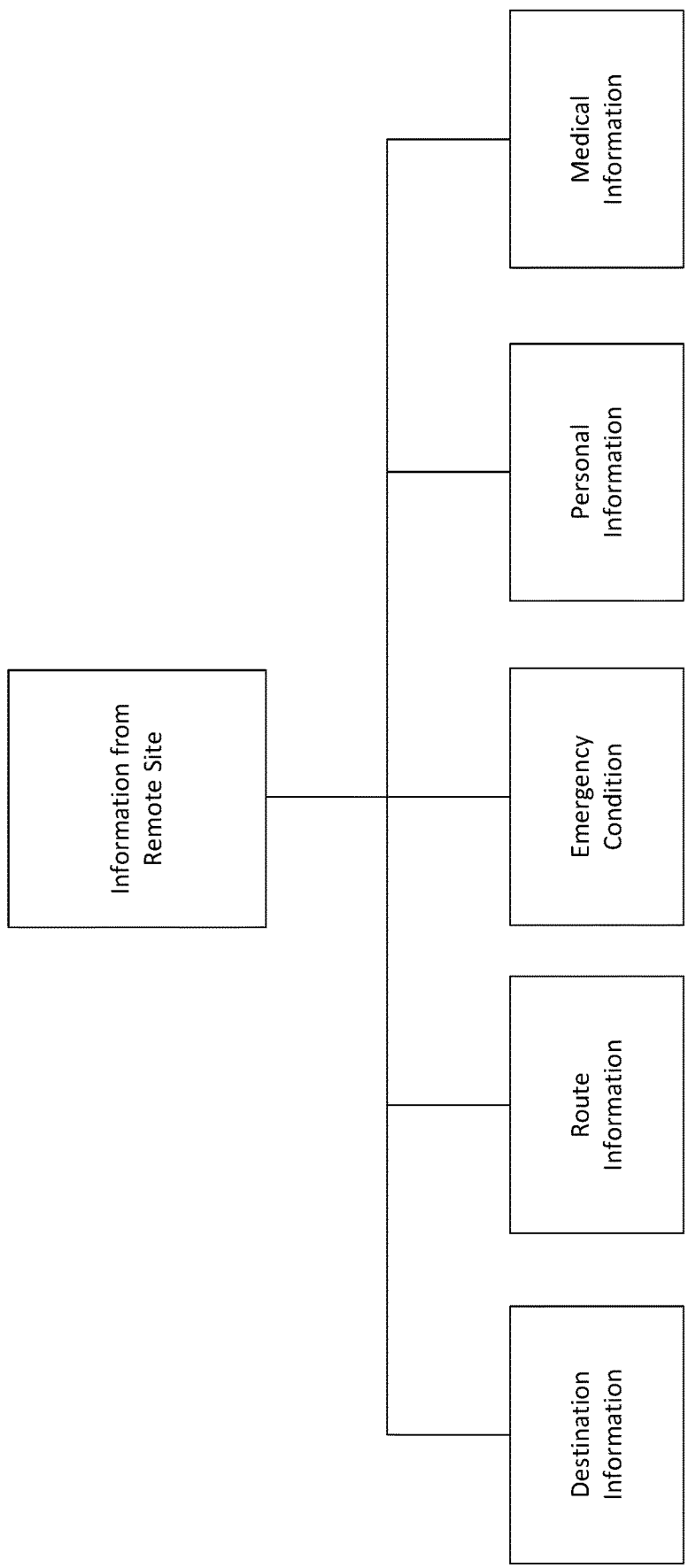
FIG. 13 shows examples of information provided by the remote site of the present invention.

The remote site 1104 can also provide information to the position-computing device 1110. FIG. 13 shows examples of information provided by the remote site 1104. For example, the remote site 1104 can provide information regarding the environment of the position-computing device 1110, such as information on a destination entered by the user into the position-computing device 1110. The destination can be a point of interest. As the user is traveling towards the destination, since the remote site 1104 can be made aware of the position of the position-sensing device 1102, route information can also be provided to the position-computing device 1110. Route information can, for example, depend on pre-programmed maps or include current traffic conditions. For example, an accident has just occurred on the freeway and traffic is held up. Such information can be transmitted to the user. In one embodiment, the remote site 1104 can send emergency conditions to the position-computing device 1110. For example, any emergency conditions, such as fire, flood and explosion, within a five-mile radius from a position-sensing device will be sent to its corresponding position-computing device 1110.

The remote site 1104 can provide information regarding a user to the position-computing device 1110. The information can be personal to the user of the position-computing device 1110. In one example, the information provided by the remote site 1104 can be medical in nature. For example, the user's heart beat is irregular and there is a hospital close to where the current position of the user. The remote site 1104 can suggest that the user visit the hospital, and provide the user with the corresponding directions. The hospital can also be notified of the imminent arrival and/or condition of the user by the remote site 1104 or the position-computing device 1110.

Figure 14:
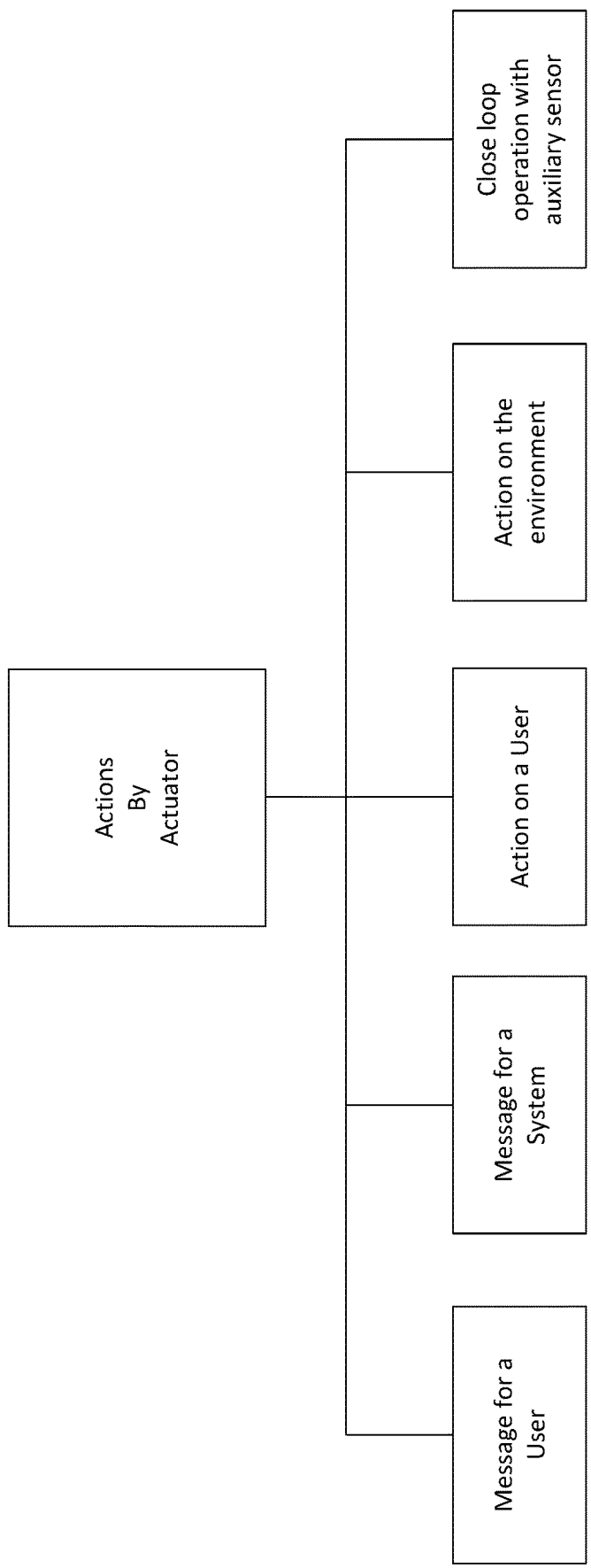
FIG. 14 shows examples of actions performed by an actuator of the present invention.

In one embodiment, the position-computing device 1110 is also coupled to the actuator 1106. In view of an analysis performed by the position-computing device 1110 and/or the remote site 1104, the actuator 1106 can be controlled to perform an action. FIG. 14 shows examples of actions performed by the actuator 1106. In one embodiment, the action is a message to a user of the position-computing device 1110 or to another person. The message can include text, audio or graphics. The message can describe certain actions the recipient should perform. The message might simply be an alarm, which can be a flashing red light or an audible tone. The action performed by the actuator 1106 can also be a message for a different system. Based on the message, the different system can initiate an action.

In another embodiment, the action performed by the actuator 1106 can be an action directly on a user. For example, in view of auxiliary information regarding the user's glucose level, the actuator 1106 can inject small doses of insulin into the user's blood stream.

In still another embodiment, the action performed by the actuator 1106 is an action on the environment or the surroundings in the vicinity of the position-sensing device 1102. For example, the action can be increasing the power to a heater to increase temperature, or to speed up a fan to decrease temperature.

Auxiliary sensors and actuators can work in a closed-loop situation so as to reach a pre-set point. For example, as a temperature sensor monitors the temperature of an environment, an actuator adjusts the speed of a fan or the power to an air-conditioner until a certain optimal or pre-set temperature is reached.

Figure 15:
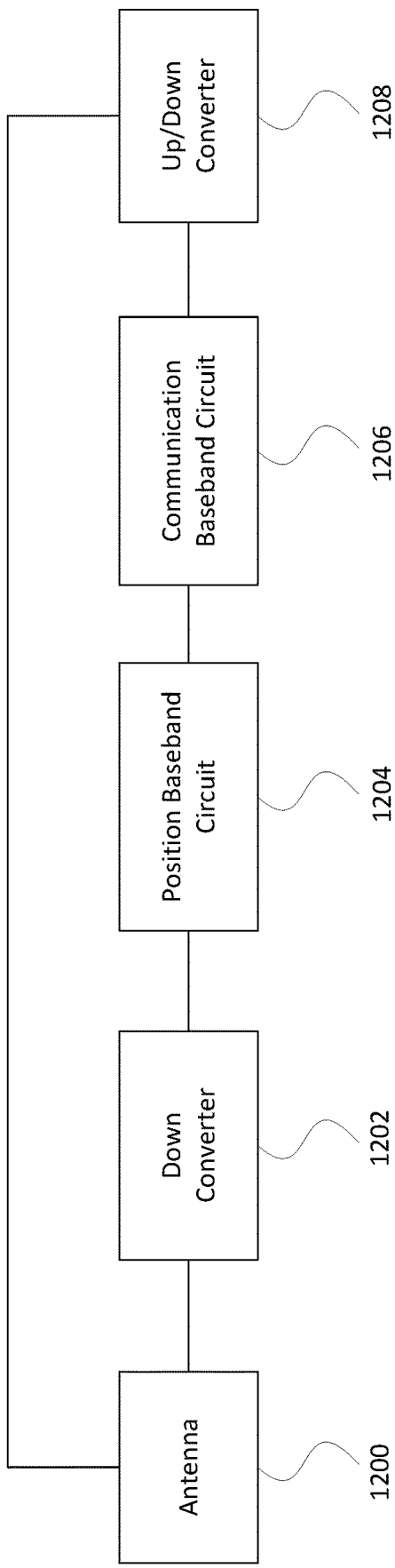
FIG. 15 shows one embodiment of the position-sensing device of the present invention.

FIG. 15 shows a position-sensing device according to one embodiment of the invention. The position-sensing device shown in FIG. 15 is suitable for use as the position-sensing device 1102 shown in FIG. 9. The position-sensing device includes an antenna 1200, a down converter 1202, a position baseband circuit 1204, a communication baseband circuit 1206, and an up converter 1208. The up converter 1208 may also serve as a down converter in another embodiment. Under that situation, the up converter 1208 can be known as an up/down converter. The following description is directed towards an embodiment that makes use of GPS to sense position, but it should be understood that the position-sensing device could use other technologies besides GPS.

In one embodiment, the antenna 1200 receives GPS RF signals and can also receive and transmit communication RF signals. After GPS RF signals are captured, the down converter 1202 down-converts such signals received from the antenna 1200 to lower frequency signals or baseband signals for further processing.

The position baseband circuit 1204 extracts raw position data from the GPS baseband signals. The raw position data are related to the pseudo-ranges from GPS satellites. Typically, a GPS baseband processor uses a digital signal processor core, which controls a set of GPS correlators. These correlators are usually set up to acquire and track the GPS satellite signals so as to produce the raw position data.

In one embodiment, raw position data are pseudo-ranges. Pseudo-ranges are typically estimates of distances between position-sensing devices and GPS satellites. In another embodiment, raw position data are from signals captured by the position-sensing device, but are less processed than pseudo-ranges. For example, as the GPS signals are received from the satellites, the position-sensing device does not perform the tracking calculations needed to maintain a closed tracking loop. Instead, the tracking calculations are performed by the position-computing device to generate, for example, pseudo-ranges, which are then used to generate a position. In this example, raw position data sent to the position-computing device are less processed than pseudo-ranges. The position generated can be, for example, the longitude and latitude of the position. In yet another embodiment, raw position data are information that needs additional processing before their corresponding position, such as its longitude and latitude, can be identified.

In one embodiment, the position-sensing device does not convert the raw position data to identify the position of the position-sensing device. Instead, the raw position data are sent to the position-computing device 1110, which will then compute a position based on these data. In another embodiment, these raw position data can be sent, via cellular link, to remote servers for position calculations. In either case, the position-sensing device does not have to perform the intensive position computations requiring processing capability from additional circuitry and consuming more power.

Figure 16:
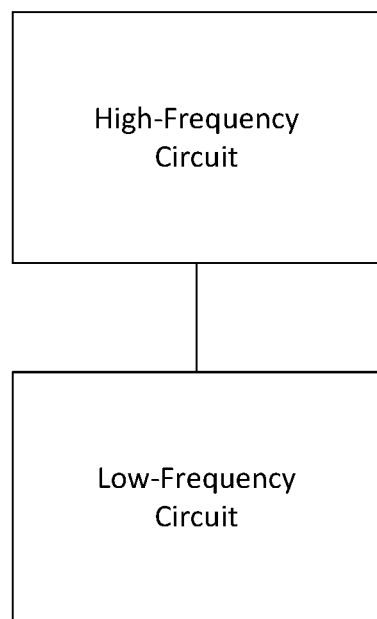
FIG. 16 shows one embodiment of the position-sensing device of the present invention having a high-frequency and a low-frequency circuit.

In one embodiment, to minimize space, and to reduce power consumption under certain circumstances, many components shown in FIG. 15 in the position-sensing device are integrated into a high-frequency circuit and a low-frequency circuit (FIG. 16). Sometimes, the high-frequency circuit can be called the analog circuit, while the low-frequency circuit, the digital circuit. For example, the GPS down converting and the communication up/down converting functions are integrated into the high-frequency circuit; and the position baseband circuit and the communication baseband circuit are integrated into the low-frequency circuit. The high-frequency circuit can be on a chip or substrate, and the low-frequency circuit can be on another chip. This results in a two-chip solution for a position-sensing device. In yet another embodiment, all these circuits could be on a common chip where high-speed analog circuits and digital circuits operate satisfactorily on the same substrate. If the antenna is an integrated-circuit antenna, to reduce loss, the antenna may not be on the same substrate as the other circuits, but can be on a separate low-loss material. In another embodiment, a chip or a substrate can be a circuit board instead.

Figure 17:
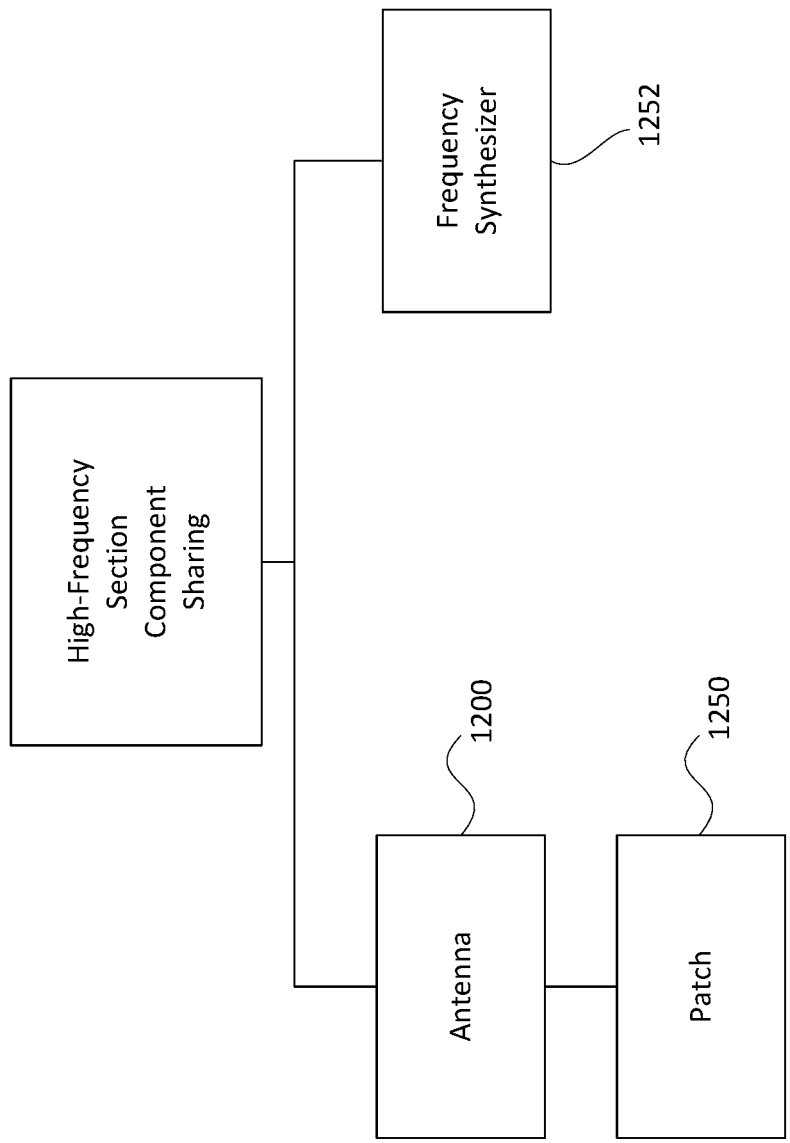
FIG. 17 shows examples of component sharing in the high-frequency section of the position-sensing device of the present invention.

Certain components in the high-frequency section of the position-sensing device can be shared. FIG. 17 shows examples of such sharing. Both the GPS RF signals and the communication RF signals can share the same physical antenna 1200. In one embodiment, the antenna 1200 can be a patch antenna 1250. Both the GPS RF signals and the communication RF signals can also share the same frequency synthesizer 1252, locked to a common timebase such as a crystal oscillator.

Figure 18:
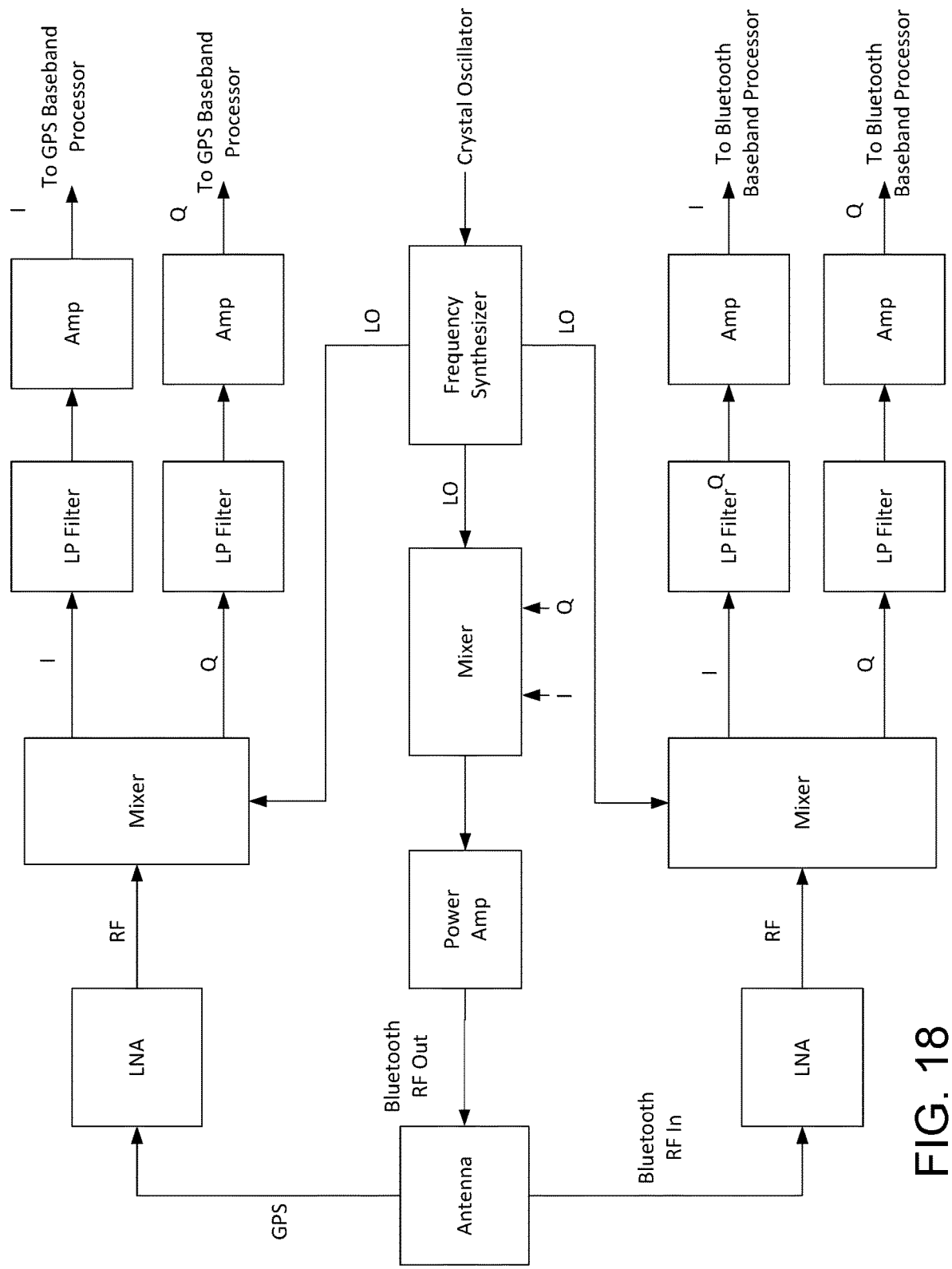
FIG. 18 illustrates one example of a high-frequency circuit of the position-sensing device of the present invention.

FIG. 18 shows one embodiment of the high-frequency circuit, using GPS and Bluetooth to illustrate different features. First, regarding the signal path of the GPS signals, an antenna receives the GPS RF signals, which are then amplified by a low-noise amplifier (LNA). The subsequent RF signals are down-converted to lower or baseband frequencies. This can be done by a mixer that mixes the RF signals with a LO signal from a frequency synthesizer. The mixer can be an image-reject mixer. The frequency synthesizer can be controlled by a temperature-compensated voltage-controlled external oscillator or timebase, which can be a crystal oscillator. The mixer output typically includes two signals, I and Q signals, which are in phase quadrature with each other. Both signals are amplified and then sent to a GPS baseband processor.

For the Bluetooth signals to be transmitted by the position-sensing device to the position-computing device, a mixer receives the I and Q signals from a Bluetooth baseband processor. The mixer, serving as an up converter, converts the two sets of signals to RF signals by mixing them with a LO signal from the frequency synthesizer. The communication RF signals are then amplified by a power amplifier to generate the Bluetooth RF output signals. The antenna then transmits the RF output signals to the position-computing device.

The position-computing device can also send Bluetooth RF input signals to the position-sensing device. This can be, for example, control signals for power conservation, configuration or other functions. Other functions can include initiating an action of accessing raw position data, or transmitting data to the position-computing device. As shown in FIG. 18, the Bluetooth RF input signals can go through similar signal processing as the GPS RF signals, but the I and Q signals are transmitted to the Bluetooth baseband processor. In this case, the mixer along the signal processing path can serve as a down converter.

A number of components are not shown in FIG. 18. For example, a mode switching circuitry with 3-wire bus input can be used to control the different modes of operation. In addition, there can be on-chip diplexers to control signal traffic for the different modes. There may be other passive components like filters for processing the RF and baseband signals.

Figure 19:
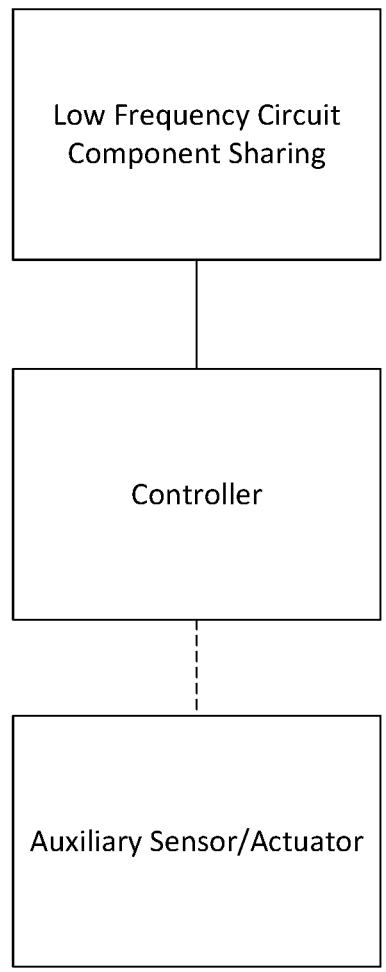
FIG. 19 shows examples of component sharing in the low-frequency circuit of the present invention.

Similar to the high-frequency circuit, certain components in the low-frequency circuit can be shared. FIG. 19 shows examples of such sharing. The communication signals and the GPS signals may share the same controller. An auxiliary sensor or an actuator can also share a controller.

FIG. 20A shows one embodiment of the low-frequency circuit, again using GPS and Bluetooth to illustrate different features. The GPS baseband processor receives and analyzes the GPS quadrature data, the I and Q signals. The GPS baseband processor is controlled by a controller with on-chip memory.

The Bluetooth baseband processor receives and analyzes the Bluetooth quadrature data from the Bluetooth RF input signals. The Bluetooth baseband processor is also responsible for generating the Bluetooth quadrature data, the I and Q signals, for the Bluetooth RF output signals. The Bluetooth baseband processor is controlled by the controller. The controller can have a separate and dedicated communication processor. In such a case, the logic circuitry of the controller will be simplified.

The controller can also be used to control one or more auxiliary sensors and/or one or more actuators. These auxiliary sensors and/or actuators can be integrated to the circuits of the position-sensing device, such as the low-frequency circuit, or can be on separate circuits/chips, or can be external to the device.

Figure 20B:
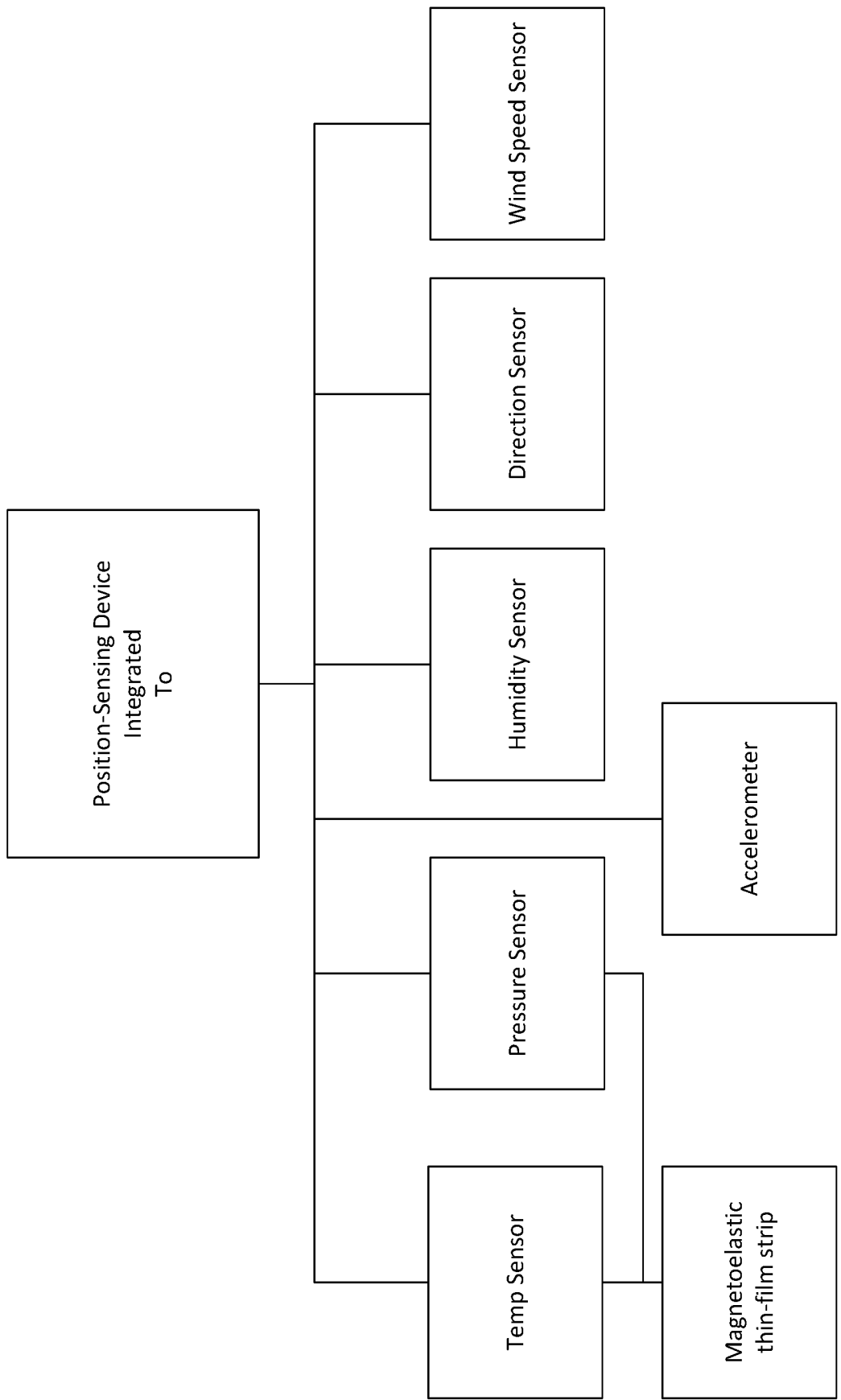
FIG. 20B shows examples of integrating a position-sensing device with different types of auxiliary sensors.

FIG. 20B shows examples of integrating a position-sensing device with one or more different types of auxiliary sensors. Other types of auxiliary sensors can be integrated. FIG. 20B provides examples for illustration purposes. The device can be integrated to a temperature sensor, a pressure sensor, an accelerometer, a humidity sensor and a wind speed sensor. The integration can be through integrated-circuit techniques, such as having one or more of auxiliary sensors on the same integrated circuit as the position-sensing device. Or, the integration can be through packaging, where one or more auxiliary sensors are in the same package as the position-sensing device.

An example of a temperature sensor is a magnetoelastic thin-film strip. The material's magnetic response changes when it is heated or cooled. A magnetoelastic thin-film strip can also be used as a stress sensor, again through monitoring its magnetic response. Such a strip can be, for example, one inch in length.

In another embodiment, two or more different types of auxiliary sensors are integrated together, without a position-sensing device.

Figure 21:
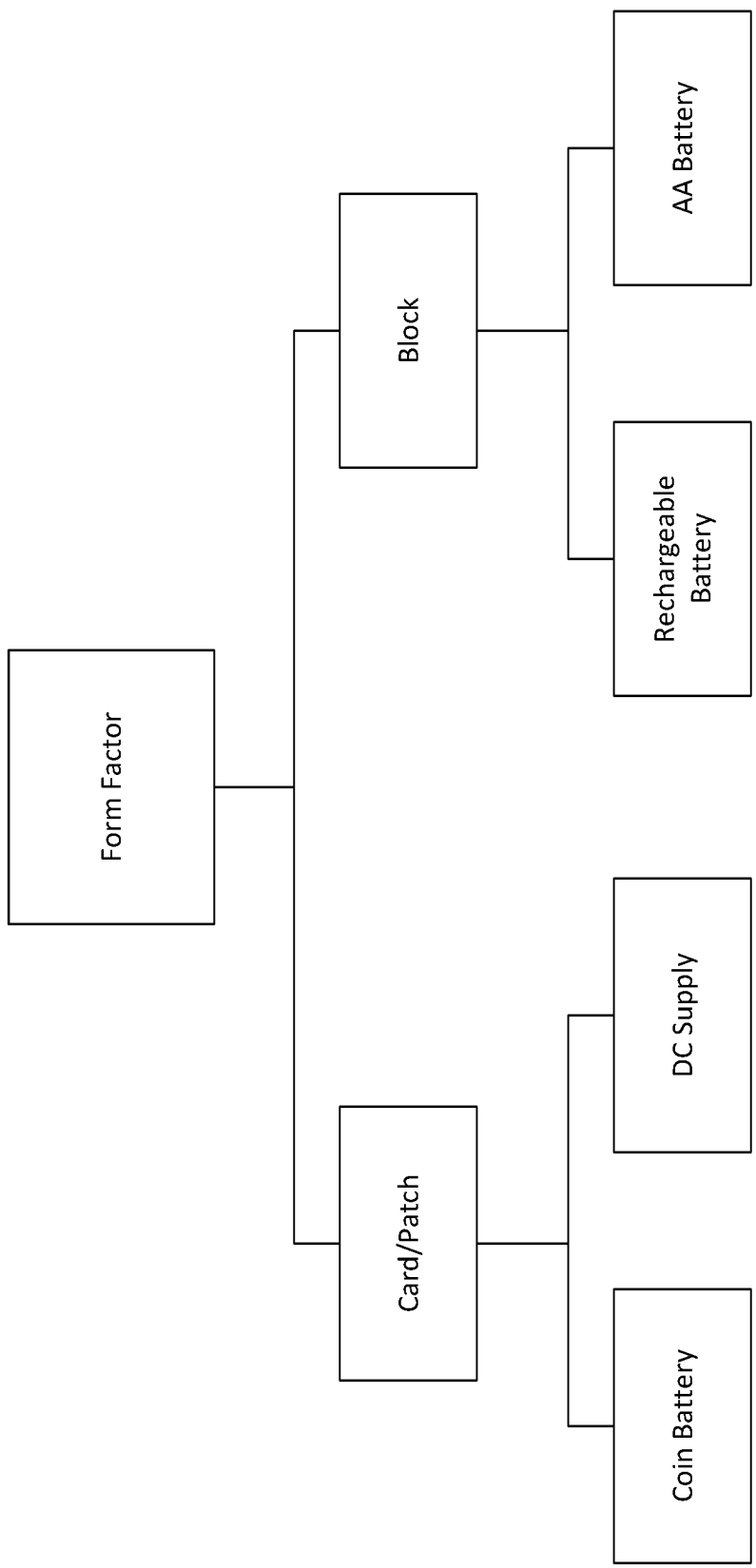
FIG. 21 shows examples of the position-sensing device form factor of the present invention.

The position-sensing device can be made relatively compact, enhanced through circuit integration. FIG. 21 shows examples of the position-sensing device form factor. The position-sensing device can be the size of a patch or a card (e.g., memory card or PC Card). The antenna can be a patch antenna. A patch can be a structure whose thickness is less than 0.5 inch and whose surface area is less than 2 square inches, or more preferably 1 square inch. In this situation, power can be from a dc power supply or a battery (e.g., coin battery). The dc power supply can be from the cigarette lighter outlet of a car or from an ac outlet with an external transformer. Certain features described in U.S. Provisional Patent Application No. 60/404,645, filed Aug. 19, 2002 can be incorporated into the position-sensing device to reduce power consumption.

In another embodiment, the size of the position-sensing device is thicker, more in the shape of a block. In this situation, the size is influenced by the size of its power source. For example, power can be from a rechargeable battery or from AA batteries.

Figure 22:
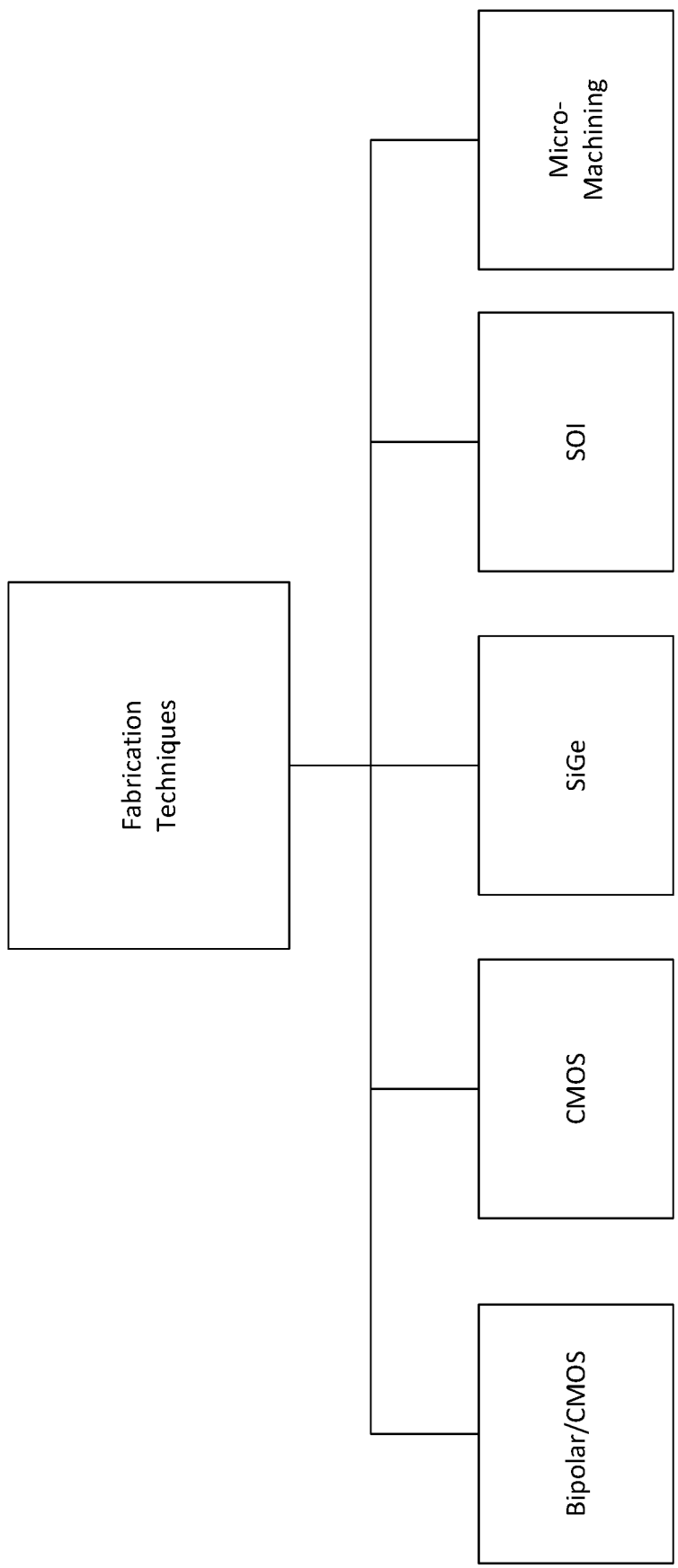
FIG. 22 shows examples of fabrication techniques for the present invention.

Different techniques may be used to fabricate different circuits described. FIG. 22 shows a few examples. The high-frequency circuit can be fabricated by bipolar processes, while the low-frequency circuit by CMOS processes. In one example, both the high and low frequency circuits are fabricated by CMOS processes. Other processing technologies can be used, such as BiCMOS, SiGe or SOI (Silicon-On-Insulator).

In one approach, an auxiliary sensor includes a mechanical device that can respond to mechanical forces. It can be fabricated by micromachining techniques. Devices made by micromachining techniques can also be known as micro-electromechanical systems or microsystems. The micromachining techniques include semiconductor processes. The auxiliary sensor can be integrated with the position-sensing device, such as on the low-frequency chip.

An example of an auxiliary sensor made by micromachining techniques is a pressure sensor. It can include a square membrane bulk-etched in a silicon wafer. This process etches away most of the thickness of a region of the die, called the diaphragm. Then piezoresistive (stress sensing) transducers can be deposited through diffusion to create a resistive bridge type structure. The etching process used to create the thin diaphragm can make the silicon wafer more fragile and susceptible to breakage during handling. To reduce in-process damage, the etch process can be performed as the last major photolithography step. The sensor can then be separated from the wafer, and bonded to a glass or Pyrex plate, or to a ceramics plate to increase its mechanical strength.

Figure 23:
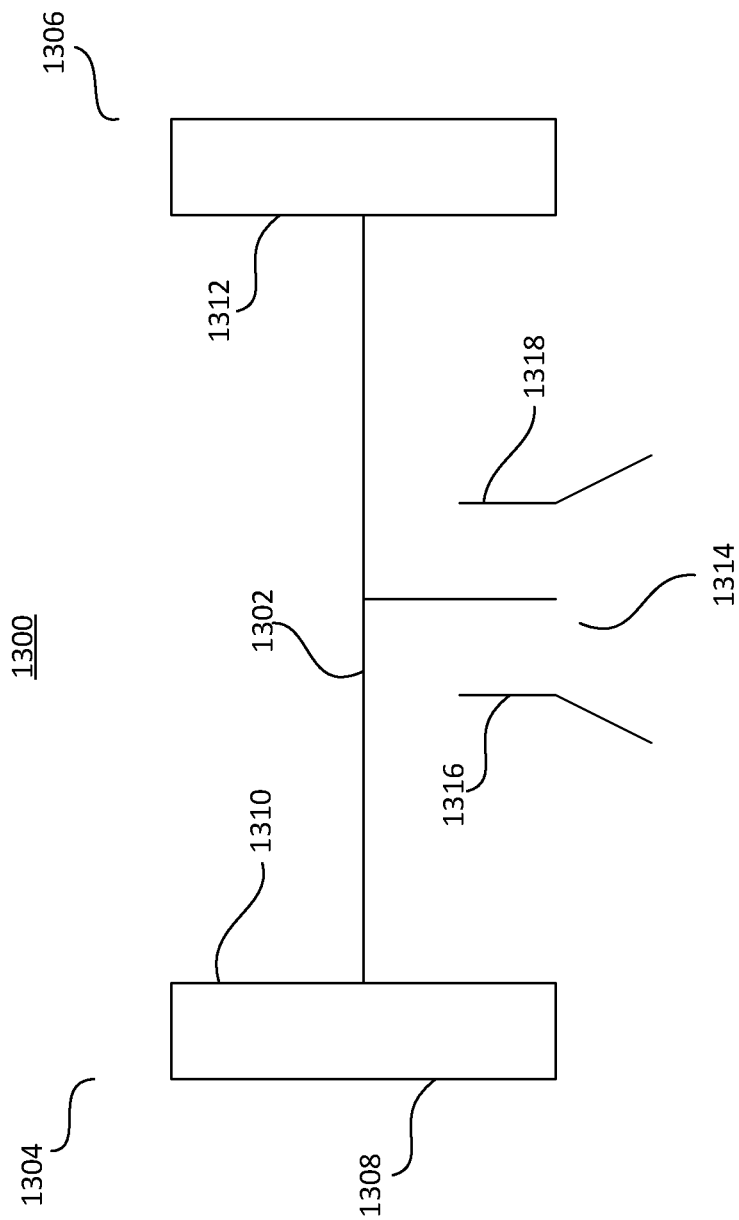
FIG. 23 shows an example of a micromachined accelerometer for the present invention.

Another example of such an auxiliary sensor made by micromachining techniques is a capacitive accelerometer or inertia sensing element. It can be a bulk micromachined capacitive accelerometer on a substrate. FIG. 23 shows an example. The accelerometer 1300 incorporates a moving inertial mass 1302 suspended by springs attached to a surrounding frame structure, which can be the substrate. There can be two springs 1304 and 1306, one connected to each end of the moving inertial mass. Each spring can be micromachined beams in the shape of a rectangular box, with two long beams connected at their ends. One of the long beam 1308 of the spring 1304 is stationary and is attached to the frame structure. The other long beam 1310 is a movable or flexible beam. That long beam 1310 is connected to one end of the inertial mass 1302, whose other end is connected to the long beam 1312 that is movable and flexible, of the other spring 1306. Again, the other long beam of the spring 1306 is stationary and is attached to the frame structure.

The inertial mass 1302 has a metallic finger 1314. The finger 1314 is positioned between two stationary metal bars, 1316 and 1318, on the frame structure. The distance between the finger 1314 and each of the metal bar changes as the inertial mass 1302 moves. This creates a variable capacitance between the moving inertial mass and each of the metal bars. There can be many fingers, each positioned between two bars, so as to have higher capacitance. To measure two axes of acceleration, two such accelerometers, positioned orthogonal to each other, can be used.

Yet another example of an auxiliary sensor made by micromachining techniques is for measuring information regarding a living being. In one embodiment, sensors made by such techniques can take very small amount of materials from the being as samples for measurement.

The auxiliary sensor may not have to include a mechanical device. For ease of integration, such auxiliary sensors can be fabricated by semiconductor processing techniques similar to those used in the position-sensing device. For example, the auxiliary sensor is a temperature sensor implemented with a diode. The diode can be fabricated on the same piece of substrate as the low-frequency circuit of the position-sensing device. Assume the circuits of the device are in an enclosure. The temperature gradient between the inside of the enclosure and the outside ambient of the position-sensing device can be calculated or measured. The temperature as measured by the diode on the substrate can be calibrated to subtract out the gradient. This will more accurately reflect the outside ambient temperature. In one embodiment, the temperature sensor is implemented with a thermal couple.

The auxiliary sensor can be in the same package as the position-sensing device but not share the same substrates as the circuits in the position-sensing device. For example, the temperature sensing diode can be separately encapsulated or enclosed, with the enclosed diode exposed to the outside environment, and with its leads bonded to circuitry in the position-sensing device. As another example, the geometry of the auxiliary sensor can be much bigger than the numerous circuit components of the position-sensing device. To illustrate, the diaphragm in a micromachined pressure sensor can occupy significant area. This area can be quite expansive if it is on the substrate of the low frequency circuit of the device. Hence, the auxiliary sensor can be on a separate substrate or circuit board.

In one embodiment, different chips or circuit boards described are stacked, one on top of the other, instead of having one substantially on the same plane as the other.

In yet another embodiment, an actuator also includes a mechanical device that can exert mechanical forces, and is fabricated by micromachining techniques. For example, the micromachined actuator is for administering small doses of insulin into a person's blood stream.

In one embodiment, some of the high-frequency components in the device are also fabricated by micromachining techniques.

In one approach, the micromachining process is a bipolar process. In another, it is a CMOS process. In yet another approach, it is a BiCMOS process.

In one embodiment, a position sensing system can include more than one type of position detection mechanisms. Such a system can be known as a multi-type position sensor. For example, two types of position detection mechanisms can be a GPS sensor and a RF ID tag. In one embodiment, the RF ID tag can be integrated with circuitry of the GPS sensor. In another embodiment, the GPS sensor and the RF ID tag are on separate substrates or circuit boards, or in separate enclosures. In yet another embodiment, the RF ID tag is on a plastic substrate. The GPS sensor can provide more coarse position information, while the RF ID tag provides finer position information. In another example, the GPS sensor can provide position information in an outdoor environment, while the RF ID tag can provide for position information in an indoor environment, such as a large warehouse. The multi-type position sensor can include a position-sensor selector. When the multi-type position sensor is in transit from one warehouse to another, the selector activates the GPS sensor to track position. When the multi-type position sensor is moved into a warehouse, the selector would select the RF ID tag to take over the position-sensing responsibility. As another example, two types of position detection mechanisms can be a GPS sensor and a local wireless network sensor (e.g., Bluetooth or Wi-Fi transceiver). In one embodiment, a multi-type position sensor, or at least the GPS sensor within the multi-type position sensor, extracts raw position data, but does not convert the raw position data into the position of the multi-type position sensor.

Figure 24:
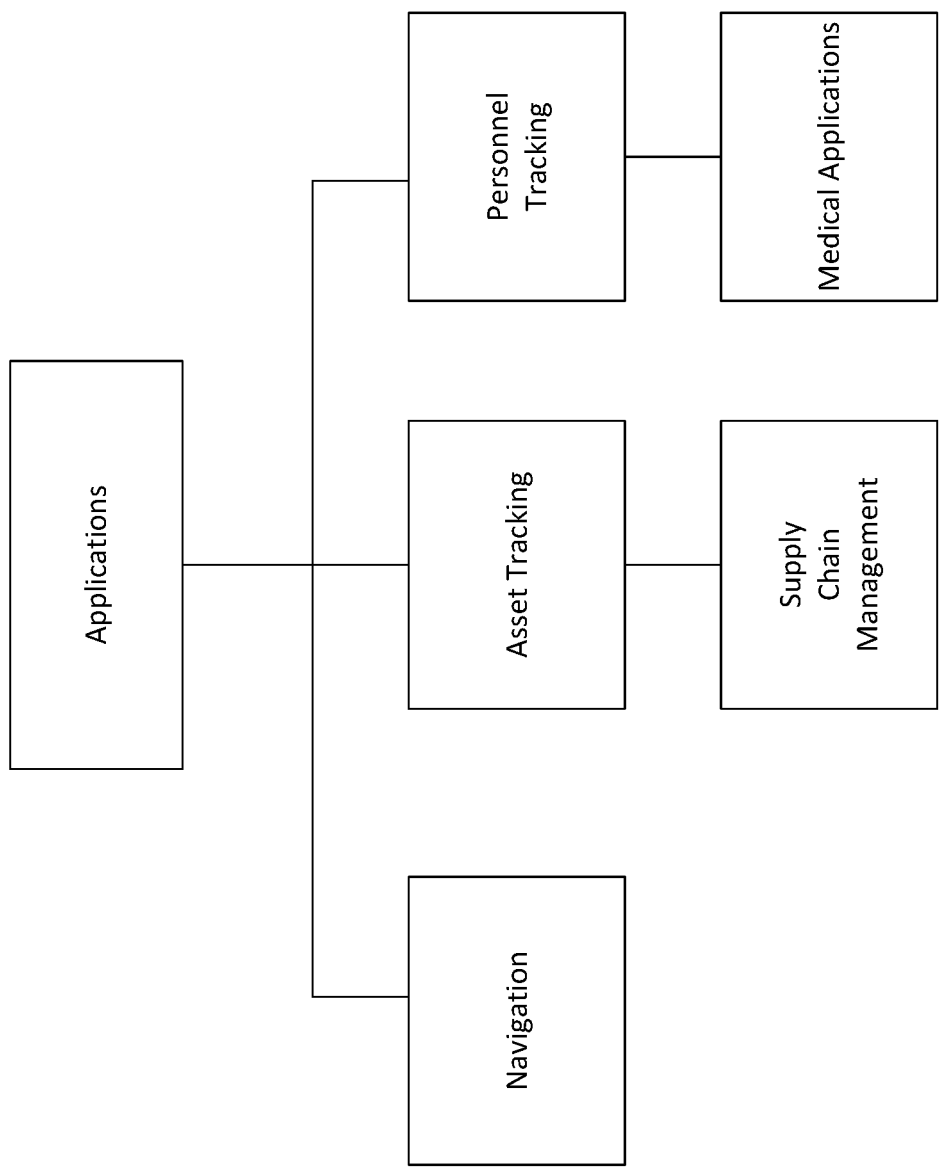
FIG. 24 shows examples of applications for the present invention.

FIG. 24 shows a few examples of applications for the present invention. One application is in navigation. The position-sensing device can be attached to the top of the dashboard or to the rear window of a car. The position-computing device can be a PDA next to the driver or in the driver's pocket. The PDA can contain a navigation program that performs route calculations, based on user input (e.g., a destination location), with a map database stored in the PDA's memory. The map may be downloaded from a remote site. The downloading can be performed before or after the destination position has been entered into the PDA.

The navigation program allows the driver or a passenger to enter a destination position, e.g., in the format of a street address or a point on a map display. The program then can compute a route based on the map database to guide the driver to that destination. Such guidance can be in the form of turn-by-turn voice instructions. As an example, a car rental company can incorporate such technologies into its car rental policy and offer them as an additional feature.

Another application is in the area of asset tracking and management. A cost-effective asset tracking system can be built based on a number of embodiments described. For example, a position sensor can include a low-cost GPS position-sensing device and a position-computing device (e.g., PDA with cellular or other wireless communication ability). The position-computing device can also be wirelessly connected to a remote station or site.

In one embodiment, products/materials can be tracked by a position sensing system. This can be used in supply-chain management. When a product requires multiple parts/materials to be assembled or integrated together, to have each of the right parts/materials available at the appropriate time is sometimes critical to success. To reduce total costs, a company has to control the amount of materials/parts at rest (inventory) and the speed and costs of materials/parts in motion (freight). If different parts/materials come from different channel partners, to control cost, the company may want to work with their partners to keep their assets (the parts/materials) moving to the company at the minimum level needed to keep customers satisfied. To achieve that, the company should know where the different parts/materials are and to control the rate they are transported. Not only would this help the company lower its expense by reducing its inventory, the company can better satisfy its customers with sufficient inventory.

A piece of inventory can be in freight or it can be in a large warehouse. Sometimes, the piece of inventory has to be tracked in both situations. In one embodiment, the position sensing system can include two types of position sensors—a multi-type-position sensor. One position sensor (a GPS sensor) is for sensing the inventory when it is being transported from an airport to a warehouse, and the other (such as a RF ID tag or a bar code) for sensing its location inside the warehouse. In another embodiment, a piece of large inventory can include many sub-pieces. The piece of inventory can be tracked by a GPS sensor, and may also be tracked by a RF ID tag. Once inside the warehouse, the piece of inventory can be transported to a center, where it is unpacked, with a number of the sub-pieces separately distributed through the warehouse. Each sub-piece can be identified and tracked within the warehouse by its individual bar-code or RF ID tag.

The inventory location information can be wirelessly entered into a warehouse management system, which allows users to see the status of incoming goods, outgoing shipments, and available inventory. Reports can also be generated. The warehouse management system can allow the inventory to be managed in real time. Such information is useful for procuring, maintaining, transporting and delivering products through every stage of production from the source of supply to the final point of consumption. Such information could also assist in providing an audit trail for accounting purposes.

The above embodiments describe tracking inventories, such as, by the management. However, a consumer can track a piece of inventory as well. A typical supply chain includes four entities—manufacturer, wholesaler, retailer and consumer. In one embodiment, a consumer can drive what a manufacturer should produce and ship. For example, the consumer can get in touch with the call center of the retailer, or enters his request into the retailer's web site. Such a request can directly go to the manufacturer, which would assemble the product to be shipped to the consumer. Based on a number of the embodiments of the present invention, the consumer can track the location of his request in real time, such as through a web site. Thus, the consumer directly drives what should be produced and shipped, and tracks his shipment, from inside a warehouse to his door step.

Another example of involving a consumer is for products at least partially assembled by the consumer. A retailer can have thousands of components in the store. It is up to the consumer to pick and choose the components desired for subsequent integration. If the consumer selects two components, manufactured by two different manufacturers, the retailer can place the order to the two manufacturers. One goal of the retailer may be to ensure that both components arrive around the same time at the retailer's store. The two components can be ready for shipment at different time. Or, the two components can arrive at different time frames, even if they are shipped at the same time. This can be due to differences in locations or differences in delivery method. One approach to achieve the retailer's goal is to allow the component that needs more time (long-time component) before reaching the retailer dictate the delivery of the other component. For example, when the manufacturer of the long-time component is ready to ship its component, that component is shipped, with its position tracked by an embodiment of the present invention. Only when the long-time component is within a certain distance to the retailer, the retailer initiates the delivery of the other component. In other words, the retailer (or the system automatically) changes the delivery time of the other component based on the position of the long-time component. When both components arrive, the retailer/system can notify the consumer.

In tracking assets, a position sensor can include additional auxiliary sensors, such as temperature and humidity sensors. The following illustrates an example of asset tracking based on a position sensor and an auxiliary temperature sensor. Assume that a company needs to produce a product that requires two very expensive parts to be integrated together at a warehouse. One part is manufactured by a local sub-contractor. The other part is from a remote sub-contractor thousands of miles away. This other part is also temperature sensitive. Due to cost and liability, the company does not want to order and store any one of the two parts in the warehouse unless the product has to be produced. Assume an order is received for the product. The company has a supply-chain management controller, which can include a warehouse management system. The controller automatically requests the sub-contractors to make and ship the parts so that the company can produce the ordered product as needed.

Assume the temperature-sensing part is ready and is shipped first. Once shipped, the controller tracks the temperature-sensitive part in motion based on a position sensor. The controller is also aware of the temperature of the ambient surrounding that part based on an auxiliary sensor. Assume the temperature-sensitive part becomes defective during shipment due to accidental temperature rise, even though the part is still thousands of miles away from the company. Since the temperature sensor sends information to the controller, the controller is aware that the temperature-sensitive part has to be replaced. Based on such information, the controller automatically orders the local sub-contractor to hold delivery of its part, until the remote sub-contractor is ready to ship a new temperature-sensitive part to the company.

Such real-time location and/or auxiliary information notification and control are very helpful for a company to manage its inventory. Such information is not only applicable to asset tracking/management, supply chain management or product management, but also can be applied to enterprise resource planning and customer relationship management. For example, in customer relationship management, a call center support staff can inform a customer of the location and condition of her product. Alternatively, a customer can access real-time information (e.g., location and condition) via a web interface or by receiving notifications (e.g., email notifications).

Personnel tracking can be another application. For example, additional auxiliary sensors such as body temperature or blood oxygen sensors, or heart-beat monitors can provide important physical health parameters to interested persons (e.g., health professionals) wishing to monitor the position and well-being of their clients. Personnel tracking can also include tracking of other forms of living beings, such as animals.

Different examples of sensors have been described. In one embodiment, a sensor not only can sense but can also transmit information regarding an object. For example, the sensor is a RF ID tag with information stored in the tag about an object. The tag can transmit such information to a recipient.

In a number of embodiments, not only can the size of the position-sensing device be made compact, the position-sensing device can be relatively inexpensive. For example, to reduce cost and size, the position-sensing device does not have a display or keyboard entry for user input. Information can be received and transmitted wirelessly. Also, the position-sensing device does not have to include circuitry to perform processing to calculate its position or determine actions.

A number of devices have been described where the position-sensing device is separated spatially from the position-computing device. Alternatively, the position-sensing device and the position-computing device are in one package.

A number of embodiments have been described that include a position-computing device. One embodiment does not include a position-computing device. Instead, its function is performed by a remote site. The corresponding position-sensing device directly communicates with and is controlled by the site. In this embodiment, auxiliary sensors and/or actuators can also communicate with and be controlled by the site. As an alternative embodiment, the position-sensing device can collect information from, and distribute information to, the additional auxiliary sensors and/or actuators. In other words, the position-sensing device communicates with the site on behalf of the auxiliary sensors and/or actuators.

Figure 25:
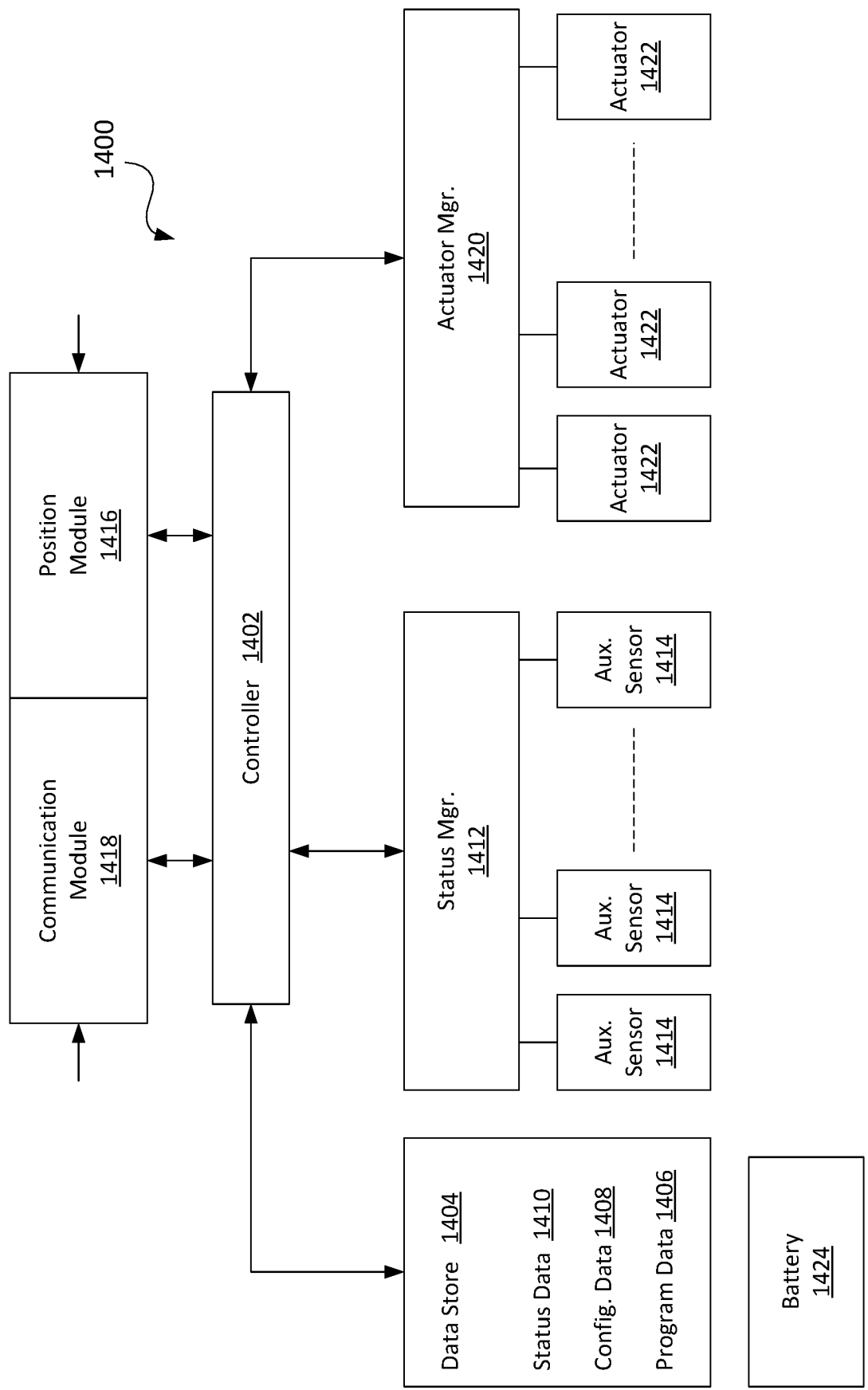
FIG. 25 is a block diagram of a mobile device according to one embodiment of the invention.

FIG. 25 is a block diagram of a mobile device 1400 according to one embodiment of the invention. The mobile device 1400 is suitable for use as a position sensing system, a medical monitoring device, a position tracking device, or other positioning device.

The mobile device 1400 includes a controller 1402 that controls overall operation of the mobile device 1400. A data store 1404 is connected to the controller 1402 and provides storage of data. The data stored in the data store 1404 can include program data 1406, configuration data 1408, and status data 1410. The status data 1410 are data related to the status of an object being monitored, such as position information and/or auxiliary information of the object. The status data 1410 are acquired by one or more auxiliary sensors. A status manager 1412 couples to the one or more auxiliary sensors 1414. The controller 1402 interacts with the status manager 1412 to obtain the status data 1410.

In addition, the controller 1402 couples to a position module 1416 and a communication module 1418. The position module 1416 can receive signals that are used to determine a position of the mobile device 1400. In one embodiment, the position module 1416 is a GPS receiver. The communication module 1418 allows the mobile device 1400 to communicate in a wireless manner. The wireless communications are over a wireless network (e.g., SMC network, a cellular network, a Bluetooth network, a Wi-Fi network, etc.). The wireless communication capabilities can be used to communicate with a remote server (e.g., send status data to the remote server), sending or receiving messages (e.g., notifications) to other mobile devices, or as an alternative or additional means of determining position.

The mobile device 1400 can also include an actuator manager 1420 that couples to one or more actuators 1422. The actuators 1422 can be controlled by the actuator manager 1420 to perform an action. The controller 1402 interacts with the actuator manager 1420 to direct any of the actuators 1422 to perform an action. FIG. 14 shows examples of actions that could be performed by the actuators 1420. For example, the action is a message to a user of the mobile device 1400, another person, a different system, or an action on a user.

The mobile device 1400 further includes a battery 1424 that supplies power to the mobile device 1400. The controller 1402, or a power manager (not shown), can also perform power management functions to reduce power consumption and thus extend battery life. For example, circuits or components can be power-off or placed in low-power mode when not active. Further, in one embodiment, the communication module 1418 and the position module 1416 can share components to reduce cost, die area consumption and power consumption (see, e.g., FIGS. 15-20).

Although the mobile device 1400 shown in FIG. 25 includes the status manager 1412 and the actuator manager 1420, such managers are not required as their operations can be performed by the controller 1402. However, when provided, managers can off-load processing from the controller 1402 to the managers which reduce processing load on the controller 1402. The mobile device 1400 can also facilitate power management by separately controlling power to the controller 1402 and any managers provided. In addition, the mobile device 1400 need not include any of the actuators 1422.

Figure 26:
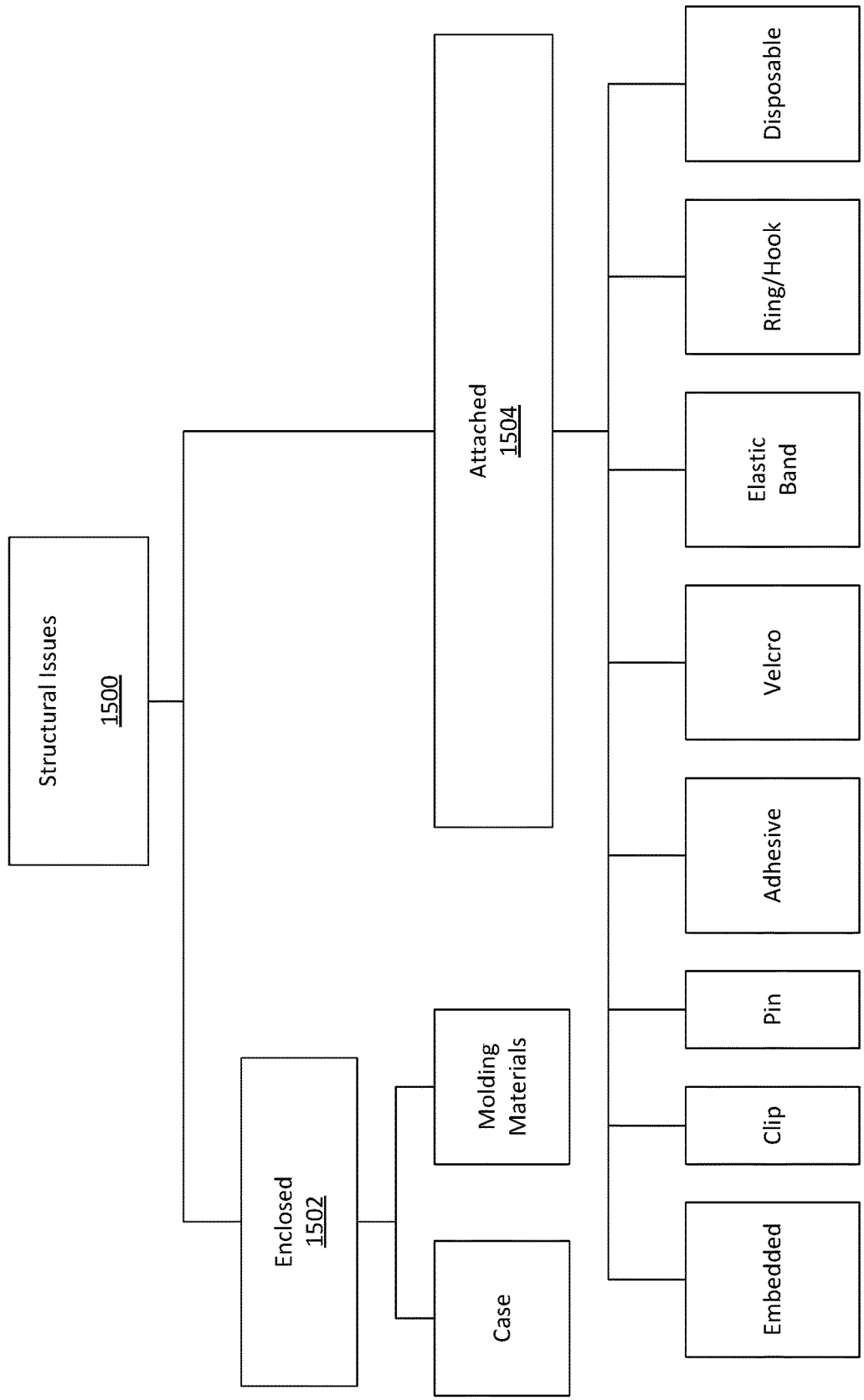
FIG. 26 shows a number of structural issues regarding the devices for the present invention.

As described, a number of embodiments of the present invention can be quite compact. FIG. 26 shows a number of structural issues 1500 regarding the devices for the present invention.

The circuits in a mobile device (e.g., a position sensing system, a position sensing device, a medical monitoring device, or a position tracking device) can be encapsulated or enclosed 1502 in a number of ways. For example, the circuits can be in a case or housing. The circuits can be enclosed by a molding compound. The molding compound can be epoxy, rubber, plastic or other materials. The enclosed circuits can become the housing of the device.

After the enclosing, the enclosed circuits of the mobile device can be attached 1504 to an object (e.g., a package) or a being (e.g., a person) in a number of ways. For example, the enclosed circuits can be in a module, with the module embedded as a unit into the object or being. A being can be a living being or a dead being, for example, a living person or a dead dog. The enclosed circuits can be attached (directly or indirectly) to the object or being through a clip and a pin. The enclosed circuits can be referred to as being wearable. Other attachment techniques include Velcro® and adhesive, either permanently, such as with a glue, or in a non-permanent manner, such as patches that are adhered to the body. The enclosed circuits can be attached with a band, such as an elastic band. The enclosed circuits can be attached by having a ring or a hook. The enclosed circuits can be worn as a necklace, bracelet or other types of fashionable item.

The enclosed circuits can be attached by a mechanism that is designed to be disposed or disposable. For example, the attachment can be through an adhesive tape that has an envelope or pocket. The enclosed circuits can be provided in the envelope, and the envelope can be closed such as by Velcro® or adhesive. The tape can be attached to an object. After finished using the circuits, a user can dispose of the tape, but keep the enclosed circuits.

One embodiment of the invention includes a solar panel. The solar panel can provide electrical power to, for example, a position-sensing device. The solar panel can thus charge a battery used to power the device and/or itself to power the device. When the device is affixed to an object (e.g., a package), the solar panel can remain at least partially exposed to the outside of the object so as to be able to receive light. The solar panel can be integrated with the housing of the device or can be separate and couple to the device via one or more wires (e.g., a cable). For example, the battery 1424 of the mobile device 1400 can be charged by a solar panel.

In one embodiment, a user can set permission levels. These levels can determine the identity of the person or system that can get information from different embodiments of the present invention, such as a position-computing device, a position-sensing device, a medical monitoring device, a mobile device and/or an auxiliary sensor. The permission levels can also include the time frame when a person or system can get the information. If the user desires, the user can even turn the device off. In that situation, no one has the permission to access information. This can be done, for example, through entering commands into or programming a position-computing device, a position-sensing device, a medical monitoring device, or a mobile device. In another embodiment, the permission can be set at a remote site that communicates with a position-computing device, a position-sensing device, a medical monitoring device or a mobile device.

In yet another embodiment, a position-sensing device or a position sensor is not active until a battery is inserted or a switch is turned on. The device might include a unique identifier, which can be a number. In another embodiment, the device is in a low power mode (e.g. sleep mode) but is programmed to wake up at certain times to listen for commands directed to it. For example, a position-computing device can transmit, through Bluetooth, to the device, a command and the unique identifier, which is used to identify the recipient device of the commands. Once the commands are received, the device becomes active.

Figure 27:
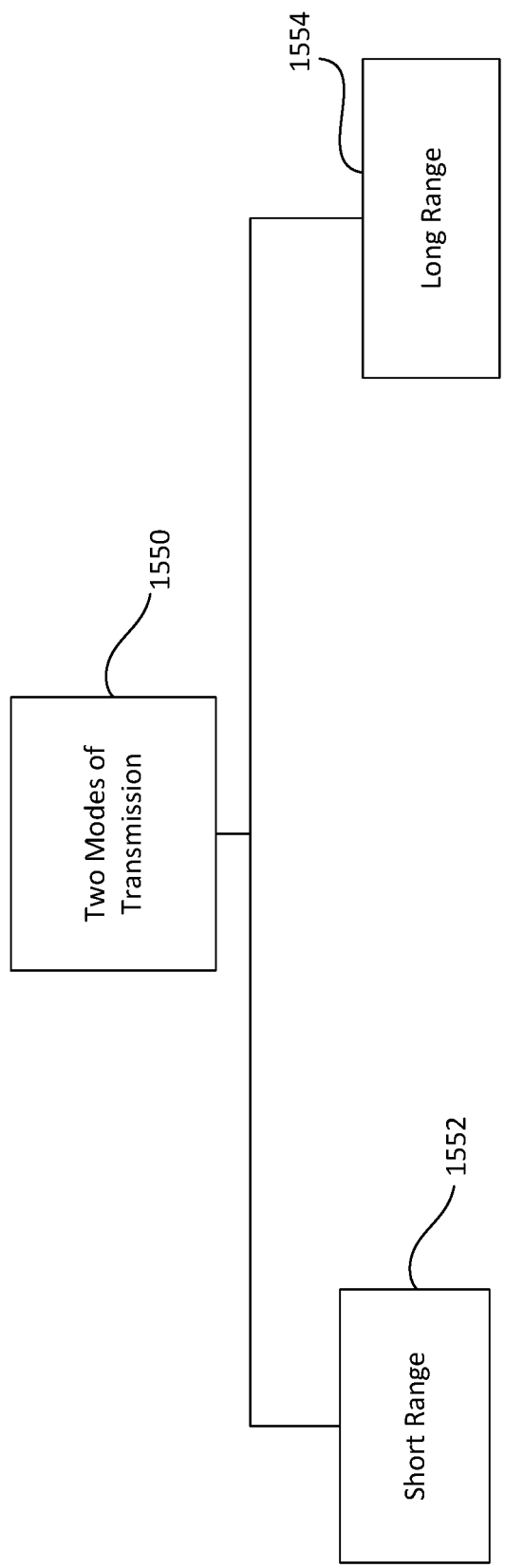
FIG. 27 shows one embodiment of the invention that includes two modes of transmissions.

In one embodiment, a position-sensing device includes two (2) modes of transmissions 1550, as illustrated in FIG. 27. Raw position data can be transmitted through either one of the two modes. One mode is short range 1552, and the other is long range 1554. The short-range transmission is to transmit, such as through Bluetooth, to a receiver in close proximity. Such transmission can be to a position-computing device in its vicinity (e.g., within 30 feet). The other mode is much longer range, such as to a Wi-Fi, cellular, or a pager network. This longer-range transmission consumes more power than the short range transmission. The destination for the long range transmission can be to a remote server. In another embodiment, the short-range transmission can be through Wi-Fi also, while the long-range transmission can be to a cellular or pager network.

In normal operation, the device prefers to transmit and receive signals using short-range communication. In one embodiment, after the position-sensing device has been activated, the position-sensing device starts in a short-range mode. If the position-sensing device is unable to communicate with a recipient or an intermediate system, the position-sensing device can switch to a long-range mode. For example, when the position-sensing device fails to receive either a signal requesting for position information or an acknowledgment to its transmitted signals after a preset duration of time, the position-sensing device will automatically switch to communicate in the long range mode with a recipient (e.g., a remote server). The position-sensing device can then periodically transmit its location to the remote server.

One application of the two modes of transmission is for theft prevention. Imagine a truck shipping a package that has a position-sensing device. During shipment, the position sensing device transmits its position information through short-range communication to a position-computing device attached to the truck. The position-computing device transmits the position of the package to the main office of the trucking company. Unbeknown to the driver, when he is having lunch at a restaurant, a thief breaks into his truck and steals the package. For the next hour, the position-sensing device never receives a signal requesting for location information or an acknowledgment to its transmitted signals. After the hour has elapsed, the position-sensing device can automatically send its unique identifier as a status signal, through a wireless (e.g., cellular) network, to the main office of the trucking company. If the signal is not received, the device can resend the signal every fifteen minutes. The office, after receiving the status signal, can request for the location of the package (i.e., the position-sensing device). The position-sensing device, getting the request, can transmit its location information through the wireless means to the office. Alternatively, the status signal could itself contain the location of the package. In either case, the office is notified of the location and thus is able to track the position of the stolen package.

In another embodiment, instead of transmitting through cellular means, the device transmits information using a Wi-Fi signal to tap into a Wi-Fi network. The Wi-Fi hub receiving the signal can direct it to a predetermined remote site, such as to the main office in the above example. The transmission of information from/to the position-sensing device can also be in a text message format (e.g., email or instant message). For example, the information can be transmitted over a SMS network or other pager type network.

A number of embodiments have been described where positions are identified based on GPS technologies. Other wireless technologies are also applicable, for example, using the techniques of triangulation. In one embodiment, the wireless technologies are based on a position-sensing device accessing or capturing television signals from such as three TV signal transmission towers. Triangulation techniques are then performed using synchronization codes in the TV signals to identify the location of that position-sensing device. In embodiments where positions are identified not based on GPS technologies, pseudo-ranges can become estimates of distances between position-sensing devices and locations whose known and well-defined co-ordinates can be broadcasted and captured by the position-sensing devices.

The above-described systems, devices, methods and processes can be used together with other aspects of a monitoring system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations, features and aspects of the invention noted above (including those incorporated by reference) can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention, or at least certain software portions of the invention, can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-implemented method implemented at least by a computing apparatus, including first wireless transceiver circuitry, to at least facilitate presenting data regarding locations of a mobile apparatus, the mobile apparatus including at least a controller, a satellite-signal receiver, and second wireless transceiver circuitry, wherein at least a portion of the second wireless transceiver circuitry and at least a portion of the satellite-signal receiver (i) include Complementary metal-oxide-semiconductor (CMOS) devices, (ii) are inside same enclosure, and (iii) use same power source, and wherein the first wireless transceiver circuitry is configurable to couple to the second wireless transceiver circuitry, the method comprising:
    accessing location data received at least via the first wireless transceiver circuitry, with the location data associated with a plurality of locations of the mobile apparatus, with the location data based on at least signals from the satellite-signal receiver receiving signals that can identify location, and with the location data including at least location data associated with a first location, and location data associated with a second location of the mobile apparatus;
    accessing a plurality of images received at least via the first wireless transceiver circuitry, with at least a first image of the plurality of images associated with a first time and the location data associated with the first location of the mobile apparatus, and with at least a second image of the plurality of images associated with a second time and the location data associated with the second location of the mobile apparatus;
    facilitating presenting on a display associated with the computing apparatus, at least the first image with the first time, and the second image with the second time, with at least the first image and the first time linked to the first location of the mobile apparatus, and with at least the second image and the second time linked to the second location of the mobile apparatus, wherein at least the first image and the second image are configured to be presented in an order at least based on time, wherein a speed of the mobile apparatus can be facilitated to be presented on the display;
    facilitating presenting the plurality of locations of the mobile apparatus on a map on the display associated with the computing apparatus, with at least a name presented in view of at least one of the plurality of locations of the mobile apparatus, and with the plurality of locations including at least the first location and the second location of the mobile apparatus;
    determining whether to present at least one point of interest located between the mobile apparatus and a specific location; and
    facilitating presenting the at least one point of interest on the map based on the determining,
wherein whether the at least one point of interest is to be presented on the map on the display depends on a scale of the map on the display, with such presentation being updated as distance between the mobile apparatus and the specific location changes, so as to at least accommodate for size of the display being fixed.

2. A computer-implemented method as recited in claim 1 comprising:
    accessing speed data for a plurality of speeds of the mobile apparatus, with the speed data including at least speed data for a first speed, and speed data for a second speed of the mobile apparatus; and
    facilitating presenting at least the first speed and the second speed on the display, with at least the first speed linked to the first location of the mobile apparatus in presenting, and with at least the second speed linked to the second location of the mobile apparatus in presenting.

3. A computer-implemented method as recited in claim 2, wherein the speed data for the plurality of speeds of the mobile apparatus depends on data from at least a motion sensor in the mobile apparatus.

4. A computer-implemented method as recited in claim 1 comprising:
accessing direction data for a plurality of directions of the mobile apparatus, with the direction data including at least direction data for a first direction, and direction data for a second direction of the mobile apparatus; and
facilitating presenting at least the first direction and the second direction on the display, with at least the first direction linked to the first location of the mobile apparatus in presenting, and with at least the second direction linked to the second location of the mobile apparatus in presenting.

5. A computer-implemented method as recited in claim 1 comprising:
accessing acceleration data for a plurality of accelerations of the mobile apparatus, with the acceleration data including at least acceleration data for a first acceleration, and acceleration data for a second acceleration of the mobile apparatus; and
facilitating presenting at least the first acceleration and the second acceleration on the display, with at least the first acceleration linked to the first location of the mobile apparatus in presenting, and with at least the second acceleration linked to the second location of the mobile apparatus in presenting.

6. A computer-implemented method as recited in claim 1 comprising:
accessing shock data for a plurality of shocks regarding the mobile apparatus, with the shock data including at least shock data for a first shock, and shock data for a second shock regarding the mobile apparatus; and
facilitating presenting at least representation for the first shock and representation for the second shock on the display, with at least the representation for the first shock linked to the first location of the mobile apparatus in presenting, and with at least the representation for the second shock linked to the second location of the mobile apparatus in presenting.

7. A computer-implemented method as recited in claim 6, wherein the shock data for the plurality of shocks regarding the mobile apparatus depends on data from at least a device configured to sense mechanical forces, with the device at least coupled to the controller in the mobile apparatus.

8. A computer-implemented method as recited in claim 1 comprising:
accessing vibration data for a plurality of vibrations regarding the mobile apparatus, with the vibration data including at least vibration data for a first vibration, and vibration data for a second vibration regarding the mobile apparatus; and
facilitating presenting at least representation for the first vibration and representation for the second vibration on the display, with at least the representation for the first vibration linked to the first location of the mobile apparatus in presenting, and the representation for the second vibration linked to the second location of the mobile apparatus in presenting.

9. A computer-implemented method as recited in claim 8, wherein the vibration data for the plurality of vibrations regarding the mobile apparatus depends on data from at least a device configured to sense vibrations, with the device at least coupled to the controller in the mobile apparatus.

10. A computer-implemented method as recited in claim 1 comprising:
accessing at least data for a standard time;
comparing at least the data for the standard time with at least data for time related to the first location; and
notifying an interested party based on the comparing.

11. A computer-implemented method as recited in claim 10,
wherein the data for the standard time includes data for a standard duration of time to travel between the first location and another location,
wherein the comparing at least the data for the standard time includes comparing data for the standard duration of time with at least data for a traveling time of the mobile apparatus between the first location and the another location, and
wherein the notifying the interested party includes notifying the interested party if the comparing indicates that the traveling time differs from the standard duration of time at least by a preset amount.

12. A computer-implemented method as recited in claim 2 comprising:
accessing data for a standard speed associated with at least the first location;
comparing at least the data for the standard speed with the speed data for the first speed; and
notifying an interested party based on the comparing.

13. A computer-implemented method as recited in claim 1 comprising accessing temperature data for a plurality of temperatures, with the temperature data including at least temperature data for a first temperature,
wherein the temperature data for the first temperature is associated with the first location, and
wherein the temperature data depends on data from a temperature sensor at least coupled to the controller in the mobile apparatus.

14. A computer-implemented method as recited in claim 13 comprising:
analyzing at least the temperature data for the first temperature; and
facilitating a unit configured to change temperature in vicinity around the temperature sensor, based on the analyzing at least the temperature data for the first temperature.

15. A computer-implemented method as recited in claim 1 comprising accessing attribute data for a plurality of attributes, with the attribute data including at least attribute data for a first attribute,
wherein the attribute data for the first attribute is associated with the first location, and
wherein the attribute data depends on data from an attribute sensor at least coupled to the controller in the mobile apparatus.

16. A computer-implemented method as recited in claim 15 comprising:
analyzing at least the attribute data for the first attribute; and
facilitating a unit configured to change attribute in the vicinity around the attribute sensor, based on the analyzing at least the attribute data for the first attribute.

* * * * *